US012407906B2

(12) United States Patent
Shivadas et al.

(10) Patent No.: US 12,407,906 B2
(45) Date of Patent: *Sep. 2, 2025

(54) NETWORK VIDEO STREAMING WITH TRICK PLAY BASED ON SEPARATE TRICK PLAY FILES

(71) Applicant: DIVX, LLC, San Diego, CA (US)

(72) Inventors: Abhishek Shivadas, San Diego, CA (US); Stephen R. Bramwell, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,773

(22) Filed: Oct. 7, 2022

(65) Prior Publication Data

US 2023/0179837 A1   Jun. 8, 2023

Related U.S. Application Data

(63) Continuation of application No. 16/665,652, filed on Oct. 28, 2019, now Pat. No. 11,470,405, which is a
(Continued)

(51) Int. Cl.
*H04N 21/845* (2011.01)
*H04L 65/70* (2022.01)
(Continued)

(52) U.S. Cl.
CPC ......... *H04N 21/8455* (2013.01); *H04L 65/70* (2022.05); *H04N 19/98* (2014.11);
(Continued)

(58) Field of Classification Search
CPC ............... H04N 21/8455; H04N 19/98; H04N 21/234345; H04N 21/234381;
(Continued)

(56) References Cited

U.S. PATENT DOCUMENTS

| 3,609,227 A | 9/1971 | Kuljian |
| 3,919,474 A | 11/1975 | Benson |

(Continued)

FOREIGN PATENT DOCUMENTS

| AU | 2010203605 B2 | 6/2015 |
| CA | 2237293 A1 | 7/1997 |

(Continued)

OTHER PUBLICATIONS

"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pages.
(Continued)

*Primary Examiner* — Oschta I Montoya
(74) *Attorney, Agent, or Firm* — KPPB LLP

(57) ABSTRACT

Network services encode multimedia content, such as video, into multiple adaptive bitrate streams of encoded video and a separate trick play stream of encoded video to support trick play features. The trick play stream is encoded at a lower encoding bitrate and frame rate than each of the adaptive bitrate streams. The adaptive bitrate streams and the trick play stream are stored in the network services. During normal content streaming and playback, a client device downloads a selected one of the adaptive bitrate streams from network serviced for playback at the client device. To implement a trick play feature, the client device downloads the trick play stream from the network services for trick play playback.

14 Claims, 11 Drawing Sheets

Related U.S. Application Data continuation of application No. 15/651,817, filed on Jul. 17, 2017, now Pat. No. 10,462,537, which is a continuation of application No. 14/810,345, filed on Jul. 27, 2015, now Pat. No. 9,712,890, which is a continuation of application No. 13/905,852, filed on May 30, 2013, now Pat. No. 9,094,737.

(51) Int. Cl.
| | |
|---|---|
| *H04N 19/98* | (2014.01) |
| *H04N 21/2343* | (2011.01) |
| *H04N 21/2387* | (2011.01) |
| *H04N 21/262* | (2011.01) |
| *H04N 21/472* | (2011.01) |
| *H04N 21/6587* | (2011.01) |
| *H04N 21/854* | (2011.01) |

(52) U.S. Cl.
CPC ......... *H04N 21/234345* (2013.01); *H04N 21/234381* (2013.01); *H04N 21/23439* (2013.01); *H04N 21/2387* (2013.01); *H04N 21/26258* (2013.01); *H04N 21/47217* (2013.01); *H04N 21/6587* (2013.01); *H04N 21/8456* (2013.01); *H04N 21/85406* (2013.01)

(58) Field of Classification Search
CPC ......... H04N 21/23439; H04N 21/2387; H04N 21/26258; H04N 21/47217; H04N 21/6587; H04N 21/8456; H04N 21/85406; H04L 65/70
See application file for complete search history.

(56) References Cited

U.S. PATENT DOCUMENTS

| | | | |
|---|---|---|---|
| 4,009,331 A | 2/1977 | Goldmark et al. | |
| 4,694,357 A | 9/1987 | Rahman et al. | |
| 4,694,491 A | 9/1987 | Horne et al. | |
| 4,802,170 A | 1/1989 | Trottier | |
| 4,964,069 A | 10/1990 | Ely | |
| 4,974,260 A | 11/1990 | Rudak | |
| 5,119,474 A | 6/1992 | Beitel et al. | |
| 5,132,992 A | 7/1992 | Yurt et al. | |
| 5,274,758 A | 12/1993 | Beitel et al. | |
| 5,341,474 A | 8/1994 | Gelman et al. | |
| 5,361,332 A | 11/1994 | Yoshida et al. | |
| 5,396,497 A | 3/1995 | Veltman | |
| 5,400,401 A | 3/1995 | Wasilewski et al. | |
| 5,404,436 A | 4/1995 | Hamilton | |
| 5,420,801 A | 5/1995 | Dockter et al. | |
| 5,420,974 A | 5/1995 | Morris et al. | |
| 5,471,576 A | 11/1995 | Yee | |
| 5,477,263 A | 12/1995 | Ocallaghan et al. | |
| 5,479,303 A | 12/1995 | Suzuki et al. | |
| 5,487,167 A | 1/1996 | Dinallo et al. | |
| 5,502,766 A | 3/1996 | Boebert et al. | |
| 5,509,070 A | 4/1996 | Schull | |
| 5,533,021 A | 7/1996 | Branstad et al. | |
| 5,537,408 A | 7/1996 | Branstad et al. | |
| 5,539,908 A | 7/1996 | Chen et al. | |
| 5,541,662 A | 7/1996 | Adams et al. | |
| 5,544,318 A | 8/1996 | Schmitz et al. | |
| 5,550,863 A | 8/1996 | Yurt et al. | |
| 5,574,785 A | 11/1996 | Ueno et al. | |
| 5,583,652 A | 12/1996 | Ware | |
| 5,589,993 A | 12/1996 | Naimpally et al. | |
| 5,600,721 A | 2/1997 | Kitazato | |
| 5,614,940 A | 3/1997 | Cobbley et al. | |
| 5,621,794 A | 4/1997 | Matsuda et al. | |
| 5,627,936 A | 5/1997 | Prasad | |
| 5,630,005 A | 5/1997 | Ort | |
| 5,633,472 A | 5/1997 | DeWitt et al. | |
| 5,642,171 A | 6/1997 | Baumgartner et al. | |
| 5,642,338 A | 6/1997 | Fukushima et al. | |
| 5,655,117 A | 8/1997 | Goldberg et al. | |
| 5,664,044 A | 9/1997 | Ware | |
| 5,675,382 A | 10/1997 | Bauchspies | |
| 5,675,511 A | 10/1997 | Prasad et al. | |
| 5,684,542 A | 11/1997 | Tsukagoshi | |
| 5,715,403 A | 2/1998 | Stefik | |
| 5,717,816 A | 2/1998 | Boyce et al. | |
| 5,719,786 A | 2/1998 | Nelson et al. | |
| 5,745,643 A | 4/1998 | Mishina | |
| 5,751,280 A | 5/1998 | Abbott | |
| 5,751,358 A | 5/1998 | Suzuki et al. | |
| 5,754,648 A | 5/1998 | Ryan et al. | |
| 5,757,968 A | 5/1998 | Ando | |
| 5,761,417 A | 6/1998 | Henley et al. | |
| 5,763,800 A | 6/1998 | Rossum et al. | |
| 5,765,164 A | 6/1998 | Prasad et al. | |
| 5,794,018 A | 8/1998 | Vrvilo et al. | |
| 5,805,700 A | 9/1998 | Nardone et al. | |
| 5,813,010 A | 9/1998 | Kurano et al. | |
| 5,819,160 A | 10/1998 | Foladare et al. | |
| 5,822,524 A | 10/1998 | Chen et al. | |
| 5,828,370 A | 10/1998 | Moeller et al. | |
| 5,838,791 A | 11/1998 | Torii et al. | |
| 5,841,432 A | 11/1998 | Carmel et al. | |
| 5,844,575 A | 12/1998 | Reid | |
| 5,848,217 A | 12/1998 | Tsukagoshi et al. | |
| 5,852,664 A | 12/1998 | Iverson et al. | |
| 5,854,873 A | 12/1998 | Mori et al. | |
| 5,867,625 A | 2/1999 | McLaren | |
| 5,874,986 A | 2/1999 | Gibbon et al. | |
| 5,878,135 A | 3/1999 | Blatter et al. | |
| 5,881,038 A | 3/1999 | Oshima et al. | |
| 5,887,110 A | 3/1999 | Sakamoto et al. | |
| 5,892,900 A | 4/1999 | Ginter et al. | |
| 5,892,915 A | 4/1999 | Duso et al. | |
| 5,903,261 A | 5/1999 | Walsh et al. | |
| 5,907,597 A | 5/1999 | Mark | |
| 5,907,658 A | 5/1999 | Murase et al. | |
| 5,912,710 A | 6/1999 | Fujimoto | |
| 5,923,869 A | 7/1999 | Kashiwagi et al. | |
| 5,946,446 A | 8/1999 | Yanagihara | |
| 5,956,729 A | 9/1999 | Goetz et al. | |
| 5,959,690 A | 9/1999 | Toebes, VIII et al. | |
| 5,970,147 A | 10/1999 | Davis | |
| 5,973,679 A | 10/1999 | Abbott et al. | |
| 5,999,812 A | 12/1999 | Himsworth | |
| 6,002,834 A | 12/1999 | Hirabayashi et al. | |
| 6,005,621 A | 12/1999 | Linzer et al. | |
| 6,009,237 A | 12/1999 | Hirabayashi et al. | |
| 6,016,381 A | 1/2000 | Taira et al. | |
| 6,018,611 A | 1/2000 | Nogami et al. | |
| 6,031,622 A | 2/2000 | Ristow et al. | |
| 6,038,257 A | 3/2000 | Brusewitz et al. | |
| 6,038,316 A | 3/2000 | Dwork et al. | |
| 6,044,469 A | 3/2000 | Horstmann | |
| 6,046,778 A | 4/2000 | Nonomura et al. | |
| 6,047,100 A | 4/2000 | McLaren | |
| 6,057,832 A | 5/2000 | Lev et al. | |
| 6,058,240 A | 5/2000 | McLaren | |
| 6,064,794 A | 5/2000 | McLaren et al. | |
| 6,065,050 A | 5/2000 | DeMoney | |
| 6,079,566 A | 6/2000 | Eleftheriadis et al. | |
| 6,097,877 A | 8/2000 | Katayama et al. | |
| 6,108,422 A | 8/2000 | Newby et al. | |
| 6,141,754 A | 10/2000 | Choy | |
| 6,151,634 A | 11/2000 | Glaser et al. | |
| 6,155,840 A | 12/2000 | Sallette | |
| 6,157,410 A | 12/2000 | Izumi et al. | |
| 6,169,242 B1 | 1/2001 | Fay et al. | |
| 6,175,921 B1 | 1/2001 | Rosen | |
| 6,192,075 B1 | 2/2001 | Jeng et al. | |
| 6,195,388 B1 | 2/2001 | Choi et al. | |
| 6,199,107 B1 | 3/2001 | Dujari | |
| 6,204,883 B1 | 3/2001 | Tsukagoshi | |
| 6,222,981 B1 | 4/2001 | Rijckaert | |
| 6,266,483 B1 | 7/2001 | Okada et al. | |
| 6,282,320 B1 | 8/2001 | Hasegawa et al. | |
| 6,282,653 B1 | 8/2001 | Berstis et al. | |

(56) References Cited

U.S. PATENT DOCUMENTS

| | | |
|---|---|---|
| 6,289,450 B1 | 9/2001 | Pensak et al. |
| 6,292,621 B1 | 9/2001 | Tanaka et al. |
| 6,308,005 B1 | 10/2001 | Ando et al. |
| 6,320,905 B1 | 11/2001 | Konstantinides |
| 6,330,286 B1 | 12/2001 | Lyons et al. |
| 6,347,145 B2 | 2/2002 | Kato et al. |
| 6,351,538 B1 | 2/2002 | Uz |
| 6,373,803 B2 | 4/2002 | Ando et al. |
| 6,374,144 B1 | 4/2002 | Viviani et al. |
| 6,389,218 B2 | 5/2002 | Gordon et al. |
| 6,389,473 B1 | 5/2002 | Carmel et al. |
| 6,395,969 B1 | 5/2002 | Fuhrer |
| 6,397,230 B1 | 5/2002 | Carmel et al. |
| 6,415,031 B1 | 7/2002 | Colligan et al. |
| 6,418,270 B1 | 7/2002 | Steenhof et al. |
| 6,430,354 B1 | 8/2002 | Watanabe |
| 6,441,754 B1 | 8/2002 | Wang et al. |
| 6,445,877 B1 | 9/2002 | Okada et al. |
| 6,449,719 B1 | 9/2002 | Baker |
| 6,453,115 B1 | 9/2002 | Boyle |
| 6,453,116 B1 | 9/2002 | Ando et al. |
| 6,466,671 B1 | 10/2002 | Maillard et al. |
| 6,466,733 B1 | 10/2002 | Kim |
| 6,504,873 B1 | 1/2003 | Vehvilaeinen |
| 6,510,513 B1 | 1/2003 | Danieli |
| 6,510,554 B1 | 1/2003 | Gordon et al. |
| 6,512,883 B2 | 1/2003 | Shim et al. |
| 6,516,064 B1 | 2/2003 | Osawa et al. |
| 6,532,262 B1 | 3/2003 | Fukuda et al. |
| 6,535,920 B1 | 3/2003 | Parry et al. |
| 6,578,200 B1 | 6/2003 | Takao et al. |
| 6,587,506 B1 | 7/2003 | Noridomi et al. |
| 6,594,699 B1 | 7/2003 | Sahai et al. |
| 6,621,979 B1 | 9/2003 | Eerenberg et al. |
| 6,625,320 B1 | 9/2003 | Nilsson et al. |
| 6,642,967 B1 | 11/2003 | Saunders |
| 6,654,933 B1 | 11/2003 | Abbott et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,714,909 B1 | 3/2004 | Gibbon et al. |
| 6,721,794 B2 | 4/2004 | Taylor et al. |
| 6,724,944 B1 | 4/2004 | Kalevo et al. |
| 6,725,281 B1 | 4/2004 | Zintel |
| 6,751,623 B1 | 6/2004 | Basso et al. |
| 6,771,703 B1 | 8/2004 | Oguz et al. |
| 6,807,306 B1 | 10/2004 | Girgensohn et al. |
| 6,810,031 B1 | 10/2004 | Hegde et al. |
| 6,810,131 B2 | 10/2004 | Nakagawa et al. |
| 6,810,389 B1 | 10/2004 | Meyer |
| 6,813,437 B2 | 11/2004 | Ando et al. |
| 6,819,394 B1 | 11/2004 | Nomura et al. |
| 6,850,252 B1 | 2/2005 | Hoffberg |
| 6,856,997 B2 | 2/2005 | Lee et al. |
| 6,859,496 B1 | 2/2005 | Boroczky et al. |
| 6,868,525 B1 | 3/2005 | Szabo |
| 6,871,006 B1 | 3/2005 | Oguz et al. |
| 6,912,253 B1 | 6/2005 | Li et al. |
| 6,912,513 B1 | 6/2005 | Candelore |
| 6,917,652 B2 | 7/2005 | Lyu |
| 6,920,179 B1 | 7/2005 | Anand et al. |
| 6,931,531 B1 | 8/2005 | Takahashi |
| 6,931,543 B1 | 8/2005 | Pang et al. |
| 6,944,621 B1 | 9/2005 | Collart |
| 6,944,629 B1 | 9/2005 | Shioi et al. |
| 6,956,901 B2 | 10/2005 | Boroczky et al. |
| 6,957,350 B1 | 10/2005 | Demos |
| 6,965,646 B1 | 11/2005 | Firestone |
| 6,965,724 B1 | 11/2005 | Boccon-Gibod et al. |
| 6,965,993 B2 | 11/2005 | Baker |
| 6,970,564 B1 | 11/2005 | Kubota et al. |
| 6,983,079 B2 | 1/2006 | Kim |
| 6,985,588 B1 | 1/2006 | Glick et al. |
| 6,988,144 B1 | 1/2006 | Luken et al. |
| 7,006,757 B2 | 2/2006 | Ando et al. |
| 7,007,170 B2 | 2/2006 | Morten |
| 7,020,287 B2 | 3/2006 | Unger |
| 7,023,924 B1 | 4/2006 | Keller et al. |
| 7,023,992 B1 | 4/2006 | Kubota et al. |
| 7,043,021 B2 | 5/2006 | Graunke et al. |
| 7,043,473 B1 | 5/2006 | Rassool et al. |
| 7,051,110 B2 | 5/2006 | Hagai et al. |
| 7,054,968 B2 | 5/2006 | Shrader et al. |
| 7,058,177 B1 | 6/2006 | Trimberger et al. |
| 7,073,191 B2 | 7/2006 | Srikantan et al. |
| 7,103,906 B1 | 9/2006 | Katz et al. |
| 7,110,542 B1 | 9/2006 | Tripathy |
| 7,120,250 B2 | 10/2006 | Candelore |
| 7,124,303 B2 | 10/2006 | Candelore et al. |
| 7,127,155 B2 | 10/2006 | Ando et al. |
| 7,139,868 B2 | 11/2006 | Parry et al. |
| 7,143,289 B2 | 11/2006 | Denning et al. |
| 7,150,045 B2 | 12/2006 | Koelle et al. |
| 7,151,832 B1 | 12/2006 | Fetkovich et al. |
| 7,151,833 B2 | 12/2006 | Candelore et al. |
| 7,165,175 B1 | 1/2007 | Kollmyer et al. |
| 7,167,560 B2 | 1/2007 | Yu |
| 7,181,438 B1 | 2/2007 | Szabo |
| 7,185,363 B1 | 2/2007 | Narin et al. |
| 7,188,183 B1 | 3/2007 | Paul et al. |
| 7,191,335 B1 | 3/2007 | Maillard |
| 7,197,234 B1 | 3/2007 | Chatterton |
| 7,203,313 B2 | 4/2007 | England et al. |
| 7,206,940 B2 | 4/2007 | Evans et al. |
| 7,209,892 B1 | 4/2007 | Galuten et al. |
| 7,212,726 B2 | 5/2007 | Zetts |
| 7,231,132 B1 | 6/2007 | Davenport |
| 7,231,516 B1 | 6/2007 | Sparrell et al. |
| 7,233,669 B2 | 6/2007 | Candelore |
| 7,233,948 B1 | 6/2007 | Shamoon et al. |
| 7,237,061 B1 | 6/2007 | Boic |
| 7,242,772 B1 | 7/2007 | Tehranchi |
| 7,243,346 B1 | 7/2007 | Seth et al. |
| 7,274,861 B2 | 9/2007 | Yahata et al. |
| 7,295,673 B2 | 11/2007 | Grab et al. |
| 7,302,490 B1 | 11/2007 | Gupta et al. |
| 7,315,829 B1 | 1/2008 | Tagawa et al. |
| 7,328,345 B2 | 2/2008 | Morten et al. |
| 7,330,875 B1 | 2/2008 | Parasnis et al. |
| 7,340,528 B2 | 3/2008 | Noblecourt et al. |
| 7,346,163 B2 | 3/2008 | Pedlow, Jr. et al. |
| 7,349,886 B2 | 3/2008 | Morten et al. |
| 7,349,976 B1 | 3/2008 | Glaser et al. |
| 7,352,956 B1 | 4/2008 | Winter et al. |
| 7,356,143 B2 | 4/2008 | Morten |
| 7,356,245 B2 | 4/2008 | Belknap et al. |
| 7,363,647 B1 | 4/2008 | Fakharzadeh |
| 7,366,788 B2 | 4/2008 | Jones et al. |
| 7,376,233 B2 | 5/2008 | Candelore et al. |
| 7,376,831 B2 | 5/2008 | Kollmyer et al. |
| 7,382,879 B1 | 6/2008 | Miller |
| 7,389,273 B2 | 6/2008 | Irwin et al. |
| 7,397,853 B2 | 7/2008 | Kwon et al. |
| 7,400,679 B2 | 7/2008 | Kwon et al. |
| 7,406,174 B2 | 7/2008 | Palmer |
| 7,418,132 B2 | 8/2008 | Hoshuyama |
| 7,421,411 B2 | 9/2008 | Kontio et al. |
| 7,443,449 B2 | 10/2008 | Momosaki et al. |
| 7,454,780 B2 | 11/2008 | Katsube et al. |
| 7,457,359 B2 | 11/2008 | Mabey et al. |
| 7,457,415 B2 | 11/2008 | Reitmeier et al. |
| 7,460,668 B2 | 12/2008 | Grab et al. |
| 7,472,280 B2 | 12/2008 | Giobbi |
| 7,478,325 B2 | 1/2009 | Foehr |
| 7,484,103 B2 | 1/2009 | Woo et al. |
| 7,493,018 B2 | 2/2009 | Kim |
| 7,499,930 B2 | 3/2009 | Naka et al. |
| 7,499,938 B2 | 3/2009 | Collart |
| 7,515,710 B2 | 4/2009 | Russell et al. |
| 7,526,450 B2 | 4/2009 | Hughes et al. |
| 7,539,213 B2 | 5/2009 | Guillemot et al. |
| 7,546,641 B2 | 6/2009 | Robert et al. |

(56) References Cited

U.S. PATENT DOCUMENTS

| | | |
|---|---|---|
| 7,577,980 B2 | 8/2009 | Kienzle et al. |
| 7,594,271 B2 | 9/2009 | Zhuk et al. |
| 7,610,365 B1 | 10/2009 | Kraft et al. |
| 7,623,759 B2 | 11/2009 | Shimoda |
| 7,624,337 B2 | 11/2009 | Sull et al. |
| 7,627,750 B1 | 12/2009 | Chan |
| 7,627,888 B2 | 12/2009 | Ganesan et al. |
| 7,639,921 B2 | 12/2009 | Seo et al. |
| 7,640,358 B2 | 12/2009 | Deshpande |
| 7,640,435 B2 | 12/2009 | Morten |
| 7,644,172 B2 | 1/2010 | Stewart et al. |
| 7,653,686 B2 | 1/2010 | Yoneda |
| 7,664,262 B2 | 2/2010 | Haruki |
| 7,664,872 B2 | 2/2010 | Osborne et al. |
| 7,676,555 B2 | 3/2010 | Bushee et al. |
| 7,689,510 B2 | 3/2010 | Lamkin et al. |
| 7,697,686 B2 | 4/2010 | Puiatti et al. |
| 7,702,925 B2 | 4/2010 | Hanko et al. |
| 7,711,052 B2 | 5/2010 | Hannuksela et al. |
| 7,711,647 B2 | 5/2010 | Gunaseelan et al. |
| 7,720,352 B2 | 5/2010 | Belknap et al. |
| 7,734,806 B2 | 6/2010 | Park |
| 7,747,853 B2 | 6/2010 | Candelore |
| 7,756,270 B2 | 7/2010 | Shimosato et al. |
| 7,756,271 B2 | 7/2010 | Zhu et al. |
| 7,761,892 B2 | 7/2010 | Ellis et al. |
| 7,779,097 B2 | 8/2010 | Lamkin et al. |
| 7,787,622 B2 | 8/2010 | Sprunk |
| 7,788,271 B2 | 8/2010 | Soma et al. |
| 7,797,720 B2 | 9/2010 | Gopalakrishnan et al. |
| 7,817,608 B2 | 10/2010 | Rassool et al. |
| 7,840,489 B2 | 11/2010 | Candelore |
| 7,840,693 B2 | 11/2010 | Gupta et al. |
| 7,853,980 B2 | 12/2010 | Pedlow, Jr. et al. |
| 7,864,186 B2 | 1/2011 | Robotham et al. |
| 7,869,691 B2 | 1/2011 | Kelly et al. |
| 7,873,740 B2 | 1/2011 | Sitaraman et al. |
| 7,877,002 B2 | 1/2011 | Ikeda et al. |
| 7,881,478 B2 | 2/2011 | Derouet |
| 7,882,034 B2 | 2/2011 | Hug et al. |
| 7,885,405 B1 | 2/2011 | Bong |
| 7,895,311 B1 | 2/2011 | Juenger |
| 7,907,833 B2 | 3/2011 | Lee |
| 7,913,277 B1 | 3/2011 | Rahrer |
| 7,945,143 B2 | 5/2011 | Yahata et al. |
| 7,949,703 B2 | 5/2011 | Matsuzaki et al. |
| 7,962,942 B1 | 6/2011 | Craner |
| 7,970,835 B2 | 6/2011 | St. Jacques |
| 7,974,714 B2 | 7/2011 | Hoffberg |
| 7,984,513 B1 | 7/2011 | Kyne et al. |
| 7,991,156 B1 | 8/2011 | Miller |
| 8,001,471 B2 | 8/2011 | Shaver et al. |
| 8,010,810 B1 | 8/2011 | Fitzgerald et al. |
| 8,015,491 B2 | 9/2011 | Shaver et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,073,900 B2 | 12/2011 | Guedalia et al. |
| 8,074,083 B1 | 12/2011 | Lee et al. |
| 8,078,644 B2 | 12/2011 | Hannuksela |
| 8,082,442 B2 | 12/2011 | Keljo et al. |
| 8,131,875 B1 | 3/2012 | Chen |
| 8,135,041 B2 | 3/2012 | Ramaswamy |
| 8,160,157 B2 | 4/2012 | Lamy-Bergot et al. |
| 8,169,916 B1 | 5/2012 | Pai et al. |
| 8,170,210 B2 | 5/2012 | Manders et al. |
| 8,195,714 B2 | 6/2012 | Mckibben et al. |
| 8,201,264 B2 | 6/2012 | Grab et al. |
| 8,213,607 B2 | 7/2012 | Rose et al. |
| 8,213,768 B2 | 7/2012 | Morioka et al. |
| 8,218,439 B2 | 7/2012 | Deshpande |
| 8,225,061 B2 | 7/2012 | Greenebaum |
| 8,233,768 B2 | 7/2012 | Soroushian et al. |
| 8,243,924 B2 | 8/2012 | Chen et al. |
| 8,245,124 B1 | 8/2012 | Gupta |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,286,213 B2 | 10/2012 | Seo |
| 8,286,621 B2 | 10/2012 | Halmone |
| 8,289,338 B2 | 10/2012 | Priyadarshi et al. |
| 8,290,157 B2 | 10/2012 | Candelore |
| 8,291,460 B1 | 10/2012 | Peacock |
| 8,296,434 B1 | 10/2012 | Miller et al. |
| 8,311,094 B2 | 11/2012 | Kamariotis et al. |
| 8,311,111 B2 | 11/2012 | Xu et al. |
| 8,311,115 B2 | 11/2012 | Gu et al. |
| 8,312,079 B2 | 11/2012 | Newsome et al. |
| 8,321,556 B1 | 11/2012 | Chatterjee et al. |
| 8,325,800 B2 | 12/2012 | Holcomb et al. |
| 8,327,009 B2 | 12/2012 | Prestenback et al. |
| 8,341,715 B2 | 12/2012 | Sherkin et al. |
| 8,346,753 B2 | 1/2013 | Hayes |
| 8,365,235 B2 | 1/2013 | Hunt et al. |
| 8,369,421 B2 | 2/2013 | Kadono et al. |
| 8,380,041 B2 | 2/2013 | Barton et al. |
| 8,386,621 B2 | 2/2013 | Park |
| 8,396,114 B2 | 3/2013 | Gu et al. |
| 8,397,265 B2 | 3/2013 | Henocq et al. |
| 8,401,188 B1 | 3/2013 | Swaminathan |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Carmel et al. |
| 8,456,380 B2 | 6/2013 | Pagan |
| 8,464,066 B1 | 6/2013 | Price et al. |
| 8,472,792 B2 | 6/2013 | Butt |
| 8,473,630 B2 | 6/2013 | Galligan |
| 8,484,368 B2 | 7/2013 | Robert et al. |
| 8,510,303 B2 | 8/2013 | Soroushian et al. |
| 8,510,404 B2 | 8/2013 | Carmel et al. |
| 8,514,926 B2 | 8/2013 | Ro et al. |
| 8,515,265 B2 | 8/2013 | Kwon et al. |
| 8,516,529 B2 | 8/2013 | Lajoie et al. |
| 8,526,610 B2 | 9/2013 | Shamoon et al. |
| 8,527,645 B1 | 9/2013 | Proffit et al. |
| 8,543,842 B2 | 9/2013 | Ginter et al. |
| 8,555,329 B2 | 10/2013 | Fröjdh et al. |
| 8,571,993 B2 | 10/2013 | Kocher et al. |
| 8,595,378 B1 | 11/2013 | Cohn et al. |
| 8,606,069 B2 | 12/2013 | Okubo et al. |
| 8,630,419 B2 | 1/2014 | Mori |
| 8,631,247 B2 | 1/2014 | O'loughlin et al. |
| 8,640,166 B1 | 1/2014 | Craner et al. |
| 8,649,669 B2 | 2/2014 | Braness et al. |
| 8,650,599 B2 | 2/2014 | Shindo et al. |
| 8,656,183 B2 | 2/2014 | Russell et al. |
| 8,677,428 B2 | 3/2014 | Lewis et al. |
| 8,681,866 B1 | 3/2014 | Jia |
| 8,683,066 B2 | 3/2014 | Hurst et al. |
| 8,689,267 B2 | 4/2014 | Hunt |
| 8,726,264 B1 | 5/2014 | Allen et al. |
| 8,731,193 B2 | 5/2014 | Farkash et al. |
| 8,731,369 B2 | 5/2014 | Li et al. |
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,782,268 B2 | 7/2014 | Pyle et al. |
| 8,804,956 B2 | 8/2014 | Hiriart |
| 8,805,109 B2 | 8/2014 | Shoham et al. |
| 8,806,188 B2 | 8/2014 | Braness et al. |
| 8,818,171 B2 | 8/2014 | Soroushian et al. |
| 8,818,896 B2 | 8/2014 | Candelore |
| 8,819,116 B1 | 8/2014 | Tomay et al. |
| 8,832,434 B2 | 9/2014 | Apostolopoulos et al. |
| 8,843,586 B2 | 9/2014 | Pantos et al. |
| 8,849,950 B2 | 9/2014 | Stockhammer et al. |

(56) References Cited

U.S. PATENT DOCUMENTS

| | | |
|---|---|---|
| 8,850,205 B2 | 9/2014 | Choi et al. |
| 8,850,498 B1 | 9/2014 | Roach et al. |
| 8,856,218 B1 | 10/2014 | Inskip |
| 8,897,370 B1 | 11/2014 | Wang et al. |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,533 B2 | 12/2014 | Chen et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,964,977 B2 | 2/2015 | Ziskind et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,015,782 B2 | 4/2015 | Acharya et al. |
| 9,025,659 B2 | 5/2015 | Soroushian et al. |
| 9,038,116 B1 | 5/2015 | Knox et al. |
| 9,038,121 B2 | 5/2015 | Kienzle et al. |
| 9,042,670 B2 | 5/2015 | Carmel et al. |
| 9,049,497 B2 | 6/2015 | Chen et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,111,098 B2 | 8/2015 | Smith et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,151 B2 | 11/2015 | Luby et al. |
| 9,191,457 B2 | 11/2015 | Van der Schaar |
| 9,197,685 B2 | 11/2015 | Soroushian |
| 9,201,922 B2 | 12/2015 | Soroushian et al. |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,380,096 B2 | 6/2016 | Luby et al. |
| 9,386,064 B2 | 7/2016 | Luby et al. |
| 9,406,066 B2 | 8/2016 | Candelore |
| 9,467,708 B2 | 10/2016 | Soroushian et al. |
| 9,479,805 B2 | 10/2016 | Rothschild et al. |
| 9,485,469 B2 | 11/2016 | Kahn et al. |
| 9,485,546 B2 | 11/2016 | Chen et al. |
| 9,510,031 B2 | 11/2016 | Soroushian et al. |
| 9,571,827 B2 | 2/2017 | Su et al. |
| 9,584,557 B2 | 2/2017 | Panje et al. |
| 9,584,847 B2 | 2/2017 | Ma et al. |
| 9,615,061 B2 | 4/2017 | Carney et al. |
| 9,621,522 B2 | 4/2017 | Kiefer et al. |
| 9,628,536 B2 | 4/2017 | Luby et al. |
| 9,667,684 B2 | 5/2017 | Ziskind et al. |
| 9,672,286 B2 | 6/2017 | Soroushian et al. |
| 9,674,254 B2 | 6/2017 | Pare et al. |
| 9,686,332 B1 | 6/2017 | Binns et al. |
| 9,706,259 B2 | 7/2017 | Chan et al. |
| 9,712,890 B2 | 7/2017 | Shivadas et al. |
| 9,761,274 B2 | 9/2017 | Delpuch et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,955,195 B2 | 4/2018 | Soroushian |
| 9,967,189 B2 | 5/2018 | Patel et al. |
| 9,967,305 B2 | 5/2018 | Braness |
| 9,967,521 B2 | 5/2018 | Kahn et al. |
| 10,169,094 B2 | 1/2019 | Iyer |
| 10,171,873 B2 | 1/2019 | Krebs |
| 10,212,486 B2 | 2/2019 | Chan et al. |
| 10,225,299 B2 | 3/2019 | van der Schaar et al. |
| 10,225,588 B2 | 3/2019 | Kiefer et al. |
| 10,244,272 B2 | 3/2019 | Kiefer et al. |
| 10,264,255 B2 | 4/2019 | Naletov et al. |
| 10,321,168 B2 | 6/2019 | van der Schaar et al. |
| 10,341,698 B2 | 7/2019 | Kiefer et al. |
| 10,368,096 B2 | 7/2019 | Braness et al. |
| 10,382,785 B2 | 8/2019 | Braness et al. |
| 10,437,896 B2 | 10/2019 | Soroushian et al. |
| 10,462,537 B2 | 10/2019 | Shivadas et al. |
| 10,484,749 B2 | 11/2019 | Chan et al. |
| 10,645,429 B2 | 5/2020 | Soroushian |
| 10,708,587 B2 | 7/2020 | Soroushian et al. |
| 10,715,806 B2 | 7/2020 | Naletov et al. |
| 10,798,143 B2 | 10/2020 | Soroushian et al. |
| 10,805,368 B2 | 10/2020 | Van der Schaar et al. |
| 10,856,020 B2 | 12/2020 | Kiefer et al. |
| 10,878,065 B2 | 12/2020 | Grab et al. |
| 10,893,305 B2 | 1/2021 | Van der Schaar et al. |
| 10,931,982 B2 | 2/2021 | Soroushian |
| 10,992,955 B2 | 4/2021 | Braness et al. |
| 11,102,553 B2 | 8/2021 | Chan et al. |
| RE48,761 E | 9/2021 | Shivadas et al. |
| 11,438,394 B2 | 9/2022 | Van Der Schaar et al. |
| 11,457,054 B2 | 9/2022 | Soroushian et al. |
| 11,470,405 B2 | 10/2022 | Shivadas et al. |
| 11,638,033 B2 | 4/2023 | Braness et al. |
| 11,683,542 B2 | 6/2023 | Kiefer et al. |
| 2001/0021276 A1 | 9/2001 | Zhou |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0052077 A1 | 12/2001 | Fung et al. |
| 2001/0052127 A1 | 12/2001 | Seo et al. |
| 2001/0053222 A1 | 12/2001 | Wakao et al. |
| 2001/0055337 A1 | 12/2001 | Matsuzaki et al. |
| 2002/0026560 A1 | 2/2002 | Jordan et al. |
| 2002/0034252 A1 | 3/2002 | Owen et al. |
| 2002/0048450 A1 | 4/2002 | Zetts |
| 2002/0051494 A1 | 5/2002 | Yamaguchi et al. |
| 2002/0057739 A1 | 5/2002 | Hasebe et al. |
| 2002/0057898 A1 | 5/2002 | Normile |
| 2002/0062313 A1 | 5/2002 | Lee et al. |
| 2002/0067432 A1 | 6/2002 | Kondo et al. |
| 2002/0075572 A1 | 6/2002 | Boreczky et al. |
| 2002/0076112 A1 | 6/2002 | Devara |
| 2002/0087569 A1 | 7/2002 | Fischer et al. |
| 2002/0089523 A1 | 7/2002 | Hodgkinson |
| 2002/0091665 A1 | 7/2002 | Beek et al. |
| 2002/0093571 A1 | 7/2002 | Hyodo |
| 2002/0107802 A1 | 8/2002 | Philips |
| 2002/0110193 A1 | 8/2002 | Yoo et al. |
| 2002/0114330 A1 | 8/2002 | Cheung et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0135607 A1 | 9/2002 | Kato et al. |
| 2002/0136298 A1 | 9/2002 | Anantharamu et al. |
| 2002/0141503 A1 | 10/2002 | Kobayashi et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0154779 A1 | 10/2002 | Asano et al. |
| 2002/0159528 A1 | 10/2002 | Graziani et al. |
| 2002/0159598 A1 | 10/2002 | Rubinstein et al. |
| 2002/0161462 A1 | 10/2002 | Fay |
| 2002/0161797 A1 | 10/2002 | Gallo et al. |
| 2002/0164024 A1 | 11/2002 | Arakawa et al. |
| 2002/0169926 A1 | 11/2002 | Pinckney et al. |
| 2002/0169971 A1 | 11/2002 | Asano et al. |
| 2002/0180929 A1 | 12/2002 | Tseng et al. |
| 2002/0184159 A1 | 12/2002 | Tadayon et al. |
| 2002/0184515 A1 | 12/2002 | Oho et al. |
| 2002/0191112 A1 | 12/2002 | Akiyoshi et al. |

(56) References Cited

U.S. PATENT DOCUMENTS

| | | |
|---|---|---|
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002577 A1 | 1/2003 | Pinder |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0043847 A1 | 3/2003 | Haddad |
| 2003/0044080 A1 | 3/2003 | Frishman et al. |
| 2003/0051237 A1 | 3/2003 | Sako et al. |
| 2003/0053541 A1 | 3/2003 | Sun et al. |
| 2003/0061305 A1 | 3/2003 | Copley et al. |
| 2003/0061369 A1 | 3/2003 | Aksu et al. |
| 2003/0063675 A1 | 4/2003 | Kang et al. |
| 2003/0065777 A1 | 4/2003 | Mattila et al. |
| 2003/0077071 A1 | 4/2003 | Lin et al. |
| 2003/0078891 A1 | 4/2003 | Capitant |
| 2003/0078930 A1 | 4/2003 | Surcouf et al. |
| 2003/0079222 A1 | 4/2003 | Boykin et al. |
| 2003/0081776 A1 | 5/2003 | Candelore |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0135633 A1 | 7/2003 | Dror et al. |
| 2003/0135742 A1 | 7/2003 | Evans |
| 2003/0142594 A1 | 7/2003 | Tsumagari et al. |
| 2003/0142872 A1 | 7/2003 | Koyanagi |
| 2003/0152224 A1 | 8/2003 | Candelore et al. |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | Mcveigh et al. |
| 2003/0206558 A1 | 11/2003 | Parkkinen et al. |
| 2003/0206717 A1 | 11/2003 | Yogeshwar et al. |
| 2003/0210821 A1 | 11/2003 | Yogeshwar et al. |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0001594 A1 | 1/2004 | Krishnaswamy et al. |
| 2004/0003008 A1 | 1/2004 | Wasilewski et al. |
| 2004/0006701 A1 | 1/2004 | Kresina |
| 2004/0021684 A1 | 2/2004 | Millner |
| 2004/0022391 A1 | 2/2004 | Obrien |
| 2004/0024688 A1 | 2/2004 | Bi et al. |
| 2004/0025180 A1 | 2/2004 | Begeja et al. |
| 2004/0028227 A1 | 2/2004 | Yu |
| 2004/0031058 A1 | 2/2004 | Reisman |
| 2004/0037421 A1 | 2/2004 | Truman |
| 2004/0039916 A1 | 2/2004 | Aldis et al. |
| 2004/0047592 A1 | 3/2004 | Seo et al. |
| 2004/0047607 A1 | 3/2004 | Seo et al. |
| 2004/0047614 A1 | 3/2004 | Green |
| 2004/0049690 A1 | 3/2004 | Candelore et al. |
| 2004/0049694 A1 | 3/2004 | Candelore |
| 2004/0052501 A1 | 3/2004 | Tam |
| 2004/0071453 A1 | 4/2004 | Valderas |
| 2004/0073917 A1 | 4/2004 | Pedlow et al. |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0084035 A1 | 5/2004 | Newton |
| 2004/0088557 A1 | 5/2004 | Malcolm et al. |
| 2004/0093494 A1 | 5/2004 | Nishimoto et al. |
| 2004/0093618 A1 | 5/2004 | Baldwin et al. |
| 2004/0101059 A1 | 5/2004 | Joch et al. |
| 2004/0101142 A1 | 5/2004 | Nasypny |
| 2004/0105549 A1 | 6/2004 | Suzuki et al. |
| 2004/0107356 A1 | 6/2004 | Shamoon et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0150747 A1 | 8/2004 | Sita |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0208245 A1 | 10/2004 | Macinnis et al. |
| 2004/0213094 A1 | 10/2004 | Suzuki |
| 2004/0213547 A1 | 10/2004 | Hayes |
| 2004/0217971 A1 | 11/2004 | Kim |
| 2004/0243488 A1 | 12/2004 | Yamamoto et al. |
| 2004/0243714 A1 | 12/2004 | Wynn et al. |
| 2004/0255115 A1 | 12/2004 | DeMello et al. |
| 2004/0255236 A1 | 12/2004 | Collart |
| 2004/0267952 A1 | 12/2004 | He et al. |
| 2005/0004875 A1 | 1/2005 | Kontio et al. |
| 2005/0005025 A1 | 1/2005 | Harville et al. |
| 2005/0005143 A1 | 1/2005 | Lang et al. |
| 2005/0008385 A1 | 1/2005 | Kocher et al. |
| 2005/0013494 A1 | 1/2005 | Srinivasan et al. |
| 2005/0015509 A1 | 1/2005 | Sitaraman et al. |
| 2005/0015797 A1 | 1/2005 | Noblecourt et al. |
| 2005/0038826 A1 | 2/2005 | Bae et al. |
| 2005/0052294 A1 | 3/2005 | Liang et al. |
| 2005/0055399 A1 | 3/2005 | Savchuk |
| 2005/0063541 A1 | 3/2005 | Candelore |
| 2005/0066063 A1 | 3/2005 | Grigorovitch et al. |
| 2005/0071280 A1 | 3/2005 | Irwin et al. |
| 2005/0076232 A1 | 4/2005 | Kawaguchi |
| 2005/0089091 A1 | 4/2005 | Kim et al. |
| 2005/0094808 A1 | 5/2005 | Pedlow, Jr. et al. |
| 2005/0102371 A1 | 5/2005 | Aksu |
| 2005/0108320 A1 | 5/2005 | Lord et al. |
| 2005/0114534 A1 | 5/2005 | Lee |
| 2005/0114896 A1 | 5/2005 | Hug et al. |
| 2005/0120132 A1 | 6/2005 | Hutter |
| 2005/0132208 A1 | 6/2005 | Hug et al. |
| 2005/0138655 A1 | 6/2005 | Zimler et al. |
| 2005/0144468 A1 | 6/2005 | Northcutt |
| 2005/0149450 A1 | 7/2005 | Stefik et al. |
| 2005/0157948 A1 | 7/2005 | Lee |
| 2005/0177741 A1 | 8/2005 | Chen et al. |
| 2005/0180641 A1 | 8/2005 | Clark |
| 2005/0183120 A1 | 8/2005 | Jain et al. |
| 2005/0190911 A1 | 9/2005 | Pare et al. |
| 2005/0192904 A1 | 9/2005 | Candelore |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0198364 A1 | 9/2005 | Val et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0210145 A1 | 9/2005 | Kim et al. |
| 2005/0216752 A1 | 9/2005 | Hofmeyr et al. |
| 2005/0223412 A1 | 10/2005 | Nadalin et al. |
| 2005/0227773 A1 | 10/2005 | Lu et al. |
| 2005/0243912 A1 | 11/2005 | Kwon et al. |
| 2005/0254508 A1 | 11/2005 | Aksu et al. |
| 2005/0262257 A1 | 11/2005 | Major et al. |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0013568 A1 | 1/2006 | Rodriguez |
| 2006/0015580 A1 | 1/2006 | Gabriel et al. |
| 2006/0015813 A1 | 1/2006 | Chung et al. |
| 2006/0020825 A1 | 1/2006 | Grab |
| 2006/0026294 A1 | 2/2006 | Virdi et al. |
| 2006/0026302 A1 | 2/2006 | Bennett et al. |

(56) References Cited

U.S. PATENT DOCUMENTS

| | | |
|---|---|---|
| 2006/0026654 A1 | 2/2006 | An et al. |
| 2006/0036549 A1 | 2/2006 | Wu |
| 2006/0037057 A1 | 2/2006 | Xu |
| 2006/0039481 A1 | 2/2006 | Shen et al. |
| 2006/0052095 A1 | 3/2006 | Vazvan |
| 2006/0053080 A1 | 3/2006 | Edmonson et al. |
| 2006/0059223 A1 | 3/2006 | Klemets et al. |
| 2006/0064605 A1 | 3/2006 | Giobbi |
| 2006/0078301 A1 | 4/2006 | Ikeda et al. |
| 2006/0093318 A1 | 5/2006 | Cohen et al. |
| 2006/0093320 A1 | 5/2006 | Hallberg et al. |
| 2006/0095472 A1 | 5/2006 | Krikorian et al. |
| 2006/0109856 A1 | 5/2006 | Deshpande |
| 2006/0120378 A1 | 6/2006 | Usuki et al. |
| 2006/0126717 A1 | 6/2006 | Boyce et al. |
| 2006/0129909 A1 | 6/2006 | Butt et al. |
| 2006/0165163 A1 | 7/2006 | Burazerovic et al. |
| 2006/0165233 A1 | 7/2006 | Nonaka et al. |
| 2006/0168298 A1 | 7/2006 | Aoki et al. |
| 2006/0168639 A1 | 7/2006 | Gan et al. |
| 2006/0173887 A1 | 8/2006 | Breitfeld et al. |
| 2006/0179239 A1 | 8/2006 | Fluhr et al. |
| 2006/0181965 A1 | 8/2006 | Collart |
| 2006/0210245 A1 | 9/2006 | Mccrossan et al. |
| 2006/0212370 A1 | 9/2006 | Shear et al. |
| 2006/0218251 A1 | 9/2006 | Tanabe |
| 2006/0235880 A1 | 10/2006 | Qian |
| 2006/0235883 A1 | 10/2006 | Krebs |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0024706 A1 | 2/2007 | Brannon, Jr. et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047645 A1 | 3/2007 | Takashima |
| 2007/0047901 A1 | 3/2007 | Ando et al. |
| 2007/0053293 A1 | 3/2007 | Mcdonald et al. |
| 2007/0053513 A1 | 3/2007 | Hoffberg |
| 2007/0055982 A1 | 3/2007 | Spilo |
| 2007/0058928 A1 | 3/2007 | Naito et al. |
| 2007/0061595 A1 | 3/2007 | Chen |
| 2007/0067472 A1 | 3/2007 | Maertens et al. |
| 2007/0067622 A1 | 3/2007 | Nakano et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0101271 A1 | 5/2007 | Hua et al. |
| 2007/0101387 A1 | 5/2007 | Hua et al. |
| 2007/0106863 A1 | 5/2007 | Bonwick et al. |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0156770 A1 | 7/2007 | Espelien |
| 2007/0157267 A1 | 7/2007 | Lopez-Estrada |
| 2007/0162568 A1 | 7/2007 | Gupta et al. |
| 2007/0162981 A1 | 7/2007 | Morioka et al. |
| 2007/0166000 A1 | 7/2007 | Nallur et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180051 A1 | 8/2007 | Kelly et al. |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0201502 A1 | 8/2007 | Abramson |
| 2007/0201695 A1 | 8/2007 | Saarikivi |
| 2007/0204003 A1 | 8/2007 | Abramson |
| 2007/0204011 A1 | 8/2007 | Shaver et al. |
| 2007/0204115 A1 | 8/2007 | Abramson |
| 2007/0217339 A1 | 9/2007 | Zhao |
| 2007/0217759 A1 | 9/2007 | Dodd |
| 2007/0220118 A1 | 9/2007 | Loyer |
| 2007/0234391 A1 | 10/2007 | Hunter et al. |
| 2007/0239839 A1 | 10/2007 | Buday et al. |
| 2007/0250536 A1 | 10/2007 | Tanaka et al. |
| 2007/0255940 A1 | 11/2007 | Ueno |
| 2007/0256141 A1 | 11/2007 | Nakano et al. |
| 2007/0271317 A1 | 11/2007 | Carmel et al. |
| 2007/0271385 A1 | 11/2007 | Davis et al. |
| 2007/0271830 A1 | 11/2007 | Holt et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008319 A1 | 1/2008 | Poirier |
| 2008/0008455 A1 | 1/2008 | De Lange et al. |
| 2008/0022005 A1 | 1/2008 | Wu et al. |
| 2008/0030614 A1 | 2/2008 | Schwab |
| 2008/0043832 A1 | 2/2008 | Barkley et al. |
| 2008/0046718 A1 | 2/2008 | Grab et al. |
| 2008/0046925 A1 | 2/2008 | Lee et al. |
| 2008/0052306 A1 | 2/2008 | Wang et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086570 A1 | 4/2008 | Dey et al. |
| 2008/0086747 A1 | 4/2008 | Rasanen et al. |
| 2008/0101466 A1 | 5/2008 | Swenson et al. |
| 2008/0101718 A1 | 5/2008 | Yang et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0120637 A1 | 5/2008 | Deiss |
| 2008/0126248 A1 | 5/2008 | Lee et al. |
| 2008/0131078 A1 | 6/2008 | Jeong et al. |
| 2008/0134043 A1 | 6/2008 | Georgis |
| 2008/0137541 A1 | 6/2008 | Agarwal et al. |
| 2008/0137736 A1 | 6/2008 | Richardson et al. |
| 2008/0137847 A1 | 6/2008 | Candelore et al. |
| 2008/0137848 A1 | 6/2008 | Kocher et al. |
| 2008/0151817 A1 | 6/2008 | Fitchett |
| 2008/0155615 A1 | 6/2008 | Craner et al. |
| 2008/0160911 A1 | 7/2008 | Chou et al. |
| 2008/0162949 A1 | 7/2008 | Sato et al. |
| 2008/0168516 A1 | 7/2008 | Flick et al. |
| 2008/0172441 A1 | 7/2008 | Speicher et al. |
| 2008/0177793 A1 | 7/2008 | Epstein et al. |
| 2008/0184119 A1 | 7/2008 | Eyal et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0196076 A1 | 8/2008 | Shatz et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0219449 A1 | 9/2008 | Ball et al. |
| 2008/0229025 A1 | 9/2008 | Plamondon |
| 2008/0240144 A1 | 10/2008 | Kruse et al. |
| 2008/0253454 A1 | 10/2008 | Imamura et al. |
| 2008/0256105 A1 | 10/2008 | Nogawa et al. |
| 2008/0263354 A1 | 10/2008 | Beuque et al. |
| 2008/0266522 A1 | 10/2008 | Weisgerber |
| 2008/0271102 A1 | 10/2008 | Kienzle et al. |
| 2008/0279535 A1 | 11/2008 | Haque et al. |
| 2008/0294453 A1 | 11/2008 | Baird-Smith et al. |
| 2008/0298358 A1 | 12/2008 | John et al. |
| 2008/0310454 A1 | 12/2008 | Bellwood et al. |
| 2008/0310496 A1 | 12/2008 | Fang |
| 2008/0313541 A1 | 12/2008 | Shafton et al. |
| 2008/0320100 A1 | 12/2008 | Pantos et al. |

(56) References Cited

U.S. PATENT DOCUMENTS

| | | |
|---|---|---|
| 2008/0320160 A1 | 12/2008 | Sitaraman et al. |
| 2009/0006302 A1 | 1/2009 | Chen |
| 2009/0010429 A1 | 1/2009 | Kim et al. |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0067367 A1 | 3/2009 | Buracchini et al. |
| 2009/0077143 A1 | 3/2009 | Macy, Jr. |
| 2009/0097644 A1 | 4/2009 | Haruki |
| 2009/0106082 A1 | 4/2009 | Senti et al. |
| 2009/0116821 A1 | 5/2009 | Shibamiya et al. |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0138570 A1 | 5/2009 | Miura et al. |
| 2009/0150406 A1 | 6/2009 | Giblin |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169001 A1 | 7/2009 | Tighe et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0249081 A1 | 10/2009 | Zayas |
| 2009/0265737 A1 | 10/2009 | Issa et al. |
| 2009/0268905 A1 | 10/2009 | Matsushima et al. |
| 2009/0276636 A1 | 11/2009 | Grab et al. |
| 2009/0282162 A1 | 11/2009 | Mehrotra et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0300204 A1 | 12/2009 | Zhang et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0002069 A1 | 1/2010 | Eleftheriadis et al. |
| 2010/0005393 A1 | 1/2010 | Tokashiki et al. |
| 2010/0040351 A1 | 2/2010 | Toma et al. |
| 2010/0057928 A1 | 3/2010 | Kapoor et al. |
| 2010/0058061 A1 | 3/2010 | Folta et al. |
| 2010/0058405 A1 | 3/2010 | Ramakrishnan et al. |
| 2010/0074324 A1 | 3/2010 | Qian et al. |
| 2010/0074333 A1 | 3/2010 | Au et al. |
| 2010/0082970 A1 | 4/2010 | Lindahl et al. |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142915 A1 | 6/2010 | Mcdermott et al. |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1 | 7/2010 | Ezure et al. |
| 2010/0185854 A1 | 7/2010 | Burns et al. |
| 2010/0186092 A1 | 7/2010 | Takechi et al. |
| 2010/0189183 A1 | 7/2010 | Gu et al. |
| 2010/0198943 A1 | 8/2010 | Harrang et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0235528 A1 | 9/2010 | Bocharov et al. |
| 2010/0250532 A1 | 9/2010 | Soroushian et al. |
| 2010/0262712 A1 | 10/2010 | Kim et al. |
| 2010/0278271 A1 | 11/2010 | MacInnis |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0316126 A1 | 12/2010 | Chen et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1 | 1/2011 | Yang et al. |
| 2011/0010466 A1 | 1/2011 | Fan et al. |
| 2011/0016225 A1 | 1/2011 | Park et al. |
| 2011/0022432 A1 | 1/2011 | Ishida et al. |
| 2011/0035517 A1 | 2/2011 | Minnick et al. |
| 2011/0047209 A1 | 2/2011 | Lindholm et al. |
| 2011/0055585 A1 | 3/2011 | Lee |
| 2011/0058675 A1 | 3/2011 | Brueck et al. |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082914 A1 | 4/2011 | Robert et al. |
| 2011/0082924 A1 | 4/2011 | Gopalakrishnan |
| 2011/0083009 A1 | 4/2011 | Shamoon et al. |
| 2011/0096828 A1 | 4/2011 | Chen et al. |
| 2011/0099594 A1 | 4/2011 | Chen et al. |
| 2011/0103374 A1 | 5/2011 | Lajoie et al. |
| 2011/0107379 A1 | 5/2011 | Lajoie et al. |
| 2011/0116772 A1 | 5/2011 | Kwon et al. |
| 2011/0119395 A1 | 5/2011 | Ha et al. |
| 2011/0126104 A1 | 5/2011 | Woods et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0145858 A1 | 6/2011 | Philpott et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0158470 A1 | 6/2011 | Martin et al. |
| 2011/0164679 A1 | 7/2011 | Satou et al. |
| 2011/0170408 A1 | 7/2011 | Furbeck et al. |
| 2011/0170687 A1 | 7/2011 | Hyodo et al. |
| 2011/0173345 A1 | 7/2011 | Knox et al. |
| 2011/0179185 A1 | 7/2011 | Wang et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197261 A1 | 8/2011 | Dong et al. |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0235801 A1 | 9/2011 | Peterka et al. |
| 2011/0238789 A1 | 9/2011 | Luby et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0246661 A1 | 10/2011 | Manzari et al. |
| 2011/0252118 A1 | 10/2011 | Pantos et al. |
| 2011/0264530 A1 | 10/2011 | Santangelo et al. |

(56) References Cited

U.S. PATENT DOCUMENTS

| | | |
|---|---|---|
| 2011/0268178 A1 | 11/2011 | Park et al. |
| 2011/0276555 A1 | 11/2011 | Fiero |
| 2011/0276695 A1 | 11/2011 | Maldaner et al. |
| 2011/0280307 A1 | 11/2011 | MacInnis et al. |
| 2011/0283012 A1 | 11/2011 | Melnyk |
| 2011/0291723 A1 | 12/2011 | Hashimoto |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0042090 A1 | 2/2012 | Chen et al. |
| 2012/0047542 A1 | 2/2012 | Lewis et al. |
| 2012/0066360 A1 | 3/2012 | Ghosh |
| 2012/0093214 A1 | 4/2012 | Urbach |
| 2012/0110120 A1 | 5/2012 | Willig et al. |
| 2012/0114302 A1 | 5/2012 | Randall |
| 2012/0124191 A1 | 5/2012 | Lyon |
| 2012/0134496 A1 | 5/2012 | Farkash et al. |
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0147958 A1 | 6/2012 | Ronca et al. |
| 2012/0155639 A1 | 6/2012 | Oney et al. |
| 2012/0166633 A1 | 6/2012 | Baumback et al. |
| 2012/0167132 A1 | 6/2012 | Mathews et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | Van Der Schaar |
| 2012/0179834 A1 | 7/2012 | Van Der Schaar et al. |
| 2012/0188069 A1 | 7/2012 | Colombo et al. |
| 2012/0189069 A1 | 7/2012 | Iannuzzelli et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0257678 A1 | 10/2012 | Zhou et al. |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0281767 A1 | 11/2012 | Duenas et al. |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1* | 12/2012 | Biderman .......... H04N 21/8456 709/219 |
| 2012/0311174 A1 | 12/2012 | Bichot et al. |
| 2012/0314778 A1 | 12/2012 | Salustri et al. |
| 2012/0317235 A1 | 12/2012 | Nguyen et al. |
| 2012/0331167 A1 | 12/2012 | Hunt |
| 2013/0007223 A1 | 1/2013 | Luby et al. |
| 2013/0013730 A1 | 1/2013 | Li et al. |
| 2013/0013803 A1 | 1/2013 | Bichot et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0051767 A1 | 2/2013 | Soroushian et al. |
| 2013/0051768 A1 | 2/2013 | Soroushian et al. |
| 2013/0054958 A1 | 2/2013 | Braness et al. |
| 2013/0054972 A1* | 2/2013 | Thorwirth ........ H04N 21/26258 713/176 |
| 2013/0055084 A1 | 2/2013 | Soroushian et al. |
| 2013/0058393 A1 | 3/2013 | Soroushian |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0080267 A1 | 3/2013 | McGowan |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0159633 A1 | 6/2013 | Lilly |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0169863 A1 | 7/2013 | Smith |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179589 A1 | 7/2013 | Mccarthy et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler et al. |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227111 A1 | 8/2013 | Wright et al. |
| 2013/0227122 A1 | 8/2013 | Gao et al. |
| 2013/0297602 A1 | 11/2013 | Soroushian et al. |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019592 A1 | 1/2014 | Arana et al. |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0096269 A1 | 4/2014 | Amidei et al. |
| 2014/0101722 A1 | 4/2014 | Moore |
| 2014/0114951 A1 | 4/2014 | Sasaki et al. |
| 2014/0115650 A1 | 4/2014 | Zhang et al. |
| 2014/0119432 A1 | 5/2014 | Wang |
| 2014/0140253 A1 | 5/2014 | Lohmar et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0149557 A1 | 5/2014 | Lohmar et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-jay et al. |
| 2014/0241421 A1 | 8/2014 | Orton-jay et al. |
| 2014/0247869 A1 | 9/2014 | Su et al. |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0355958 A1 | 12/2014 | Soroushian et al. |
| 2014/0359678 A1 | 12/2014 | Shivadas et al. |
| 2014/0359679 A1 | 12/2014 | Shivadas et al. |

(56) References Cited

U.S. PATENT DOCUMENTS

| | | |
|---|---|---|
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0019550 A1 | 1/2015 | Maharajh et al. |
| 2015/0026677 A1 | 1/2015 | Stevens et al. |
| 2015/0043554 A1 | 2/2015 | Meylan et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0281310 A1 | 10/2015 | Ziskind et al. |
| 2015/0288530 A1 | 10/2015 | Oyman |
| 2015/0288996 A1 | 10/2015 | Van Der Schaar et al. |
| 2015/0334435 A1 | 11/2015 | Shivadas et al. |
| 2015/0373421 A1 | 12/2015 | Chan et al. |
| 2016/0048593 A1 | 2/2016 | Soroushian et al. |
| 2016/0070890 A1 | 3/2016 | Grab et al. |
| 2016/0112382 A1 | 4/2016 | Kiefer et al. |
| 2016/0149981 A1 | 5/2016 | Van Der Schaar et al. |
| 2016/0219303 A1 | 7/2016 | Braness et al. |
| 2016/0323342 A1 | 11/2016 | Luby et al. |
| 2017/0011055 A1 | 1/2017 | Pitts |
| 2017/0026445 A1 | 1/2017 | Soroushian et al. |
| 2017/0041604 A1 | 2/2017 | Soroushian et al. |
| 2017/0083474 A1 | 3/2017 | Meswani et al. |
| 2017/0214947 A1 | 7/2017 | Kiefer et al. |
| 2017/0223389 A1 | 8/2017 | Soroushian et al. |
| 2017/0238030 A1 | 8/2017 | Ziskind et al. |
| 2017/0280203 A1 | 9/2017 | Chan et al. |
| 2018/0007451 A1 | 1/2018 | Shivadas et al. |
| 2018/0046949 A1 | 2/2018 | Kahn et al. |
| 2018/0060543 A1 | 3/2018 | Grab et al. |
| 2018/0081548 A1 | 3/2018 | Barzik et al. |
| 2018/0131980 A1 | 5/2018 | Van Der Schaar et al. |
| 2018/0220153 A1 | 8/2018 | Braness et al. |
| 2018/0255366 A1 | 9/2018 | Lockett et al. |
| 2018/0262757 A1 | 9/2018 | Naletov et al. |
| 2018/0278975 A1 | 9/2018 | Soroushian |
| 2018/0285261 A1 | 10/2018 | Mandal et al. |
| 2018/0332094 A1 | 11/2018 | Braness |
| 2019/0020907 A1 | 1/2019 | Kiefer et al. |
| 2019/0020928 A1 | 1/2019 | Chan et al. |
| 2019/0045219 A1 | 2/2019 | Braness et al. |
| 2019/0045220 A1 | 2/2019 | Braness et al. |
| 2019/0045234 A1 | 2/2019 | Kiefer et al. |
| 2019/0158553 A1 | 5/2019 | Van Der Schaar et al. |
| 2019/0268596 A1 | 8/2019 | Naletov et al. |
| 2019/0297364 A1 | 9/2019 | van der Schaar et al. |
| 2019/0342587 A1 | 11/2019 | Kiefer et al. |
| 2019/0356928 A1 | 11/2019 | Braness et al. |
| 2020/0059706 A1 | 2/2020 | Shivadas et al. |
| 2020/0137460 A1 | 4/2020 | Chan et al. |
| 2020/0186854 A1 | 6/2020 | Soroushian |
| 2020/0396451 A1 | 12/2020 | Soroushian et al. |
| 2020/0396454 A1 | 12/2020 | Naletov et al. |
| 2021/0021662 A1 | 1/2021 | Soroushian et al. |
| 2021/0076082 A1 | 3/2021 | Kiefer et al. |
| 2021/0099504 A1 | 4/2021 | Van Der Schaar et al. |
| 2021/0136429 A1 | 5/2021 | Van Der Schaar et al. |
| 2021/0250608 A1 | 8/2021 | Braness et al. |
| 2021/0250627 A1 | 8/2021 | Soroushian |
| 2021/0256095 A1 | 8/2021 | Grab et al. |
| 2021/0329347 A1 | 10/2021 | Chan et al. |
| 2023/0396820 A1 | 12/2023 | Kiefer et al. |
| 2024/0414369 A1 | 12/2024 | Braness et al. |

FOREIGN PATENT DOCUMENTS

| | | |
|---|---|---|
| CA | 2749170 A1 | 7/2010 |
| CA | 2749170 C | 6/2016 |
| CA | 2823829 C | 1/2019 |
| CN | 1169229 | 12/1997 |
| CN | 1221284 A | 6/1999 |
| CN | 1235473 A | 11/1999 |
| CN | 1629939 A | 6/2005 |
| CN | 1662952 A | 8/2005 |
| CN | 1723696 | 1/2006 |
| CN | 1756359 A | 4/2006 |
| CN | 1787422 A | 6/2006 |
| CN | 101252401 A | 8/2008 |
| CN | 101461149 A | 6/2009 |
| CN | 102138327 A | 7/2011 |
| CN | 102549557 A | 7/2012 |
| CN | 103858419 A | 6/2014 |
| CN | 103875248 A | 6/2014 |
| CN | 102549557 B | 9/2015 |
| CN | 105072454 A | 11/2015 |
| CN | 103875248 B | 9/2018 |
| CN | 108989847 A | 12/2018 |
| CN | 105072454 B | 4/2019 |
| CN | 108989847 B | 3/2021 |
| EP | 757484 A2 | 2/1997 |
| EP | 813167 A2 | 12/1997 |
| EP | 0818111 A1 | 1/1998 |
| EP | 0936812 A1 | 8/1999 |
| EP | 0818111 B1 | 1/2000 |
| EP | 1056273 A2 | 11/2000 |
| EP | 1158799 A1 | 11/2001 |
| EP | 1187483 A2 | 3/2002 |
| EP | 1335603 A2 | 8/2003 |
| EP | 1420580 A1 | 6/2004 |
| EP | 1453319 A1 | 9/2004 |
| EP | 1536646 A1 | 6/2005 |
| EP | 1553779 A1 | 7/2005 |
| EP | 1657835 A1 | 6/2006 |
| EP | 1283640 B1 | 10/2006 |
| EP | 1718074 A1 | 11/2006 |
| EP | 2180664 A1 | 4/2010 |
| EP | 2360923 A1 | 8/2011 |
| EP | 2384475 A1 | 11/2011 |
| EP | 2486517 A1 | 8/2012 |
| EP | 2486727 A1 | 8/2012 |
| EP | 2507995 A1 | 10/2012 |
| EP | 2564354 A1 | 3/2013 |
| EP | 2616991 A0 | 7/2013 |
| EP | 2617192 A0 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A4 | 4/2015 |
| EP | 2661875 B1 | 11/2019 |
| EP | 2661696 B1 | 6/2020 |
| EP | 3697096 A1 | 8/2020 |
| EP | 3700219 A1 | 8/2020 |
| EP | 3742740 A1 | 11/2020 |
| EP | 3697096 B1 | 1/2022 |
| EP | 3975574 A1 | 3/2022 |
| EP | 3742740 B1 | 5/2022 |
| EP | 4124048 A1 | 1/2023 |
| EP | 3700219 B1 | 6/2024 |
| FR | 2360923 | 8/2011 |
| GB | 2398210 A | 8/2004 |
| HK | 1125765 A | 8/2009 |
| HK | 1195183 B | 2/2018 |
| HK | 1260329 A | 12/2019 |
| HK | 1260329 B | 11/2021 |

(56) References Cited

FOREIGN PATENT DOCUMENTS

| | | | |
|---|---|---|---|
| JP | 08046902 A | 2/1996 |
| JP | 08111842 A | 4/1996 |
| JP | 08163488 A | 6/1996 |
| JP | 08287613 A | 11/1996 |
| JP | 09037225 A | 2/1997 |
| JP | H1175178 A | 3/1999 |
| JP | 11164307 A | 6/1999 |
| JP | 11275576 A | 10/1999 |
| JP | 11328929 A | 11/1999 |
| JP | 2000201343 A | 7/2000 |
| JP | 2001043668 A | 2/2001 |
| JP | 2001209726 A | 8/2001 |
| JP | 2001346165 A | 12/2001 |
| JP | 2002164880 A | 6/2002 |
| JP | 2002170363 A | 6/2002 |
| JP | 2002518898 A | 6/2002 |
| JP | 2002218384 A | 8/2002 |
| JP | 2003179597 A | 6/2003 |
| JP | 2003250113 A | 9/2003 |
| JP | 2004013823 A | 1/2004 |
| JP | 2004172830 A | 6/2004 |
| JP | 2004515941 A | 6/2004 |
| JP | 2004187161 A | 7/2004 |
| JP | 2004234128 A | 8/2004 |
| JP | 2004304767 A | 10/2004 |
| JP | 2004328218 A | 11/2004 |
| JP | 2005027153 | 1/2005 |
| JP | 2005504480 A | 2/2005 |
| JP | 2005080204 A | 3/2005 |
| JP | 2005173241 A | 6/2005 |
| JP | 2005284041 A | 10/2005 |
| JP | 2005286881 A | 10/2005 |
| JP | 2006155500 A | 6/2006 |
| JP | 2006521035 A | 9/2006 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2009508452 A | 2/2009 |
| JP | 2009522887 A | 6/2009 |
| JP | 2009530917 A | 8/2009 |
| JP | 4516082 B2 | 5/2010 |
| JP | 2012514951 A | 6/2012 |
| JP | 2013513298 A | 4/2013 |
| JP | 5200204 B2 | 6/2013 |
| JP | 2014506430 A | 3/2014 |
| JP | 5681641 | 1/2015 |
| JP | 5723888 B2 | 6/2015 |
| JP | 2015167357 A | 9/2015 |
| JP | 6038805 B2 | 12/2016 |
| JP | 6078574 B2 | 2/2017 |
| JP | 2017063453 | 3/2017 |
| JP | 2018160923 A | 10/2018 |
| JP | 6453291 B2 | 1/2019 |
| JP | 6657313 B2 | 2/2020 |
| JP | 202080551 A | 6/2020 |
| JP | 2021158694 A | 10/2021 |
| JP | 7000475 B2 | 12/2021 |
| KR | 100221423 B1 | 9/1999 |
| KR | 2002013664 | 2/2002 |
| KR | 20020064888 A | 8/2002 |
| KR | 20040039852 A | 6/2004 |
| KR | 20060030164 A | 4/2006 |
| KR | 20060106250 A | 10/2006 |
| KR | 20060116967 A | 11/2006 |
| KR | 100669616 B1 | 1/2007 |
| KR | 20070005699 A | 1/2007 |
| KR | 20070020727 A | 2/2007 |
| KR | 20090016282 A | 2/2009 |
| KR | 20100106418 A | 10/2010 |
| KR | 20110133024 A | 12/2011 |
| KR | 20130133830 | 12/2013 |
| KR | 20140056317 A | 5/2014 |
| KR | 101635876 B1 | 7/2016 |
| KR | 101874907 B1 | 7/2018 |
| KR | 101917763 B1 | 11/2018 |
| KR | 101928910 B1 | 12/2018 |
| KR | 10-1936142 B1 | 1/2019 |
| KR | 10-1981923 B1 | 5/2019 |
| KR | 10-1988877 B1 | 6/2019 |
| KR | 10-2020764 B1 | 9/2019 |
| KR | 10-2072839 | 1/2020 |
| KR | 10-2074148 B1 | 1/2020 |
| KR | 10-2086995 B1 | 3/2020 |
| KR | 10-2122189 B1 | 6/2020 |
| KR | 10-2140339 B1 | 7/2020 |
| KR | 10-2163151 B1 | 9/2020 |
| KR | 10-2187792 B1 | 12/2020 |
| KR | 10-2195414 B1 | 12/2020 |
| KR | 102191317 B1 | 12/2020 |
| KR | 10-2241867 B1 | 4/2021 |
| KR | 10-2274290 B1 | 7/2021 |
| KR | 10-2352043 B1 | 1/2022 |
| KR | 10-2363764 B1 | 2/2022 |
| KR | 10-2408120 B1 | 6/2022 |
| KR | 10-2414735 B1 | 6/2022 |
| KR | 102445689 B1 | 9/2022 |
| MX | 2011007344 A | 2/2012 |
| MX | 316584 B | 12/2013 |
| RU | 2328040 C2 | 6/2008 |
| SG | 146026 | 12/2010 |
| WO | 199501560 A1 | 6/1995 |
| WO | 9613121 | 6/1996 |
| WO | 199601311 | 6/1996 |
| WO | 199800973 A1 | 1/1998 |
| WO | 199703145 A3 | 4/1998 |
| WO | 199834405 A1 | 8/1998 |
| WO | 1998047290 | 10/1998 |
| WO | 199901086 A1 | 3/1999 |
| WO | 1999065239 A2 | 12/1999 |
| WO | 2000049762 A2 | 8/2000 |
| WO | 2000049763 A1 | 8/2000 |
| WO | 0104892 A1 | 1/2001 |
| WO | 2001031497 A1 | 6/2001 |
| WO | 2001050732 A2 | 7/2001 |
| WO | 2001065762 A2 | 9/2001 |
| WO | 2002001880 A2 | 1/2002 |
| WO | 2002008948 A2 | 1/2002 |
| WO | 200223315 A2 | 3/2002 |
| WO | 2003028293 | 4/2002 |
| WO | 2002035832 A2 | 6/2002 |
| WO | 2002037210 A2 | 6/2002 |
| WO | 2002054196 A2 | 7/2002 |
| WO | 2002054776 | 7/2002 |
| WO | 2002073437 A1 | 9/2002 |
| WO | 2002087241 A1 | 10/2002 |
| WO | 2003030000 A1 | 4/2003 |
| WO | 2003046750 A1 | 6/2003 |
| WO | 2003047262 A2 | 6/2003 |
| WO | 2003061173 A2 | 7/2003 |
| WO | 2003096136 A2 | 11/2003 |
| WO | 2004012378 A2 | 2/2004 |
| WO | 2004054247 A1 | 6/2004 |
| WO | 2004097811 A1 | 11/2004 |
| WO | 2004100158 A1 | 11/2004 |
| WO | 2004102571 A1 | 11/2004 |
| WO | 2005008385 A2 | 1/2005 |
| WO | 2005015935 A1 | 2/2005 |
| WO | 2005050373 A2 | 6/2005 |
| WO | 2005057906 A2 | 6/2005 |
| WO | 2005109224 A2 | 11/2005 |
| WO | 2005125214 A2 | 12/2005 |
| WO | 2006018843 A2 | 2/2006 |
| WO | 20060012398 A2 | 2/2006 |
| WO | 2006018843 A3 | 12/2006 |
| WO | 2007044590 A2 | 4/2007 |
| WO | 2007072257 A1 | 6/2007 |
| WO | 2007073347 A1 | 6/2007 |
| WO | 2007093923 A1 | 8/2007 |
| WO | 2007101182 A2 | 9/2007 |
| WO | 2007113836 A2 | 10/2007 |
| WO | 2008010275 A1 | 1/2008 |

(56) References Cited

FOREIGN PATENT DOCUMENTS

| | | | |
|---|---|---|---|
| WO | 2008032908 | A1 | 3/2008 |
| WO | 2008042242 | A2 | 4/2008 |
| WO | 2008086313 | A1 | 7/2008 |
| WO | 2008090859 | A1 | 7/2008 |
| WO | 2007113836 | A3 | 11/2008 |
| WO | 2008135932 | A2 | 11/2008 |
| WO | 2007113836 | B1 | 12/2008 |
| WO | 2009006302 | A1 | 1/2009 |
| WO | 2009065137 | A1 | 6/2009 |
| WO | 2009109976 | A2 | 9/2009 |
| WO | 2010005673 | | 1/2010 |
| WO | 2010060106 | A1 | 6/2010 |
| WO | 2010080911 | A1 | 7/2010 |
| WO | 2010089962 | A1 | 8/2010 |
| WO | 2010108053 | A1 | 9/2010 |
| WO | 2010111261 | A1 | 9/2010 |
| WO | 2010122447 | A1 | 10/2010 |
| WO | 2010147878 | A1 | 12/2010 |
| WO | 2010150470 | A1 | 12/2010 |
| WO | 2011042898 | A1 | 4/2011 |
| WO | 2011042900 | A1 | 4/2011 |
| WO | 2011053658 | A1 | 5/2011 |
| WO | 2011059274 | A2 | 5/2011 |
| WO | 2011059291 | A2 | 5/2011 |
| WO | 2011068668 | A1 | 6/2011 |
| WO | 2011086190 | A1 | 7/2011 |
| WO | 2011087449 | A1 | 7/2011 |
| WO | 2011093835 | A1 | 8/2011 |
| WO | 2011101371 | A1 | 8/2011 |
| WO | 2011102791 | A1 | 8/2011 |
| WO | 2011103364 | A1 | 8/2011 |
| WO | 2011132184 | A1 | 10/2011 |
| WO | 2011135558 | A1 | 11/2011 |
| WO | 2012035533 | A2 | 3/2012 |
| WO | 2012035534 | A2 | 3/2012 |
| WO | 2012035534 | A3 | 7/2012 |
| WO | 2012094171 | A1 | 7/2012 |
| WO | 20120094181 | A2 | 7/2012 |
| WO | 20120094189 | A1 | 7/2012 |
| WO | 2012035533 | A3 | 8/2012 |
| WO | 2012162806 | A1 | 12/2012 |
| WO | 2012171113 | A1 | 12/2012 |
| WO | 2013030833 | A1 | 3/2013 |
| WO | 2013032518 | A2 | 3/2013 |
| WO | 2013033334 | A1 | 3/2013 |
| WO | 2013033335 | A1 | 3/2013 |
| WO | 2013033458 | A3 | 5/2013 |
| WO | 2013103986 | A2 | 7/2013 |
| WO | 2013111126 | A2 | 8/2013 |
| WO | 2013032518 | A3 | 9/2013 |
| WO | 2013144942 | A1 | 10/2013 |
| WO | 2014145901 | A1 | 9/2014 |
| WO | 2014193996 | A2 | 12/2014 |
| WO | 2014193996 | A3 | 2/2015 |
| WO | 2015031982 | A1 | 3/2015 |
| WO | 2013111126 | A3 | 6/2015 |

OTHER PUBLICATIONS

U.S. Appl. No. 13/905,804, "Notice of Allowance," Aug. 12, 2015, 8 pgs.
3GPP TS 26.247, V10.1.0, 3rd Generation Partnership Project; Technical Specification Group Services and System Aspects Transparent end-to-end Packet-switches Streaming Services (PSS); Nov. 2011, 112 pages.
Broadq—The Ultimate Home Entertainment Software, printed May 11, 2009 from ittp://web.srchive.org/web/20030401122010/www.broadq.com/qcasttuner/, 1 pg.
Chinese Patent Application 201180060590.1 office action dated Aug. 6, 2015, 11 pgs.
Cloakware Corporation, "Protecting Digital Content Using Cloakware Code Transformation Technology", Version 1.2, May 2002, pp. 1-10.
Decision Granting Institution of Inter Partes Review 35 U.S.C. § 314, IPR2020-00558, U.S. Pat. No. 10,225,588, 46 pgs.
Declaration of Patrick McDaniel, Ph.D., Inter Partes Review of U.S. Pat. No. 10,225,588, IPR filed Feb. 15, 2020, 211 pgs.
EP11774529 Supplementary European Search Report, completed Jan. 31, 2014, 2 pgs.
European Search Report Application No. EP 08870152, Search Completed May 19, 2011, Mailed May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Examination report for GB1308663.2, dated May 18, 2016, 3 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, Mailed Oct. 5, 2016, 9 Pgs.
Extended European Search Report for European Application No. 19211286.0, Search completed Jul. 3, 2020, Mailed Jul. 13, 2020, 9 Pgs.
Extended European Search Report for European Application No. 19211291.0, Search completed Jul. 6, 2020, Mailed Jul. 14, 2020, 12 Pgs.
Extended European Search Report for European Application No. 21208230.9, Search completed Feb. 18, 2022, Mailed Mar. 1, 2022, 15 Pgs.
Extended European Search Report for European Application No. 20172313.7 Search completed Aug. 19, 2020 Mailed Aug. 27, 2020, 11 Pgs.
Federal Computer Week, "Tool Speeds Info to Vehicles", Jul. 25, 1999, 5 pages.
Filed Application and Filing Receipt for U.S. Appl. No. 61/359,748, Application filed Jun. 29, 2010, Receipt mailed Jul. 13, 2010, 38 pages.
Final draft ETSI ES 202 109, V1.1.1, Etsi Standard, Terrestrial Trunked Radio (TETRA); Security; Synchronization mechanism for end-to-end encryption, Oct. 2002, 17 pgs.
First Amended Complaint for Patent Infringement, *DivX, LLC* v. *Netflix, Inc.*, No. 2:19-cv-1602-PSG, Am. Compl. (C.D. Cal Aug. 21, 2019), 229 pgs, IPR filed Feb. 15, 2020.
Great Britain Application GB1308663.2 search report dated Jan. 5, 2017, 1 pg.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
Information Technology—MPEG Systems Technologies—Part 7: Common Encryption in ISO Base Media File Format Files (ISO/IEC 23001-7), Apr. 2015, 24 pgs.
Informationweek, "Internet on Wheels", InformationWeek: Front End: Daily Dose, Jul. 20, 1999, Printed on Mar. 26, 2014, 3 pgs.
International Preliminary Report for Application No. PCT/US2011/066927, Filed Dec. 22, 2011, Report Issued Jul. 10, 2013, 13 pgs.
International Preliminary Report for International Application No. PCT/US2011/067243, International Filing Date Dec. 23, 2011, Issued Jul. 10, 2013, 7 pgs.
International Preliminary Report on Patentability for International Application PCT/US14/30747, Report Issued Sep. 15, 2015, Mailed Sep. 24, 2015, 6 Pgs.
International Preliminary report on Patentability for International Application No. PCT/US2005/025845, report issued on Jun. 19, 2007, 6 pgs.
International Preliminary Report on Patentability for International Application No. PCT/US2007/063950, Report Completed Dec. 18, 2009, 3 pgs.

(56) References Cited

OTHER PUBLICATIONS

International Preliminary Report on Patentability for International Application No. PCT/US2008/083816, issued May 18, 2010, 6 pgs.
International Preliminary Report on Patentability for International Application No. PCT/US2010/56733, Issued Jun. 5, 2012, 5 pgs.
International Preliminary Report on Patentability for International Application No. PCT/US2011/068276, issue Mar. 4, 2014, 23 pgs.
International Preliminary Report on Patentability for International Application PCT/US2011/067167, Issued Feb. 25, 2014, 8 pgs.
International Preliminary Report on Patentability for International Application PCT/US2013/043181issued Dec. 31, 2014, Mailed Jan. 8, 2015, 11 Pgs.
International Preliminary Report on Patentability for International Application PCT/US2014/039852, issued Dec. 1, 2015, mailed Dec. 5, 2015, 8 Pgs.
International Preliminary Report on Patentability for International Application PCT/US2010/020372, Completed Oct. 6, 2011, 6 Pgs.
International Search Report and Written Opinion for International Application No. PCT/US07/63950, completed Feb. 19, 2008; mailed Mar. 19, 2008, 9 pgs.
International Search Report and Written Opinion for International Application No. PCT/US08/87999, completed Feb. 7, 2009, mailed Mar. 19, 2009, 6 pgs.
International Search Report and Written Opinion for International Application No. PCT/US09/46588, completed Jul. 13, 2009, mailed Jul. 23, 2009, 7 pgs.
International Search Report and Written Opinion for International Application No. PCT/US2004/041667, completed May 24, 2007, mailed Jun. 20, 2007, 6 pgs.
International Search Report and Written Opinion for International Application No. PCT/US2005/025845, completed Feb. 5, 2007 and mailed May 10, 2007, 8 pgs.
International Search Report and Written Opinion for International Application No. PCT/US2008/083816, completed Jan. 10, 2009, mailed Jan. 22, 2009, 7 pgs.
International Search Report and Written Opinion for International Application No. PCT/US2010/020372, Completed Feb. 10, 2009, Mailed Mar. 1, 2010, 8 pgs.
International Search Report and Written Opinion for International Application No. PCT/US2010/56733Completed Jan. 3, 2011, Mailed Jan. 14, 2011, 9 pgs.
International Search Report and Written Opinion for International Application No. PCT/US2011/067243, International Filing Date Dec. 23, 2011, Search Completed Apr. 24, 2012, Mailed May 8, 2012, 8 pgs.
International Search Report and Written Opinion for International Application No. PCT/US2013/043181, completed Nov. 27, 2013, mailed Dec. 6, 2013, 12 pgs.
International Search Report and Written Opinion for International Application PCT/US14/30747, completed Jul. 30, 2014, Mailed Aug. 22, 2014, 7 Pgs.
International Search Report and Written Opinion for International Application PCT/US14/39852, completed Oct. 21, 2014, mailed Dec. 5, 2014, 11 pgs.
International Search Report and Written Opinion for International Application PCT/US2011/066927, completed Apr. 3, 2012, Mailed Apr. 20, 2012, 14 pgs.
International Search Report and Written Opinion for International Application PCT/US2011/067167, completed Jun. 19, 2012, Mailed Jul. 2, 2012, 11 pgs.
International Search Report and Written Opinion for International Application PCT/US2011/068276, completed Jun. 19, 2013, Mailed Jul. 8, 2013, 24 pgs.
International Search Report and Written Opinion for PCT/US2013/020572, International Filing Date Jan. 7, 2013, Search Completed Mar. 19, 2013, Mailed Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ISO/IEC 14496-12 Information technology—Coding of audio-visual objects—Part 12: ISO base media file format, Amendment 3: DASH support and RTP reception hint track processing, 2011, 44 pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC CD 23001-6 MPEG systems technologies Part 6: Dynamic adaptive streaming over HTTP (DASH), Oct. 15, 2010, 70 pgs.
ISO/IEC DIS 23009-1, Information technology—Dynamic adaptive streaming over HTTP (DASH)—Part 1: Media presentation description and segment formats, dated Aug. 30, 2011, 132 pgs.
ISO/IEC FCD 23001-6 MPEG systems technologies Part 6: Dynamic adaptive streaming over HTTP (DASH), Jan. 28, 2011, 86 pgs.
ISO/IEC JTC1/SC29/WG11, MPEG/M18620, Oct. 2010, Text of ISO/IEC 23001-6: Dynamic adaptive streaming over HTTP (DASH), 72 pgs.
ISO/IEC JTC1/SC29/WG11, MPEG/N11578, Text of ISO/IEC 23001-6: Dynamic adaptive streaming over HTTP (DASH), Oct. 2010, 70 pgs.
ISO/IEC JTC1/SC29-WG11—Coding of Moving Pictures and Audio, MPEG2010/M18692, Jan. 2010, 10 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrlgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
LINKSYS®: "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs., pp. 8-1 to 8-20.
Microsoft Corporation, Advanced Systems Format (ASF) Specification, Revision Jan. 20, 2003, Dec. 2004, 121 pgs.
Microsoft Media Platform: Player Framework, "Microsoft Media Platform: Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
MPEG-DASH presentation at Streaming Media West 2011, Nov. 2011, 14 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
pc world.com, Future Gear: PC on the HiFi, and the TV, from http://www.pcworld.com/article/id,108818-page,1/article.html, printed May 4, 2007, from IDG Networks, 2 pgs.
Petition for Inter Partes Review of U.S. Pat. No. 10,225,588, IPR2020-00558, 96 pgs, IPR filed Feb. 15, 2020.

(56) References Cited

OTHER PUBLICATIONS

Pomelo, LLC Tech Memo, Analysis of Netflix's Security Framework for 'Watch Instantly' Service, Mar.-Apr. 2009, 18 pgs.
Power of Attorney—Hulu, LLC (IPR2020-00558), 4 pgs, IPR filed Feb. 15, 2020.
Power of Attorney—Netflix, Inc. (IPR2020-00558), 4 pgs, IPR filed Feb. 15, 2020.
Proceedings of the Second KDD Workshop on Large-Scale Recommender Systems and the Netflix Prize Competition, Las Vegas, Nevada, Aug. 24, 2008, 34 pgs.
Prosecution File History for U.S. Appl. No. 13/340,623 to Kiefer et al. ("Kiefer"), IPR filed Feb. 15, 2020, 1249 pgs., presented in 6 parts.
Prosecution File History for U.S. Pat. No. 10,225,588, IPR filed Feb. 15, 2020, 2937 pgs., presented in 29 parts.
QTV—About BroadQ, printed May 11, 2009 from http://www.broadq.com/en/about.php, 1 pg.
Search Report for Canadian patent application 2,816,621, dated Oct. 30, 2014, 6 pgs.
Search report for European Patent Application 11838186.2, dated Jul. 13, 2017, 6 pgs.
Server-Side Stream Repackaging (Streaming Video Technologies Panorama, Part 2), Jul. 2011, 15 pgs.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Supplementary European Search Report for European Application No. 07758499.3, Report Completed Jan. 25, 2013, 8 pgs.
Text of ISO/IEC 23001-6: Dynamic adaptive streaming over HTTP (DASH), Oct. 2010, 71 pgs.
U.S. Appl. No. 61/530,305, filed Sep. 1, 2011, 6 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Wayback Machine, Grooveshark—Features, All Your Music in One Place, printed Aug. 15, 16 from https://web.archive.org/web/20081013115837/http://www,grooveshark.com/features, 6 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over http (3GP-DASH) (Release 10), Mar. 2011, 72 pgs.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"Diagram | Matroska", Dec. 17, 2010, Retrieved from http://web.archive.org/web/201 01217114656/http://matroska.org/technical/diagram/index.html on Jan. 29, 2016, 5 pages Dec. 17, 2010.
"Draft CR: Trick Mode for HTTP Streaming", 3GPP TSG-SA4 Meeting #58, Apr. 26-30, 2010, Vancouver, Canada, S4-100237, 3 pgs.
"DVD-MPeg differences", printed Jul. 2, 2009 from http://dvd.sourceforge.net/dvdinfo/dvdmpeg.html, 1 pg.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Free music was never so cool before Grooveshark", Wayback Machine, Grooveshark, Startup Meme, May 31, 2008, printed Aug. 15, 2016 from https://web.archive.org/web/20080601173852/http://startupmeme.com/2008/05/31/free-music-was-never-so-wool-before-grooveshark/, 2 pgs.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"HTTP Live Streaming on the Leading Media CDN", Akamai website, retrieved from http://www.akamai.com/html/resources/http-live-streaming.html, 2015, accessed May 11, 2015, 5 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for . . . -a018239381, 6pg.
"Information Technology—Coding of audio-visual objects—Part 14: MP4 file format", International Standard, ISO/IEC 14496-14, First Edition, Nov. 15, 2003, 18 pages.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pages (presented in two parts).
"Information Technology—Coding of Audio Visual Objects—Part 2: Visual", International Standard, ISO/IEC 14496-2, Third Edition, Jun. 1, 2004, pp. 1-724. (presented in three parts).
"Information-Technology—Generic coding of moving pictures and associated audio: Systems, Recommendation H.222.0", International Standard, ISO/IEC 13818-1, Draft 1209, Apr. 25, 1995, 151 pages.
"Information-Technology—Generic coding of moving pictures and associated audio: Systems, Recommendation H.222.0", International Standard, ISO/IEC 13818-1, Draft 1540, Nov. 13, 1994, 161 pages.
"Instantly convert songs into tiny URLs with TinySong", Wayback Machine, Startup Memo Technology Blog, printed Aug. 15, 2016 from https://seb.archive.org/web/2008919133853/http://startupmeme.com/instantly-convert-songs-into-tiny-urls-with-tinysong/, 4pgs.
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"KISS Players, KISS DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010, 15 pgs.
"Matroska", Wikipedia, Jul. 10, 2017, retrieved from https://en.wikipedia.org/wiki/Matroska on Jul. 20, 2017, 3 pages.
"Matroska Streaming | Matroska", Retrieved from the Internet: URL:http://web.archive.org/web/201 0121711431 O/http://matroska.org/technical!streaming/index.html [retrieved on Jan. 29, 2016]Dec. 17, 2010.

(56) References Cited

OTHER PUBLICATIONS

"Media Delivery Solutions for Streaming Video and Software Delivery", Akamai website, Retrieved from http://www.akamai.com/html/solutions/media-delivery-solutions.html, 2015, Accessed May 11, 2015, 5 pgs.
"Microsoft Announces Breakthrough Technology Enabling Simple Access to Broad Set of Digital Content, Including Music, Games, Video, Ring Tones and Pictures", Microsoft, Feb. 12, 2017, Retrieved from https://news.microsoft.com/2007/02/12/microsoft-announces-breakthrough-technology-enabling-simple-access-to-broad-set-of-digital-content-including-music-games-video-ring-tones-and-pictures/, 5 pgs.
"Microsoft Smooth Streaming specification", Jul. 22, 2013, 56 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pages.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wikipedia, Jul. 10, 2017, retrieved from https://en.wikipedia.org/wiki/MPEG-4_Part_14 on Jul. 20, 2017, 5 pages.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 42 pgs.
"Pixel aspect ratio—Wikipedia", Nov. 24, 2010, pp. 1-8.
"QCast Tuner for PS2", printed May 11, 2009 from http://web.archive.org/web/20030210120605/www.divx.com/software/detail.php?ie=39, 2 pgs.
"SDMI Secure Digital Music Initiative", SDMI Portable Device Specification, Part 1, Version 1.0, Jul. 8, 1999, pp. 1-35.
"Series H: Audiovisual and Multimedia Systems Infrastructure of audiovisual services—Coding of moving video; High efficiency video coding", International Telecommunication Union, ITU-T H.265, Apr. 2015, 634 pages (presented in six parts).
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pages.
"Specifications Matroska", Dec. 17, 2010, [retrieved on Mar. 2, 2018], https://web.archive.org/web/20101217110959/http://matroska.org/technical/specs/index.html 12 pages.
"Supplementary European Search Report for Application No. EP 10834935, International Filing Date Nov. 15, 2010, Search Completed May 27, 2014, 9 pgs."
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.XML review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.
"Twitpic's Future", Twitpic, Oct. 25, 2014, Retrieved from: https://web.archive.org/web/20150521043642/https://blog.twitpic.com/index.html, 12 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What is Fliggo?", Wayback Machine, printed Aug. 15, 16 from https://web.archive.org/web/20080623065120/http://www.fliggo.com/about, 3 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
"DVD-Mpeg differences", printed on Jul. 2, 2009, http://dvd.sourceforge.net/dvdinfo/dvdmpeg.html, 1 pg.
U.S. Appl. No. 13/224,298, "Final Office Action Received", May 19, 2014, 26 pgs.
U.S. Appl. No. 13/905,804, "Non-Final Office Action Received", U.S. Appl. No. 13/905,804, "Non-Final Office Action Received", Jul. 25, 2014, 15 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Adams et al., "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al., "Optimized Adaptive HTTP Streaming for Mobile Devices", International Society for Optics and Photonics, Applications of Digital Image Processing XXXIV, vol. 8135, Sep. 2011, p. 8135OT.
Akhshabi et al., "An Experimental Evaluation of Rate-Adaptation Algorithms in Adaptive Streaming over HTTP", MMSys'11, Feb. 23-25, 2011, 12 pgs.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Author Unknown, "Blu-ray Disc—Blu-ray Disc—Wikipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, pp. 1-15.

(56) References Cited

OTHER PUBLICATIONS

Author Unknown, "O'Reilly—802.11 Wireless Networks: The Definitive Guide, Second Edition", printed Oct. 30, 2008 from http://oreilly.com/catalog/9780596100520, 2 pgs.

Author Unknown, "Tunneling QuickTime RTSP and RTP over HTTP", Published by Apple Computer, Inc.: 1999 (month unknown)6 pages.

Author Unknown, "Turbo-Charge Your Internet and PC Performance", printed Oct. 30, 2008 from Speedtest.net—The Global Broadband Speed Test, 1 pg.

Author Unknown, "White paper, The New Mainstream Wireless LAN Standard", Broadcom Corporation, Jul. 2003, 12 pgs.

Beker et al., "Cipher Systems, The Protection of Communications", 1982, 40 pgs.

Bell et al., "The BellKor 2008 Solution to the Netflix Prize", Netflix Prize, 2008, 21 pgs.

Blasiak, "Video Transrating and Transcoding: Overview of Video Transrating and Transcoding Technologies", Ingenient Technologies, TI Developer Conference, Aug. 6-8, 2002, 22 pgs.

Bloom et al., "Copy Protection for DVD Video", Proceedings of the IEEE, vol. 87, No. 7, Jul. 1999, pp. 1267-1276.

Bocharov et al, "Portable Encoding of Audio-Video Objects, The Protected Interoperable File Format (PIFF)", Microsoft Corporation, First Edition Sep. 8, 2009, 30 pgs.

Bocharov et al., "Portable encoding of audio-video objects: The Protected Interoperable File Format (PIFF)", Microsoft Corporation, Sep. 8, 2009, Revised: Mar. 9, 2010, 32 pgs.

Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC- L1003_v34, 12th Meeting: Geneva, CH, Jan. 14-23, 2013 (presented in three parts).

Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).

Cahill et al., "Locally Adaptive Deblocking Filter for Low Bit Rate Video", Proceedings 2000 International Conference on Image Processing, Sep. 10-13, 2000, Vancouver, BC, Canada, 4 pgs.

Candelore, U.S. Appl. No. 60/372,901, filed Apr. 17, 2002, 5 pgs.

Casares et al., "Simplifying Video Editing Using Metadata", DIS2002, 2002, pp. 157-166.

Catone, Josh "10 Ways to Share Music on Twitter", Mashable, May 29, 2009, Retrieved from: https://mashable.com/2009/05/29/twitter-music/#vJCdrVzNOOqx, 5 pgs.

Chaddha et al., "A Frame-work for Live Multicast of Video Streams over the Internet", Proceedings of 3rd IEEE International Conference on Image Processing, Sep. 19, 1996, Lausanne, Switzerland, 4 pgs.

Cheng, "Partial Encryption for Image and Video Communication", Thesis, Fall 1998, 95 pgs.

Cheng et al., "Partial encryption of compressed images and videos", IEEE Transactions on Signal Processing, vol. 48, No. 8, Aug. 2000, 33 pgs.

Chesler, Oliver "TinySong is like TinyURL for music", wire to the ear, Jun. 30, 2008, printed Aug. 15, 2016 from https://web.archive.org/web/20080907100459/http://www.wiretotheear.com/2008/06/30/tinysongis-like-tinyurl-for-music, 8 pgs.

Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.

Collet, "Delivering Protected Content, An Approach for Next Generation Mobile Technologies", Thesis, 2010, 84 pgs.

Concolato et al., "Live HTTP Streaming of Video and Subtitles within a Browser", MMSys 2013, Feb. 26-Mar. 1, 2013, Oslo, Norway, 5 pgs.

De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.

Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.

Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.

Dworkin, "Recommendation for Block Cipher Modes of Operation: Methods and Techniques", NIST Special Publication 800-38A, 2001, 66 pgs.

Eskicioglu et al., "An Integrated Approach to Encrypting Scalable Video", Proceedings IEEE International Conference on Multimedia and Expo, Aug. 26-29, 2002, Lausanne, Switzerland, 4 pgs.

Fang et al., "Real-time deblocking filter for MPEG-4 systems", Asia-Pacific Conference on Circuits and Systems, Oct. 28-31, 2002, Bail, Indonesia, pp. 541-544.

Fecheyr-Lippens, "A Review of HTTP Live Streaming", Internet Citation, Jan. 25, 2010, pp. 1-37.

Fielding et al., "Hypertext Transfer Protocol—HTTP1.1", Network Working Group, RFC 2616, Jun. 1999, 114 pgs.

Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.

Gannes, "The Lowdown on Apple's HTTP Adaptive Bitrate Streaming", GigaOM, Jun. 10, 2009, 12 pgs.

Garg et al., "An Experimental Study of Throughput for UDP and VoIP Traffic in IEEE 802.11b Networks", Wireless Communications and Networkings, Mar. 2003, pp. 1748-1753.

Gast, "When is 54 Not Equal to 54? A Look at 802.11a, b and g Throughput", Aug. 8, 2003, printed Oct. 30, 2008 from www.oreillynet.com/pub/a/wireless/2003/08/08/wireless_throughput.html, 4 pgs.

Ghosh, "Enhancing Silverlight Video Experiences with Contextual Data", Retrieved from: http://msdn.microsoft.com/en-us/magazine/ee336025.aspx, 2010,15 pgs.

Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.

Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.

Huang, U.S. Pat. No. 7,729,426, U.S. Appl. No. 11/230,794, filed Sep. 20, 2005, 143 pgs.

Huang et al., "Adaptive MLP post-processing for block-based coded images", IEEE Proceedings—Vision, Image and Signal Processing, vol. 147, No. 5, Oct. 2000, pp. 463-473.

Huang et al., "Architecture Design for Deblocking Filter in H.264/JVT/AVC", 2003 International Conference on Multimedia and Expo., Jul. 6-9, 2003, Baltimore, MD, 4 pgs.

Hunt, "Encoding for streaming", The Netflix Blog, Nov. 6, 2008, printed from https://web.archive.org/web/20081216044437/http://blog.netflix.com/2008/11/encoding-for-streaming.htm., retrieved on Feb. 8, 2022, 28 pgs.

Hurtado Guzman, "Development and Implementation of an Adaptive HTTP Streaming Framework for H264/MVC Coded Media", Politecnico di Torino, Nov. 2010, 108 pgs.

Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, pp. 131-140.

Inlet Technologies, "Adaptive Delivery to iDevices", 2010, 2 pages.

Inlet Technologies, "Adaptive delivery to iPhone 3.0", 2009, 2 pgs.

Inlet Technologies, "HTTP versus RTMP", 2009, 3 pages.

Inlet Technologies, "The World's First Live Smooth Streaming Event: The French Open", 2009, 2 pages.

(56) References Cited

OTHER PUBLICATIONS

I-O Data, "Innovation of technology arrived", Nov. 2004, Retrieved from http://www.iodata.com/catalogs/AVLP2DVDLA_Flyer200505. pdf, 2 pgs.
Jain et al., U.S. Appl. No. 61/522,623, filed Aug. 11, 2011, 44 pgs.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non-Stream Format Video Files", IEEE Transactions on Consumer Electronics, vol. 43, No. 3, Aug. 2001, 7 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee UniversityOct. 4, 2010, 66 pages.
Kim et al., "A Deblocking Filter with Two Separate Modes in Block-Based Video Coding", IEEE transactions on circuits and systems for video technology, vol. 9, No. 1, 1999, pp. 156-160.
Kim et al., "Tree-Based Group Key Agreement", Feb. 2004, 37 pgs.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20 website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Laukens, "Adaptive Streaming—A Brief Tutorial", EBU Technical Review, 2011, 6 pgs.
Legault et al., "Professional Video Under 32-bit Windows Operating Systems", SMPTE Journal, vol. 105, No. 12, Dec. 1996, 10 pgs.
Levkov, "Mobile Encoding Guidelines for Android Powered Devices", Adobe Systems Inc., Addendum B, Dec. 22, 2010, 42 pgs.
Lew et al., "Content-Based Multimedia Information Retrieval: State of the Art and Challenges", ACM Transactions on Multimedia Computing, Communications and Applications, Feb. 2006, vol. 2, No. 1, pp. 1-19.
Li et al., "Content-Aware Playout and Packet Scheduling for Video Streaming Over Wireless Links", IEEE Transactions on Multimedia, vol. 10, No. 5, Aug. 2008, pp. 885-895.
Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.
Lian et al., "Efficient video encryption scheme based on advanced video coding", Multimed. Tools Appl. vol. 38, 2008, pp. 75-89.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, pp. 907-911.
List et al., "Adaptive deblocking filter", IEEE transactions on circuits and systems for video technology, vol. 13, No. 7, Jul. 2003, pp. 614-619.
Liu et al., "A Formal Framework for Component Deployment", OOPSLA 2006, Proceedings of the 21st Annual ACM Sigplan Conference on Object-Oriented Programming Systems, Language, and Applications, Portland, Oregon, Oct. 22-26, 2006, pp. 325-344.
Lomas et al., "Educause Learning Initiative, Collaboration Tools", Educause Learning Initiative, Aug. 2008, ELI Paper 2: 2008, 11 pgs.
Long et al., "Silver: Simplifying Video Editing with Metadata", Demonstrations, CHI 2003: New Horizons, Apr. 5-10, 2003, pp. 628-629.
Massoudi et al., "Overview on Selective Encryption of Image and Video: Challenges and Perspectives", EURASIP Journal on Information Security, Nov. 2008, 18 pgs.
Matroska, "Diagram", Matroska, Technical/Info, Diagram, 2016, retrieved from https://www.matroska.org/technical/diagram/index.html on Jul. 20, 2017, 9 pages.
Matroska, "Specifications", Matroska, Technical/Info, Specifications, Jun. 25, 2017, retrieved from https://www.matroska.org/technical/specs/index.html on Jul. 20, 2017, 20 pages.
McCanne et al., "Receiver-driven Layered Multicast", Conference proceedings on Applications, technologies, architectures, and protocols for computer communications, Aug. 1996, 14 pgs.
Meier, "Reduction of Blocking Artifacts in Image and Video Coding", IEEE Transactions on Circuits and Systems for Video Technology, vol. 9, No. 3, Apr. 1999, pp. 490-500.
Miras, "On Quality Aware Adaptation of Internet Video", University of London, PhD dissertation, May 2004, 181 pgs.
Montes, "Muusic: mashup de servicios web musicales", Ingenieria Tecnica en Informatica de Gestion, Nov. 2008, 87 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
Nelson, "Smooth Streaming Deployment Guide", Microsoft Expression Encoder, Aug. 2010, 66 pgs.
Nelson, Mark "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.
Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pages.
Newton et al., "Preserving Privacy by De-identifying Facial Images", Carnegie Mellon University School of Computer Science, Technical Report, CMU-CS-03-119, Mar. 2003, 26 pgs.
Noboru, "Play Fast and Fine Video on Web! codec", Co.9 No. 12, Dec. 1, 2003, pp. 178-179.
Noe, "Matroska File Format (Under Construction!)", Internet Citation, Jun. 24, 2007, XP002617671, 51pgs. Retrieved from the Internet: URL:http://web.archive.org/web/20070821155146/www.matroska.org/technical/specs/matroska.pdf [retrieved on Jan. 19, 2011]Jun. 24, 2007, 1-51.
Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 20132 pages.
O'Brien, U.S. Appl. No. 60/399,846, filed Jul. 30, 2002, 27 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html.
O'Rourke, "Improved Image Decompression for Reduced Transform Coding Artifacts", IEEE Transactions on Circuits and Systems for Video Technology, vol. 5, No. 6, Dec. 1995, pp. 490-499.
Oyman et al, "Quality of Experience for HTTP Adaptive Streaming Services", IEEE Communications Magazine, Apr. 2012, vol. 50, No. 4, pp. 20-27, DOI: 10.1109/MCOM.2012.6178830.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Ozer, Jan "Adaptive Streaming in the Field", Streaming Media, Dec. 2010-Jan. 2011, pp. 36-47.
Padiadpu, Rashmi "Towards Mobile Learning: A SCORM Player for the Google Android Platform", Master Thesis, Hamburg University of Applied Sciences, 2008, 66 pgs.

(56) References Cited

OTHER PUBLICATIONS

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Pantos, R "HTTP Live Streaming: draft-pantos-http-live-streaming-06", Published by the Internet Engineering Task Force (IETF)Mar. 31, 2011, 24 pages.

Papagiannaki et al., "Experimental Characterization of Home Wireless Networks and Design Implications", INFOCOM 2006, 25th IEEE International Conference of Computer Communications, ProceedingsApr. 2006, 13 pgs.

Park et al., "A postprocessing method for reducing quantization effects in low bit-rate moving picture coding", IEEE Transactions on Circuits and Systems for Video Technology, vol. 9, No. 1, Feb. 1999, pp. 161-171.

Peek, David "Consumer Distributed File Systems", Dissertation, Doctor of Philosophy, Computer Science and Engineering, The University of Michigan, 2009, 118 pgs.

Pereira, "Security on Over the Top TV Services", Thesis, Nov. 2011, 114 pgs.

Phamdo, "Theory of Data Compression", printed on Oct. 10, 2003, 12 pgs.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.

Richardson, "H.264 and MPEG-4 Video Compression", Wiley, 2003, 306 pgs. (presented in 2 parts).

Rosenberg et al., "Indicating User Agent Capabilities in the Session Initiation Protocol (SIP)", Network Working Group, RFC 3840, Aug. 2004, 36 pgs.

Schulzrinne, H "Real Time Streaming Protocol 2.0 (RTSP): draft-ietfmmusic-rfc2326bis-27", MMUSIC Working Group of the Internet Engineering Task Force (IETF), 296 pgs. (presented in two parts)Mar. 9, 2011, 296 pages.

Sheu, Tsang-Ling et al., "Dynamic layer adjustments for SVC segments in P2P streaming networks", Computer Symposium (ICS), 2010, 2010 International, Tainan, Taiwan, R.O.C., pp. 793-7982010.

Siglin, "HTTP Streaming: What You Need to Know", streamingmedia.com, 2010, 15 pages.

Siglin, "Unifying Global Video Strategies, MP4 File Fragmentation for Broadcast, Mobile and Web Delivery", Nov. 16, 2011, 16 pgs.

Sima et al., "An Efficient Architecture for Adaptive Deblocking Filter of H.264 AVC Video Coding", IEEE Transactions on Consumer Electronics, vol. 50, No. 1, Feb. 2004, pp. 292-296.

Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.

Srinivasan et al., "Windows Media Video 9: overview and applications", Signal Processing: Image Communication, 2004, 25 pgs.

Stockhammer, "Dynamic Adaptive Streaming over HTTP—Standards and Design Principles", Proceedings of the second annual ACM conference on Multimedia, Feb. 2011, pp. 133-145.

Stockhammer, "MPEG's Dynamic Adaptive Streaming over HTTP (DASH)—An Enabling Standard for Internet TV", Qualcomm Incorporated, Apr. 11, 2015, Retrieved from the Internet, https://www.w3.org/2011/09/webtv/slides/W3C-Workshop.pdf, 30 pgs.

Tan, Yap-Peng et al., "Video transcoding for fast forward/reverse video playback" IEEE ICIP, 2002, pp. I-713 to I-716.

Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.

Timmerer et al., "HTTP Streaming of MPEG Media", Proceedings of Streaming Day, 2010, 4 pgs.

Tiphaigne et al., "A Video Package for Torch", Jun. 2004, 46 pgs.

Toscher et al., "The BigChaos Solution to the Netflix Prize 2008", Netflix Prize, Nov. 25, 2008, 17 pgs.

Trappe et al., "Key Management and Distribution for Secure Multimedia Multicast", IEEE Transaction on Multimedia, vol. 5, No. 4, Dec. 2003, pp. 544-557.

Tripathi et al, "Improving Multimedia Streaming with Content-Aware Video Scaling", Retrieved from: http://digitalcommons.WPI.edu/computerscience-pubs/96, 2001, 17 pgs.

Unknown, "AVI RIFF File Reference (Direct X 8.1 C++ Archive)", printed from http://msdn.microsoft.com/archive/en-us/dx81_c/directx_cpp/htm/aviriffilereference.asp?fr . . . on Mar. 6, 2006, 7 pgs.

Unknown, "Entropy and Source Coding (Compression)", TCOM 570, Sep. 1999, pp. 1-22.

Unknown, "MPEG-4 Video Encoder: Based on International Standard ISO/IEC 14496-2", Patni Computer Systems, Ltd., publication date unknown, 15 pgs.

Van Deursen et al., "On Media Delivery Protocols in the Web", 2010 IEEE International Conference on Multimedia and Expo, Jul. 19-23, 2010, 6 pgs.

Van Grove, Jennifer "Top 5 Ways to Share Videos on Twitter", Mashable, May 23, 2009, Retrieved from: https://mashable.com/2009/05/23/video-for-twitter/#Jvn9IIYy6qqA, 6 pgs.

Venkatramani et al., "Securing Media for Adaptive Streaming", Multimedia 2003 Proceedings of the Eleventh ACM International Conference on Multimedia, Nov. 2-8, 2003, Berkeley, California, 4 pgs.

Ventura, Guillermo Albaida "Streaming of Multimedia Learning Objects", AG Integrated Communication System, Mar. 2003, 101 pgs.

Waggoner, "Compression for Great Digital Video", 2002, 184 pgs.

Wang et al., "Image Quality Assessment: From Error Visibility to Structural Similarity", IEEE Transactions on Image Processing, Apr. 2004, vol. 13, No. 4, pp. 600-612.

Watanabem et al., "MPEG-2 decoder enables DTV trick plays", esearcher System LSI Development Lab, Fujitsu Laboratories Ltd., Kawasaki, Japan, Jun. 2001, 2 pgs.

Weng, "A Multimedia Socail-Networking Community for Mobile Devices", 2007, 30 pgs.

Wiegand, "Joint Video Team (JVT) of ISO/IEC MPEG and ITU-T VCEG", Jan. 2002, 70 pgs.

Willig et al., U.S. Appl. No. 61/409,285, filed Nov. 2, 2010, 43 pgs.

Wu, Feng et al., "Next Generation Mobile Multimedia Communications: Media Codec and Media Transport Perspectives", In China CommunicationsOct. 2006, pp. 30-44.

Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.

Yu et al., "Video deblocking with fine-grained scalable complexity for embedded mobile computing", Proceedings 7th International Conference on Signal Processing, Aug. 31-Sep. 4, 2004, pp. 1173-1178.

Zakhor, "Iterative Procedures for Reduction of Blocking Effects in Transform Image Coding", IEEE Transactions on Circuits and Systems for Video Technology, vol. 2, No. 1, Mar. 1992, pp. 91-95.

Zambelli, "IIS Smooth Streaming Technical Overview", Microsoft Corporation, Mar. 31, 2009, XP055009366, Retrieved from the Internet: URL:http://img.prodek.It/documents/IIS_Smooth_Streaming_Technical_Overview.pdf, 17pgs.

"3GPP TS 26.234 V9.5.0", 3rd Generation Partnership Project; Technical Specification Group Services and System Aspects; Transparent end-to-end Packet-switched Streaming Service; Protocols and codecs (Release 9), 2011.

"3GPP TS 26.234 V9.5.0 3rd Generation Partnership Project", Technical Specification Group Services and System Aspects; Transparent end-to-end Packet-switched Streaming Service (PSS); Protocols and codecs (Release 9), Mobile Competence Centre ; 650, Route Deslucioles ; F-06921 Sophia- Antipolis Cedex ; France, Dec. 14, 2010, No. V9.5.0, pp. 1-188, Xp050462053.

"3GPP TS 26.244 V9.3.0 3rd Generation Partnership Project", Technical Specification Group Services and System Aspects; Transparent end-to-end packet switched streaming service (PSS); 3GPP file format (3GP) (Release 9), Mobile Competence Centre ; 650, Route Deslucioles ; F-06921 Sophia-Antipolis Cedex;, France, Sep. 21, 2010, No. V9.3.0, pp. 1-55, XP050442116.

(56) References Cited

OTHER PUBLICATIONS

"Advanced Video Coding for Generic Audiovisual Services", International Telecommunication Union: ITU-T H.264, Mar. 1, 2010, pp. 1-676, XP055330362. (Presented in 2 Parts).
"Digital Video Broadcasting (DVB)", Gem 1.2.2 refactored for TM 80—mug_244_GEM_1.2.2, C/O Ebu—17a Ancienne Route—Ch-1218 Grand Saconnex, Geneva—Switzerland, Jun. 4, 2009, XP017802536.
Clean amended claims for U.S. Appl. No. 16/686,727, prepared Jun. 7, 2021.
Decision Granting Petitioner's Request on Rehearing 37 C.F.R. § 42.71(d) Granting Institution of Inter Partes Review 35 U.S.C. § 314, IPR2020-00614 U.S. Pat. No. 7,295,673, 29 pgs.
Declaration of Patrick McDaniel, Ph.D., Inter Partes Review of U.S. Pat. No. 9,184,920, Case No. IPR2020-00511, IPR filed Feb. 6, 2020, 168 pgs.
Defendant Hulu, LLC's Invalidity Contentions for U.S. Pat. Nos. 7,295,673; 8,139,651; 8,472,792; 9,270,720; 9,998,515; 10,212,486; 10,225,588, *DIVX, LLC* v. *Hulu, LLC*, Case No. 2:19-cv-1606-PSG-DFMx, C.D. Cal., Apr. 2, 2020, 136 pgs.
Defendant Netflix, Inc.'s Invalidity Contentions for U.S. Pat. Nos. 7,295,673; 8,139,651; 8,472,792; 9,270,720; 9,998,515; 10,212,486; 10,225,588; 9,184,920, *DIVX, LLC* v. *Netflix, Inc.*, Case No. 2:19-cv-1602-PSG-DFM, C.D. Cal., Apr. 2, 2020, 148 pgs.
Email from KPPB LLP to Malcolm Cribbs regarding U.S. Appl. No. 16/686,727, dated Jun. 7, 2021.
Email from KPPB LLP to Malcolm Cribbs regarding U.S. Appl. No. 16/686,727, dated May 13, 2021.
Email from KPPB LLP to Malcolm Cribbs regarding U.S. Appl. No. 16/686,727, dated May 17, 2021.
Email from KPPB LLP to Malcolm Cribbs regarding U.S. Appl. No. 16/686,727, dated May 18, 2021.
Extended European Search Report for European Application EP12828956.8, Report Completed Feb. 18, 2015, Mailed Mar. 2, 2015, 13 Pages.
Extended European Search Report for European Application No. 22196553.6, Search completed Dec. 1, 2022, Mailed Dec. 14, 2022, 13 Pgs.
International Preliminary Report on Patentability for International Application No. PCT/US2012/053052, Completed Mar. 4, 2014, 8 pgs.
International Preliminary Report on Patentability for International Application No. PCT/US2012/053223, Report Issued Mar. 4, 2014, 7 pgs.
International Search Report and Written Opinion for International Application No. PCT/US2012/053052, International Filing Date Aug. 30, 2012, Report Completed Oct. 25, 2012, Mailed Nov. 16, 2012, 9 pgs.
International Search Report and Written Opinion for International Application No. PCT/US2012/053223, International Filing Date Aug. 30, 2012, Report Completed Dec. 7, 2012, Mailed Mar. 7, 2013, 10 pgs.
International Search Report and Written Opinion for International Application PCT/US2012/053053, search completed Oct. 23, 2012, mailed Nov. 13, 2012, 11 pgs.
International Search Report for International Application No. PCT/SE2011/050166, Search completed Mar. 30, 2011, Mailed Mar. 30, 2011, 5 Pgs.
Marked amended claims for U.S. Appl. No. 16/686,727, prepared Jun. 7, 2021.
Order No. 40: Construing Certain Terms of the Asserted Claims of the Patent at Issue (Markman Claim Construction), Inv. No. 337-TA-1222, Mar. 12, 2021, 97 pgs.
Petition for Inter Partes Review of U.S. Pat. No. 9,184,920, IPR2020-00511, 89 pgs, IPR filed Feb. 6, 2020.
Power of Attorney—Netflix, Inc. (IPR2020-00511), IPR filed Feb. 6, 2020, 3 pgs.
Proposed examiner amendments for U.S. Appl. No. 16/686,727, prepared May 13, 2021.
Proposed examiner amendments for U.S. Appl. No. 16/686,727, prepared May 17, 2021.
Proposed examiner amendments for U.S. Appl. No. 16/686,727, prepared May 18, 2021.
""3GPP TS 26.247, V10.1.0", 3rd Generation Partnership Project;", Technical Specification Group Services and System Aspects; Transparent end-to-end Packet-switches Streaming Services (PSS); Progressive Download and Dynamic Adaptive Streaming over http (3GP-DASH), (Release 10), Advanced Lte, Jun. 2011, 94 pages.
"Adaptive HTTP Streaming in PSS-Client Behaviour", S4-AHI129, 3GPP TSG-SA4 Ad-Hoc Meeting, Dec. 14-16, 2009, Paris, France; section 12.6.1.
"Adaptive HTTP Streaming in PSS-Data Formats for HTTP-Streaming excluding MPD", S4-AHI128, 3GPP TSGSA4 Ad-Hoc Meeting, Dec. 14-16, 2009, Paris, France; sections 12.2.1 and 12.2.4.2.1.
"Adaptive HTTP Streaming in PSS-Discussion on Options", S4-AHI130, 3GPP TSG-SA4 Ad-Hoc Meeting, Dec. 14-16, 2009, Paris, France; sections 1, 2.7-2.8, and 2.16-2.19.
"Adobe Flash Video File Format Specification", Aug. 2010, Version 10.1, 89 pages.
"Broadcom BCM7413 Product Brief", Dec. 11, 2008, 2 pgs.
"Common Interface Specification for Conditional Access and other Digital Video Broadcasting Decoder Applications", European Standard, EN 50221, Feb. 1997, 86 pgs.
"Fragmented Time Indexing of Representations", S4-AHI126, 3GPP TSG-SA4 Ad-Hoc Meeting, Dec. 14-16, 2009, Paris, France, 4 pgs.
"Server 'Trick Play' support for MPEG-2 Transport Stream Files", www.live555.com/liveMedia/transport-stream-trick-play.html, 2006, Dec. 31, 2020, 1 pg.
"SWF and FLV File Format Specification", Adobe, Jun. 2007, Version 9, 298 pages.
"The LIVE555 Media Server", www.live555.com/mediaServer/#about, 2006, printed Dec. 31, 2020, 3 pgs.
"Transparent end-to-end packet switched streaming service (PSS); 3GPP file format (3GP) (Release 9)", 3GPP TS 26.244 V9.0.0 (Dec. 2009), sections 7.1-7.4., 52 pgs.
"Video File Format Specification", Adobe, Apr. 2008, Version 9, 46 pages.
ADB, "ADB-3800W Datasheet", 2007, 2 pgs.
Agi et al., "An Empirical Study of Secure MPEG Video Transmissions", IEEE, Mar. 1996, 8 pgs., DOI: 10.1109/NDSS.1996.492420.
Ahmed et al., "An Efficient Chaos-Based Feedback Stream Cipher (ECBFSC) for Image Encryption and Decryption", Informatica, Mar. 2007, vol. 31, No. 1, pp. 121-129.
Arachchi et al., "Adaptation-aware encryption of scalable H.264/AVC for content security", Signal Processing: Image Communication, Jul. 2009, vol. 24, pp. 468-483, doi:10.1016/j.image.2009.02.004.
But, "Limitations of existing MPEG-1 ciphers for streaming video", vol. 40429. Technical Report CAIA, 2004, 7 pgs.
Conklin et al., "Video coding for streaming media delivery on the Internet", IEEE Transactions on Circuits and Systems for Video Technology, Mar. 2001, vol. 11, No. 3, pp. 269-281.
Deshpande et al., "Scalable Streaming of JPEG2000 Images Using Hypertext Transfer Protocol", MULTIMEDIA '01: Proceedings of the Ninth ACM International Conference on Multimedia, Oct. 2001, pp. 372-381. https://doi.org/10.1145/500141.500197.
Entone, "Amulet High Definition IP Television Receiver User's Guide", 2008, 28 pgs.
Entone, "Hydra Hd Ip Video Gateway", 2008, 2 pgs.
ETSI, "Digital Video Broadcasting (DVB) Support for use of scrambling and Conditional Access (CA) within digital broadcasting systems", Oct. 1996, 13 pgs.
ETSI, "Digital Video Broadcasting (DVB); Implementation guidelines for the use of Video and Audio Coding in Contribution and Primary Distribution Applications based on the MPEG-2 Transport Stream", ETSI TS 102 154 V1.2.1, May 2004, 73 pgs.
Fahmi et al., "Proxy Servers for Scalable Interactive Video Support", Computer, Sep. 2001, vol. 45, No. 9, pp. 54-60, https://doi.org/10.1109/2.947092.

(56) References Cited

OTHER PUBLICATIONS

Fitzek et al., "A Prefetching Protocol for Continuous Media Streaming in Wireless Environments", IEEE Journal on Selected Areas in Communications, Oct. 2001, vol. 19, No. 10, pp. 2015-2028, DOI: 10.1109/49.957315.
Ho, "Digital Video Broadcasting Conditional Access Architecture", Report prepared for CS265-Section 2, Fall 2002, Prof Stamp, 7 pgs.
INCITS/ISO/IEC, "Information Technology—Generic Coding of Moving Pictures and Associated Audio Information: Video (Formerly ANSI/ISO/IEC 13818-2-2000)", Second edition, Dec. 15, 2000, 220 pgs., (presented in two parts).
ISMA, "ISMA Encryption and Authentication, Version 1.1, AREA / Task Force: DRM", Internet Streaming Media Alliance, Sep. 15, 2006, pp. 1-64.
ITU-T, "Series J: Cable Networks and Transmission of Television, Sound Programme and Other Multimedia Signals", Technical method for ensuring privacy in long-distance international MPEG-2 television transmission conforming to ITU-T J.89, ITU-T Recommendation J.96, Mar. 2001, 34 pgs.
Kabir, "Scalable and Interactive Multimedia Streaming Over the Internet", Thesis, 2005, 207 pgs.
Krikor et al., "Image Encryption Using DCT and Stream Cipher", European Journal of Scientific Research, Jan. 2009, vol. 32, No. 1, pp. 48-58.
Lian et al., "Recent Advances in Multimedia Information System Security", Informatica, Jan. 2009, vol. 33, pp. 3-24.
Lian et al., "Selective Video Encryption Based on Advanced Video Coding", PCM, Nov. 2005, Part II, LNCS 3768, pp. 281-290.
Lievaart, "Characteristics that differentiate CA Systems", Irdeto access, Nov. 2001, 5 pgs.
Lloyd, "Supporting Trick Mode Playback Universally Across the Digital Television Industry", Thesis, 2005, 111 pgs.
Macaulay et al., "WHITEPAPER—IP Streaming of MPEG-4: Native RTP vs MPEG-2 Transport Stream", Envivio, Oct. 2005, 12 pgs.
Martin et al., "Privacy Protected Surveillance Using Secure Visual Object Coding", IEEE Transactions on Circuits and Systems for Video Technology, Aug. 2008, vol. 18, No. 8, pp. 1152-1162, DOI: 10.1109/TCSVT.2008.927110.
Meyer et al., "Security mechanisms for Multimedia-Data with the Example MPEG-I-Video", SECMPEG, 1992, 10 pgs.
Molavi et al., "A Security Study of Digital TV Distribution Systems", Thesis, Jun. 2005, 112 pgs.
Nelson, "The Data Compression Book", M&T Publishing, 1992, 533 pgs., (presented in two parts).
OIPF Open Forum, "OIPF Release 1 Specification, vol. 3, Content Metadata", OIPF, Oct. 8, 2009, vol. 1.1, 47 pgs.
OIPF Open Forum, "OIPF Release 1 Specification, vol. 7—Authentication, Content Protection and Service Protection", OIPF, Oct. 8, 2009, vol. 1.1, 88 pgs.
Open IPTV Forum, "Functional Architecture", Jan. 16, 2008, vol. 1.1, 141 pgs.
Open IPTV Forum, "OIPF Release 1 Specification, vol. 1—Overview", OIPF, Oct. 8, 2009, vol. 1.1, 48 pgs.
Open IPTV Forum, "OIPF Release 1 Specification, vol. 2, Media Formats", OIPF, Oct. 8, 2009, vol. 1.1, 22 pgs.
Park et al., "An Efficient Encryption and Key Management Scheme for Layered Access Control of H.265/Scalable Video Coding", IEICI Trans. Inf. & Syst., May 2009, vol. E92-D, No. 5, pp. 851-858, DOI: 1031587/transinf.E92.D.851.
Park et al., "Combined Scheme of Encryption and Watermarking in H.264/Scalable Video Coding", New Directions in Intelligent Interactive Multimedia, SCI 142, 2008, pp. 351-361.
Qiao et al., "Comparison of MPEG Encryption Algorithms", Comput. & Graphics, 1998, vol. 22, No. 4, pp. 437-448.
Raj et al., "Server Side Trick Play for Video Streaming", 2009 IEEE International Conference on Multimedia and Expo, Jun. 28, 2009, 4 pgs.
Raju et al., "Fast and Secure Real-Time Video Encryption", Sixth Indian Conference on Computer Vision, Graphics & Image Processing, Jan. 2009, pp. 257-264, doi:10.1109/ACVGIP.2008.100.
Senoh et al., "DRM Renewability & Interoperability", IEEE Xplore, Conference: Consumer Communications and Networking Conference, 2004, Feb. 2004, pp. 424-429, DOI: 10.1109/CCNC.2004.1286899.
Shojania et al., "Experiences with MPEG-4 Multimedia Streaming", CiteSeer, Jan. 2001, 3 pgs., DOI: 10.1145/500141.500221.
Symes, "Video Compression Demystified", McGraw-Hill, 2001, 353 pgs., (presented in two parts).
Taymans et al., "GStreamer Application Development Manual (1.6.0)", 2007, 159 pgs.
Thomas et al., "A Novel Secure H.264 Transcoder Using Selective Encryption", Proceedings in International Conference on Image Processing, Jan. 2007, vol. 4, pp. IV-85-IV-88, DOI: 10.1109/ICIP.2007.4379960.
Tosun et al., "Efficient multi-layer coding and encryption of MPEG video streams", 2000 IEEE International Conference on Multimedia and Expo. ICME2000. Proceedings. Latest Advances in the Fast Changing World of Multimedia (Cat. No.00TH8532), Jul. 30-Aug. 2, 2000, pp. 119-122, DOI: 10.1109/ICME.2000.869559.
Um, "Selective Video Encryption of Distributed Video Coded Bitstreams and Multicast Security over Wireless Networks", Thesis, Aug. 2006, 142 pgs.
Wang, "Lightweight Encryption in Multimedia", Thesis, Jun. 2005, 184 pgs.
Watson, "Input for DASH EE#1 (CMP): Pixel Aspect Ratio", 94. MPEG Meeting; Oct. 11, 2010-Oct. 15, 2010; Guangzhou; (Motion Picture Expert Group or ISO/IEC JTC1/SC29/ WG11), No. M18498, Oct. 28, 2010 (Oct. 28, 2010), XP030047088, Oct. 2, 2010, 4 Pages.
Wong, "Web Client Programming with Perl", 1997, printed Jan. 8, 2021 from: https://www.oreilly.com/openbook-webclientch03.html, 31 pgs.
Wu, "A Fast MPEG Encryption Algorithm and Implementation of AES on CAM", Thesis, Oct. 6, 2003, 91 pgs.
Yang et al., "Projection-Based Spatially Adaptive Reconstruction of Block-Transform Compressed Images", IEEE Transactions on Image Processing, vol. 4, No. 7, Jul. 1995, pp. 896-908.
Yuksel, "Partial Encryption of Video for Communication and Storage", Thesis, Sep. 2003, 78 pgs.
Zhang et al., "Implementing Hierarchical Trick Play for HTTP Video Streaming", Globecom Workshops (GC WKSHPS), 2010 IEEE, Ieee, Piscataway, NJ, USA, Dec. 6, 2010, pp. 465-468, XP031859257, ISBN: 978-1-4244-8863-6.
Prosecution File History for U.S. Pat. No. 9,184,920, IPR filed Feb. 6, 2020, 1756 pgs., presented in 36 parts.

\* cited by examiner

```
<?xml version="1.0" encoding="utf 8"?>
<smil xmlns="http://www.w3.org/ns/SMIL" version="3.0" baseProfile="Language">
<head />
```
501

PROFILE MSG 500

`<body>`

510

```
Trick Play -> video id="level3"
```

502
```
<video id="level1" systemBitrate="400000" width="768" height="432">
    <param name="vbv" value="3200000" valuetype="data" />
    <param name="mime" value="V_MPEG4/ISO/AVC" valuetype="data" />
</video>
```

504
```
<video id="level2"  systemBitrate="600000" width="768" height="432">
    <param name="vbv" value="4800000" valuetype="data" />
    <param name="mime" value="V_MPEG4/ISO/AVC" valuetype="data" />
</video>
```

505
```
<video id="level3"  systemBitrate="150000" width="768" height="432">
    <param name="mime" value="V_MPEG4/ISO/AVC" valuetype="data" />
</video>
```

```
</switch>
</excl>
```
606
```
<audio id ="audio1" xml:lang="und">
    <param name="reservedBandwidth" value="192000" valuetype="data" />
    <param name="mime" value="A_AAC" valuetype="data" />
</audio>
```

```
</body>
</smil>
```

FIG. 5

```xml
<?xml version="1.0" encoding="utf-8"?>
<smil xmlns="http://www.w3.org/ns/SMIL" version="3.0" baseProfile="Tiny">
<head />
```
                                                        601

```xml
<body>
  <excl>                            PLAYLIST MSG 600
    <seq>
```
602  `<video id="level1" src="http://10.180.14.232/l140.mkv" clipBegin ="40" clipEnd = "42">`
     `<param name="mediaSize" value="3200" valuetype="data" />`
     `</video>`

604  `<video id="level1" src="http://10.180.14.232/l142.mkv" clipBegin="42" clipEnd="44">`
     `<param name="mediaSize" value="2354" valuetype="data" />`
     `</video>`

606  `<video id="level1" src="http://10.180.14.232/l144.mkv" clipBegin="44" clipEnd="46">`
     `<param name="mediaSize" value="3750" valuetype="data" />`
     `</video>`

608  `<video id="level1" src="http://10.180.14.232/l146.mkv" clipBegin="46" clipEnd="48">`
     `<param name="mediaSize" value="4521" valuetype="data" />`
     `</video>`

```xml
    </seq>
  </excl>
  <seq>
```
          610
     `<audio id="audio1" src="http://10.180.14.232/a140.mkv" clipBegin ="40" clipdEnd="42">`
     `<param name="mediaSize" value="764" valuetype="data" />`
     `</audio>`

```xml
  </seq>
</body>
</smil>
```

FIG. 6

NETWORK VIDEO STREAMING WITH TRICK PLAY BASED ON SEPARATE TRICK PLAY FILES

CROSS-REFERENCE TO RELATED APPLICATION

The current application is a continuation of U.S. patent application Ser. No. 16/665,652 entitled "Network Video Streaming with Trick Play Based on Separate Trick Play Files" to Shivadas et al., filed Oct. 28, 2019, which is a continuation of U.S. patent application Ser. No. 15/651,817 entitled "Network Video Streaming with Trick Play Based on Separate Trick Play Files" to Shivadas et al., filed Jul. 17, 2017 and issued as U.S. Pat. No. 10,462,537 on Oct. 29, 2019, which is a continuation of U.S. patent application Ser. No. 14/810,345 entitled "Network Video Streaming with Trick Play Based on Separate Trick Play Files" to Shivadas et al., filed Jul. 27, 2015 and issued as U.S. Pat. No. 9,712,890 on Jul. 18, 2017, which is a continuation of U.S. patent application Ser. No. 13/905,852 entitled "Network Video Streaming with Trick Play Based on Separate Trick Play Files" to Shivadas et al., filed May 30, 2013 and issued as U.S. Pat. No. 9,094,737 on Jul. 28, 2015, the disclosures of which are hereby incorporated by reference in their entireties.

BACKGROUND

Distribution of multimedia video (also referred to herein as "media" and/or "program(s)"), such as movies and the like, from network services to a client device, may be achieved through adaptive bitrate streaming of the video. Prior to streaming, the video may be encoded at different bitrates and resolutions into multiple bitrate streams that are stored in the network services. Typically, each of the bitstreams includes time-ordered segments of encoded video.

Adaptive bitrate streaming includes determining an available streaming bandwidth at the client device, and then downloading a selected one of the different bitrate streams from the network services to the client device based on the determined available bandwidth. While streaming, the client device downloads and buffers the successive encoded video segments associated with the selected bitstream. The client device decodes the buffered encoded video segments to recover the video therein, and then plays back the recovered video on the client device, e.g., in audio-visual form.

In normal playback, the client device plays back the video recovered from each of the buffered segments in the order in which the video was originally encoded, i.e., in a forward direction. The client device may offer playback modes or features in addition to normal playback. Such additional playback features may include rewind, fast forward, skip, and so on, as is known.

The additional playback features are referred to herein as trick play features. In order to implement trick play features, such as rewind, the client device requires access to video that has already been played. Therefore, the client device may be required to store large amounts of already downloaded and played video in order to meet the demands of a selected trick play feature. However, many client devices, especially small, hand-held devices, have limited memory capacity and, therefore, may be unable to store the requisite amount of video.

BRIEF DESCRIPTION OF THE DRAWINGS

FIG. 5 is an example Profile message used in streaming.

FIG. 6 is an example Playlist message used in streaming.

Figure 1:
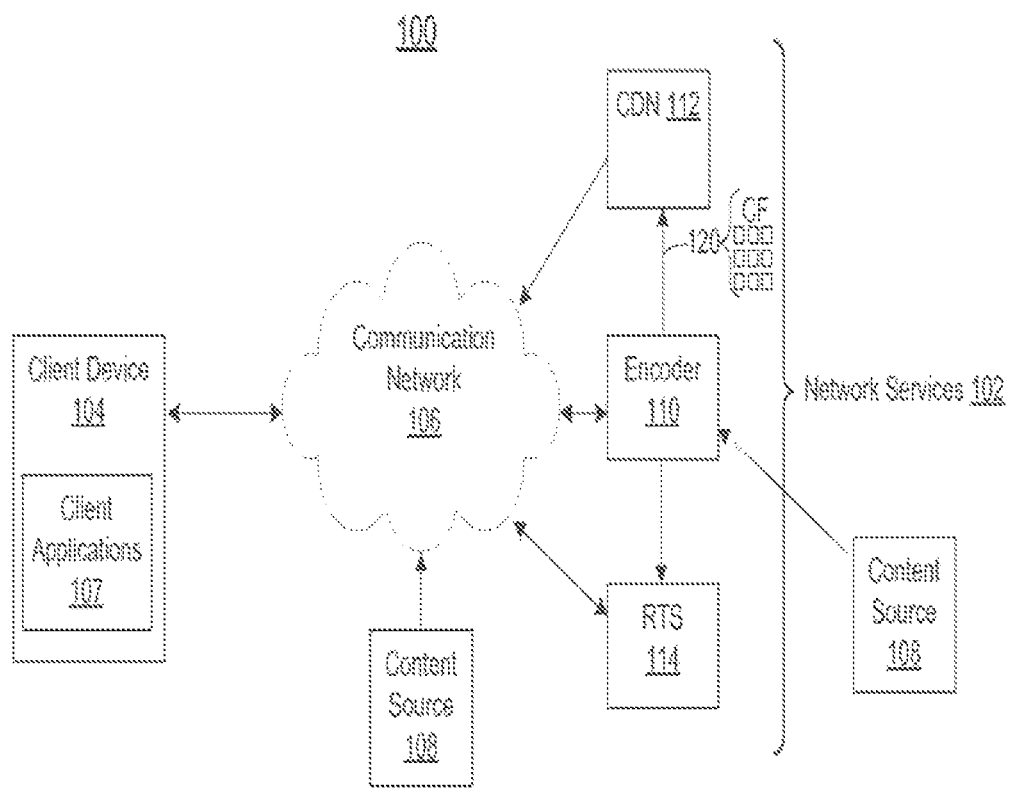
FIG. 1 is a block diagram of an example network environment that supports adaptive bitrate streaming of multimedia content, such as video, with trick play features.

In the drawings, the leftmost digit(s) of a reference number identifies the drawing in which the reference number first appears.

DETAILED DESCRIPTION

| | TABLE of Contents | |
|---|---|---|
| 1 | Network Environment | -4- |
| 2 | Container Files-Streaming Sources | -8- |
| 2.1 | Encoded Video Frame Structure | -12- |
| 3 | Sequence Diagram | -14- |
| 3.1 | Start-up | -14- |
| 3.2 | Normal Streaming and Playback | -16- |
| 3.3 | Trick Play | -17- |
| 4 | Profile and Playlist Messages | -19- |
| 4.1 | Profile Message | -19- |
| 4.2 | Playlist Message | -20- |
| 5 | Method Flowcharts | -21- |
| 5.1 | Network Side | -21- |
| 5.2 | Client Side | -22- |
| 6 | Systems | -24- |

1 Network Environment

FIG. 1 is a block diagram of an example network environment 100 that supports adaptive bitrate streaming of multimedia content with trick play features. Network services 102 encode multimedia content, such as video, into multiple adaptive bitrate streams of encoded video and a separate trick play stream of encoded video to support trick play features. The trick play stream may be encoded at a lower encoding bitrate and a lower frame than each of the adaptive bitrate streams. The adaptive bitrate and trick play streams are stored in network services 102. For normal content streaming and playback, a client device 104 downloads a selected one of the adaptive bitrate streams from network services 102 for playback at the client device. When a user of client device 104 selects a trick play feature, such as rewind, the client device 104 downloads the trick play stream from network services 102 for trick play playback.

Environment 100 supports trick play features in different adaptive bitrate streaming embodiments, including on-demand streaming, live streaming, and real-time streaming embodiments. On-demand streaming includes encoding the content of a program from start to end in its entirety and then, after the entire program has been encoded, streaming, i.e., downloading, the encoded program to a client device. An example of on-demand streaming includes streaming a movie from a Video-on-Demand (VOD) service to a client device.

Live streaming includes encoding successive blocks of live content, i.e., a live program, as they are received from a content source, and then streaming each encoded block as it becomes available for download. Live streaming may include streaming live scenes, i.e., video, captured with a video camera.

Real-time streaming is similar in most aspects to live streaming, except that the input to real-time streaming is not a live video feed. Rather, the input, or source, may include successive encoded blocks, or input blocks, that have a format not suitable for streaming (e.g., for a given system) and must, therefore, be decoded and re-encoded (i.e., transcoded) into an encoded format that is suitable for streaming (in the given system). Real-time streaming handles the successive incompatible input blocks similar to the way live streaming handles the successive blocks of live content.

Network environment 100 is now described in detail. Network environment 100 includes server-side or network services 102 (also referred to simply as "services 102") and client-side device 104. Network services 102 may be implemented as Internet cloud-based services. Network services 102 interact and cooperate with each other, and with client device 104, to manage and distribute, e.g., stream, multimedia content from content sources 108 to the client devices, over one or more communication network 106, such as the Internet. Network services 102 communicate with each other and with client devices 104 using any suitable communication protocol, such as an Internet protocol, which may include Transmission Control Protocol/Internet Protocol (TCP/IP), Hypertext Transfer Protocol (HTTP), etc., and other non-limiting protocols described herein.

Content sources 108 may include any number of multimedia content sources or providers that originate live and/or pre-recorded multimedia content (also referred to herein simply as "content"), and provide the content to services 102, directly, or indirectly through communication network 106. Content sources 108, such as Netflix®, HBO®, cable and television networks, and so on, may provide their content in the form of programs, including, but not limited to, entertainment programs (e.g., television shows, movies, cartoons, news programs, etc.), educational programs (e.g., classroom video, adult education video, learning programs, etc.), and advertising programs (e.g., commercials, infomercials, or marketing content). Content sources 108, such as, e.g., video cameras, may capture live scenes provide the resulting real-time video to services 102. Content sources may also include live broadcast feeds deployed using protocols such as Real-time Transport Protocol (RTP), and Real-time Messaging Protocol (RTMP).

Network services 102 include, but are not limited to: an encoder 110 to encode content from content sources 108; a content delivery network (CDN) 112 (also referred to as a "download server 112") to store the encoded content, and from which the stored, encoded content may be streamed or downloaded to client device 104; and a real-time service (RTS) 114 (also referred to as a "real-time server (RTS) 114") to (i) control services 102, and (ii) implement an RTS streaming control interface through which client device 104 may initiate and then monitor both on-demand, live, and real-time streaming sessions. Each of services 102 may be implemented as one or more distinct computer servers that execute one or more associated server-side computer program applications suited to the given service.

Encoder 110 may be implemented as a cloud encoder accessible over communication network 106. Encoder 110 encodes content provided thereto into a number of alternative bitstreams 120 (also referred to as encoded content) to support adaptive bitrate streaming of the content. For increased efficiency, encoder 110 may be implemented as a parallel encoder that includes multiple parallel encoders. In such an embodiment, encoder 110 divides the content into successive blocks or clips each of a limited duration in time. Each block may include a number of successive picture frames, referred to collectively as a group of pictures (GOPs). Encoder 110 encodes the divided blocks or GOPs in parallel to produce alternative bitstreams 120. Encoder 110 may also include transcoders to transcode input files from one encoded format to another, as necessary.

Alternative bitstreams 120 encode the same content in accordance with different encoding parameters/settings, such as at different encoding bitrates, resolutions, frame rates, and so on. In an embodiment, each of bitstreams 120 comprises a large number of sequential (i.e., time-ordered) files of encoded content, referred to herein as container files (CFs), as will be described further in connection with FIG. 2.

After encoder 110 has finished encoding content, e.g., after each of the content blocks is encoded, the encoder uploads the encoded content to CDN 112 for storage therein. CDN 112 includes one or more download servers (DSs) to store the uploaded container files at corresponding network addresses, so as to be accessible to client device 104 over communication network 106.

RTS 114 acts as a contact/control point in network services 102 for client device 104, through which the client device may initiate and then monitor its respective on-demand, live, and real-time streaming sessions. To this end, RTS 114 collects information from services 102, e.g., from encoder 110 and CDN 112, that client device 104 may use to manage its respective streaming sessions, and provides the collected information to the client device via messages (described below) when appropriate during streaming sessions, thus enabling the client device to manage its streaming sessions. The information collected by RTS 114 (and provided to client device 104) identifies the encoded content, e.g., the container files, stored in CDN 112, and may include, but is not limited to, network addresses of the container files stored in the CDN, encoding parameters use to encode the container files, such as their encoding bitrates, resolutions, and video frame rates, and file information, such as file sizes, and file types.

Client device 104 may be capable of wireless and/or wired communication with network services 102 over communication network 106, and includes processing, storage, communication, and user interface capabilities sufficient to provide all of the client device functionality described herein. Such functionality may be provided, at least in part, by one or more client applications 107, such as computer programs, that execute on client device 104. Client applications 107 may include:

a. a Graphical User Interface (GUI) through which a user of the client device may interact with and request services from corresponding server-side applications hosted in services 102. The GUI may also present trick play feature selections to the user, such as rewind and fast forward. Under user control through the GUI, client device 104 may request/select (i) programs to be streamed from services 102, and (ii) trick play features to control trick play playback of the streamed programs;

b. streaming and playback applications to stream/download the selected programs from the services, and playback, i.e., present, the streamed programs on client device 104, under user control, through the GUI; and c. a trick play application, integrated with the GUI and the streaming and playback applications, to implement the trick play features as described herein.

2 Container Files—Streaming Sources

As described above, encoder 110 encodes multimedia content from content sources 108, and CDN 112 stores the encoded content. To support adaptive bitrate streaming and trick play features, encoder 110 encodes the content at multiple encoding levels, where each level represents a distinct combination of an encoding bitrate, a video resolution (for video content), and a video frame rate, to produce (i) multiple adaptive bitrate streams for the content, and (ii) a trick play stream for the content. The multiple streams may be indexed according to their respective encoding levels. While streaming the encoded program from CDN 112, client device 104 may switch between streams, i.e., levels (and thus encoded bitrates and resolutions), according to conditions at the client device. Also, while streaming the encoded program, client device 104 may download portions of the trick play stream from CDN 112 to implement trick play features in the client device.

Figure 2:
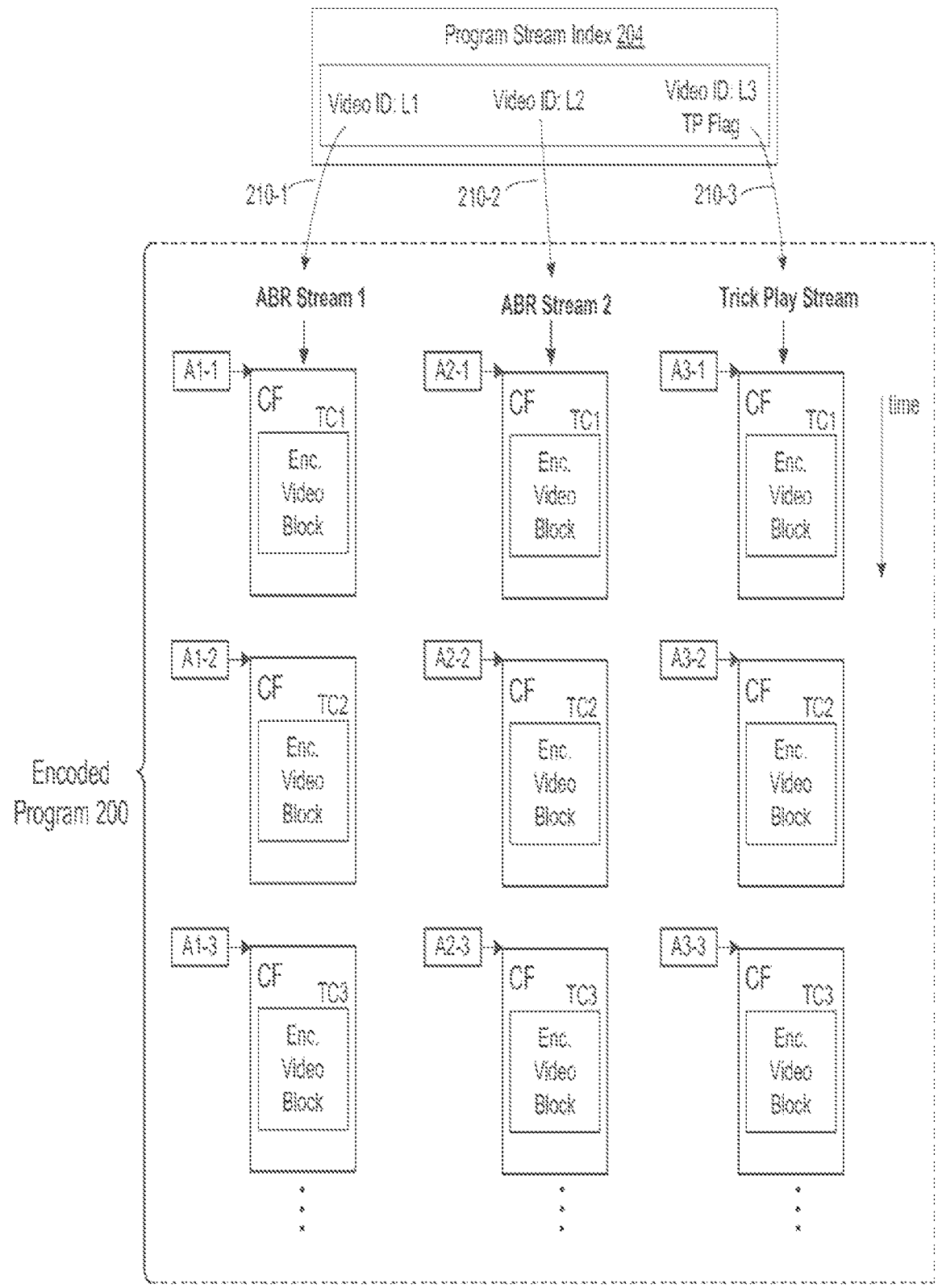
FIG. 2 is an illustration of an example encoded multimedia video program generated by and stored in network services of FIG. 1.

FIG. 2 is an illustration of an example encoded multimedia video program 200 generated by encoder 110 and stored in CDN 112. Encoded video program 200 includes:

a. two encoded adaptive bitrate (ABR) video streams 1, 2 encoded at corresponding encoding levels L1, L2 and available for adaptive bitrate streaming; and b. a trick play stream encoded at an encoding level L3. The trick play stream corresponds to, i.e., encodes the same video as, the two ABR streams 1, 2.

Each of encoding levels L1-L3 corresponds to a distinct combination of an encoding bitrate (Rate), a video resolution (Res), and a video frame rate (FR). In the example, encoding levels L1, L2, L3 correspond to encoder settings Rate1/Res1/FR1, Rate2/Res2/FR2, Rate3/Res3/FR3, respectively. In an embodiment, the encoding bitrate Rate3 and the video frame rate FR3 used to encode the trick play stream are less than the encoding bitrates Rate1, Rate2 and the frame rates FR1, FR2, respectively, used to encode adaptive bitrate streams 1, 2.

Although the example of FIG. 2 includes only two encoding levels for the ABR streams, in practice, an encoded video program typically includes many more than two levels of encoding for ABR streaming, such as 8 to 15 levels of encoding.

Each of streams 1-3 includes a distinct, time-ordered, sequence of container files CF (i.e., successive container files CF), where time is depicted in FIG. 2 as increasing in a downward vertical direction. Each of the successive container files CF, of each of streams 1-3, includes (i.e., encodes) a block or segment of video (also referred to herein as an encoded video block or segment) so that the successive container files encode successive contiguous encoded video blocks. Each of container files CF includes a time code TC to indicate a duration of the video encoded in the block of the container file, and/or a position of the container file in the succession of container files comprising the corresponding stream. The time code TC may include a start time and end time for the corresponding encoded video block. In an example in which each of container files CF encodes two seconds of video, time codes TC1, TC2, and TC3 may represents start and end times of 0 s (seconds) and 2 s, 2 s and 4 s, and 4 s and 6 s, respectively, and so down the chain of remaining successive container files.

The encoded blocks of the container files CF in a given stream may encode the same content (e.g., video content) as corresponding blocks in the other streams. For example, the stream 1 block corresponding to time code TC1 has encoded therein the same video as that in the stream 2 block corresponding to TC1. Such corresponding blocks encode the same content and share the same time code TC, i.e., they are aligned or coincide in time.

In an embodiment, a program stream index 204 may be associated with encoded video program 200 to identify each of the streams therein (e.g., the ABR streams 1, 2, and the trick play stream). RTS 114 may create (and store) program stream index 204 based on the information collected from encoder 110 and CDN 112, as described above in connection with FIG. 1. Then, during a live streaming session, for example, RTS 114 may provide information from program stream index 204 to client device 104 so as to identify appropriate container file addresses to the client device. Program stream index 204 may include:

a. address pointers (e.g., network addresses, such as Uniform Resource Locators (URLs)) 210-1, 210-2, 210-3 to corresponding streams 1, 2, and the trick play stream;

b. encoder parameters/settings associated with the encoded streams including, but not limited to, encoding levels L1, L2, L3 (also referred to as "Video ID" in FIG. 2, and including the encoding bitrates and resolutions Rate1/Res1, Rate2/Res2, Rate3/Res3), encoding techniques/standards, and file types and sizes of the container files CF; and c. a trick play flag (TP flag) associated with URL 210-3 that, when set, indicates the associated stream is a trick play stream.

Address pointers 210-1, 210-2, 210-3 may point to respective lists of addresses A1, A2, A3 of the container files CF comprising each of streams 1, 2, 3. Address lists A1, A2, A3 may each be represented as an array or linked list of container file network addresses, e.g., URLs. Accordingly, access to the information in program stream index 204 results in possible access to all of the container files associated with streams 1, 2, 3.

Although each of container files CF depicted in FIG. 2 represents a relatively small and simple container structure, larger and more complicated container structures are possible. For example, each container file may be expanded to include multiple clusters of encoded media, each cluster including multiple blocks of encoded media, to thereby form a larger container file also suitable for embodiments described herein. The larger container files encode an equivalent amount of content as a collection of many smaller container files.

Container files may encode a single stream, such as a video stream (as depicted in FIG. 2), an audio stream, or a text stream (e.g., subtitles). Alternatively, each container file may encode multiple multiplexed streams, such as a mix of video, audio, and text streams. In addition, a container file may encode only a metadata stream at a relatively low bitrate.

In embodiments: the container files may be Matroska (MKV) containers based on Extensible Binary Meta Language (EBML), which is a derivative of Extensible Binary Meta Language (XML), or files encoded in accordance with the Moving Picture Experts Group (MPEG) standard; the program stream index may be provided in a Synchronized Multimedia Integration Language (SMIL) format; and client device 104 may download container files from CDN 114 over networks 106 using the HTTP protocol. In other embodiments, the container file formats may include OGG, flash video (FLV), Windows Media Video (WMV), or any other format.

Exemplary, non-limiting, encoding bitrates for different levels, e.g., levels L1, L2, L3 may range from below 125 kilo-bits-per-second (kbps) up to 15,000 kbps, or even higher, depending on the type of encoded media (i.e., content). Video resolutions Res 1-Res 4 may be equal to or different from each other.

The container files may support adaptive streaming of encoded video programs across an available spectrum bandwidth that is divided into multiple, i.e., n, levels. Video having a predetermined video resolution for each level may be encoded at a bitrate corresponding to the bandwidth associated with the given level. For example, in DivX® Plus Streaming, by Rovi Corporation, the starting bandwidth is 125 kbps and the ending bandwidth is 8400 kbps, and the number n of bandwidth levels is eleven (11). Each bandwidth level encodes a corresponding video stream, where the maximum encoded bitrate of the video stream (according to a hypothetical reference decoder model of the video coding standard H.264) is set equal to the bandwidth/bitrate of the given level. In DivX® Plus Streaming, the 11 levels are encoded according to 4 different video resolution levels, in the following way: mobile (2 levels), standard definition (4 levels), 720p (2 levels), and 1080p (3 levels).

2.1 Encoded Video Frame Structure

Figure 3A:
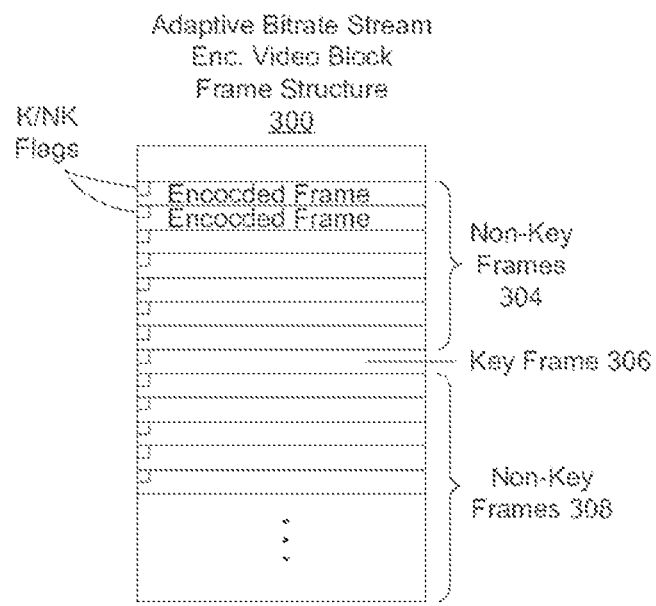
FIG. 3A is an illustration of an example adaptive bitrate frame structure of an encoded video block of FIG. 2.

FIG. 3A is an illustration of an example frame structure 300 of an encoded video block for container files from adaptive bitrate streams 1 and 2 of FIG. 2. Video encoding by encoder 110 includes capturing a number of successive picture frames, i.e., a GOP, at a predetermined video frame rate, and encoding each of the captured frames, in accordance with an encoding standard/technique, into a corresponding encoded video frame. Exemplary encoding standards include, but are not limited to, block encoding standards, such as H.264 and Moving Picture Experts Group (MPEG) standards. Collectively, the encoded video frames form an encoded video block, such as an encoded video block in one of container files CF. The process repeats to produce contiguous encoded video blocks.

The encoding process may encode a video frame independent of, i.e., without reference to, any other video frames, such as preceding frames, to produce an encoded video frame referred to herein as a key frame. For example, the video frame may be intra-encoded, or intra-predicted. Such key frames are referred to as !-Frames in the H.264/MPEG standard set. Since the key frame was encoded independent of other encoded video frames, it may be decoded to recover the original video content therein independent of, i.e., without reference to, any other encoded video frames. In the context of streaming, the key frame may be downloaded from CDN 112 to client device 104, decoded independent of other encoded frames, and the recovered (decoded) video played back, i.e., presented, on the client device.

Alternatively, the encoding process may encode a video frame based on, or with reference to, other video frames, such as one or more previous frames, to produce an encoded video frame referred to herein as a non-key frame. For example, the video frame may be inter-encoded, i.e., inter-predicted, to produce the non-key frame. Such non-key frames include P-Frames and B-frames in the H.264/MPEG standard set. The non-key frame is decoded based on one or more other encoded video frames, e.g., key-frames, reference frames, etc. In the context of streaming, the non-key frame may be downloaded from CDN 112 to client device 104, decoded based on other encoded frames, and the recovered video played back.

With reference again to FIG. 3A, frame structure 300 of the encoded video block for container files in the adaptive bitrate streams includes, in a time-ordered sequence, a first set of successive non-key frames 304, a key frame 306, and a second set of successive non-key frames 308. Accordingly, key frame 306 is interspersed among the encoded video frames of the encoded video block. The position of key frame 306 relative to the non-key frames in block 300 may vary, e.g., the position may be at the top, the middle, the bottom, or elsewhere in the block. Moreover, multiple key frames may be interspersed among the encoded video frames of the encoded video block, and separated from each other by multiple non-key frames.

A key/non-key (K/NK) flag associated with each of the frames 304, 306, and 308 indicates whether the associated frame is a key-frame or a non-key frame. Each of the key and the non-key frames may include a predetermined number of bytes of encoded video.

In an example in which the encoded video block represented by frame structure 300 encodes 2 seconds of video captured at a video frame rate of 30 frames per second (fps), the frame structure includes 60 encoded video frames, which may include N (i.e., one or more) interspersed key frames, and 60–N non-key frames. Typically, the number of non-key frames exceeds the number of key frames.

Figure 3B:
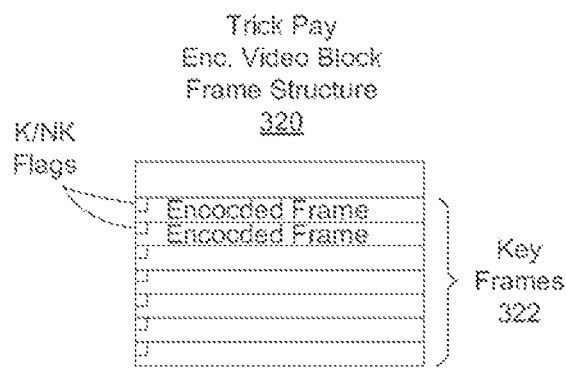
FIG. 3B is an illustration of an example trick play frame structure of an encoded video block of FIG. 2.

FIG. 3B is an illustration of an example frame structure 320 of an encoded video block for container files from the trick play stream of FIG. 2. Trick play frame structure 320 includes, in a time-ordered sequence, key frames 322. In other words, trick play frame structure 320 includes only key frames, i.e., key frames without non-key frames.

In the example in which the encoded video block represented by frame structure 300 encodes 2 seconds of video captured at a video frame rate of 30 frames per second (fps), the encoded video block represented by frame structure 320 also encodes 2 seconds of video. However the video frame rate for structure 320 is reduced to 5 fps, which yields 10 encoded video frames (key frames) every 2 seconds.

3 Sequence Diagram

Figure 4:
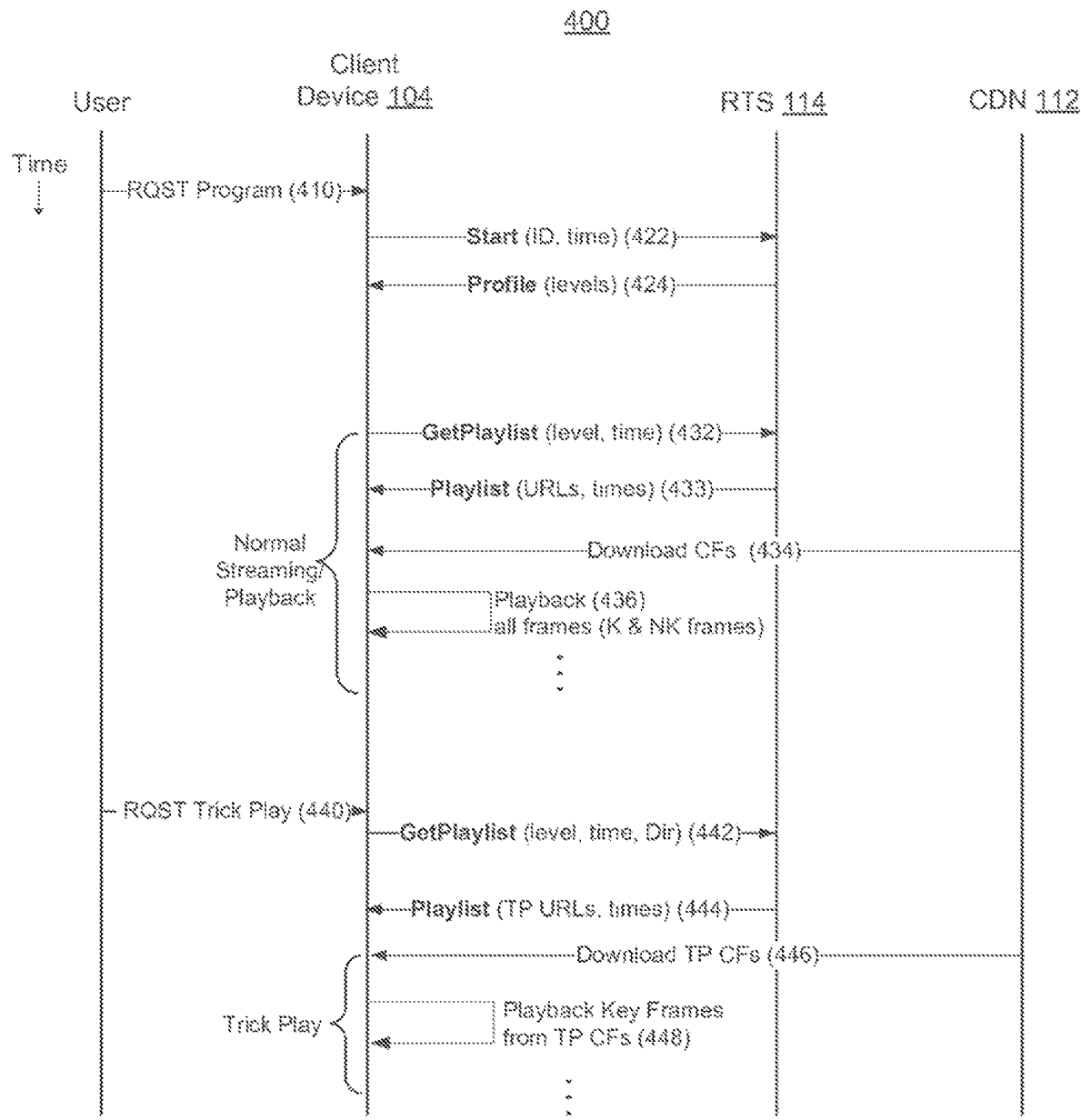
FIG. 4 is a sequence diagram of example high-level interactions between network services and a client device used to initiate streaming, implement normal streaming and playback, and implement trick play features in streaming embodiments.

FIG. 4 is a sequence diagram of example high-level interactions 400 between network services 102 and client device 104 used to initiate, i.e., startup, streaming, implement normal streaming and playback, and implement trick play features in on-demand, live, and real-time streaming embodiments. Interactions 400 progress in time from top-to-bottom in FIG. 4, and are now described in that order. It is assumed that prior to startup, encoder 110 is in the process of, or has finished, encoding video content into multiple adaptive bitrate streams and a corresponding trick play stream, and storing the resulting container files in CDN 112 for subsequent download to client device 104.

3.1 Start-Up

At 410, a user of client device 104 selects content, such as a video program, to be streamed using the client device GUI.

At 422, client device 104 sends a "Start" message (also referred to as a "begin playback" message) to RTS 114 to start a streaming session. The Start message includes an identifier (ID) of the content to be streamed and a current time stamp. The ID identifies content from a content source that is to be streamed to client 104, and may indicate, e.g., a channel, program name, and/or source originating the content to be streamed. The current time stamp (also referred to as "current time") indicates a current time, such as a Universal Time Code (UTC). The UTC may be acquired from any available UTC time service, as would be appreciated by those or ordinary skill in the relevant arts.

As mentioned above, it is assumed that at the time the Start message is issued, the content identified therein has already been encoded and is available for streaming, e.g., for video-on-demand streaming, or will begin to be encoded shortly after the time of the Start message, e.g., for live and real-time streaming. It is also assumed that RTS 114 has collected, or will be collecting, the information related to the encoded program from encoder 110 or CDN 115, such as a program stream index, e.g., program stream index 204, sufficient to identify the identified content in network services 102.

At 424, in response to the Start message, RTS 114 sends an encoding profile message (referred to as a "Profile" message) to client 104. The Profile message lists different encoding profiles used to encode the identified content, e.g., as available from the program stream index for the identified content. Each of the profiles specifies encoding parameters/settings, including, but not limited to: content type (e.g., audio, video, or subtitle); an encoding level corresponding to an encoding bitrate, resolution, and video frame rate (e.g., levels L1, L2, L3); and a container file type, e.g., a Multipurpose Internet Mail Extensions (MIME) type. The Profile message also indicates which encoding level among the multiple encoding levels e.g., encoding level L3, represents or corresponds to a trick play stream.

In response to the Profile message, client device 104 selects an appropriate encoding level (e.g., an appropriate combination of an encoding bitrate and a resolution) among the levels indicated in the Profile message (not including the level indicating the trick play stream) for normal streaming and playback of the identified content. Client device 104 may determine the appropriate encoding level based on a communication bandwidth at the client device.

3.2 Normal Streaming and Playback

After startup, normal streaming and playback begins, as follows.

At 432, after client device 104 has selected the encoding level, the client device sends a GetPlaylist message to RTS 114 to request a list of any new container files that have been uploaded since the client device last downloaded container files (if any) from CDN 112. The GetPlaylist message includes selection criteria for uploaded container files, namely, a current time and the selected encoding level. The current time represents a time code associated with the last container file downloaded by client device 104 (if any) in the current streaming session.

In response to the GetPlaylist message, RTS 114:
a. selects the uploaded container files, as identified to the RTS that meet the criteria specified in the GetPlaylist message. The selected, uploaded container files are those container files that have (i) a time code greater than the current time, and (ii) an encoding level that matches the level specified in the GetPlaylist message from the client device;
b. generates a Playlist message identifying the selected container files; and
c. at 433, sends the Playlist message to client device 104.

For each of the selected container files, the Playlist message includes the following information: the type of content encoded in the container file (e.g., video, audio, or subtitle); an address (e.g., URL) of the container file in CDN 112 (e.g., a subset of the addresses A1 or A2); a time code, e.g., a start time and an end time, associated with the content block encoded in the container file; and a file size of the container file.

At 434, in response to the Playlist message, client device 104 downloads container files from addresses in CDN 112 based on, i.e., as identified in, the Playlist message.

At 436, client device 104 decodes all of the key frames and the non-key frames of the encoded content block from each of the downloaded container files to recover the original content therein, and then presents the recovered content, whether in audio, visual, or in other form, on client device 104. The process of decoding the encoded content from the key and non-key frames and then presenting the recovered content on client device 104 is referred to as "normal playback" on the client device. In normal playback, the content recovered from successive downloaded container files is played back on client device 104 in a forward (play) direction, i.e., in an order of increasing time code. For example, with reference again to FIG. 2, the content is played back from container files CF in the time code order of 0 s-2 s, 2 s-4 s, 4 s-6 s, and so on. For normal playback, the decoded video frames are presented at a frame rate equal to the frame rate at which the video was original captured and encoded, e.g., at a rate of 30 fps.

The normal streaming and playback sequence repeats. Therefore, in summary, in the streaming and playback sequence, client device 104 periodically requests and downloads Playlist messages, downloads container files indicated in the Playlist messages, and plays back the content from the downloaded container files in the forward direction.

3.3 Trick Play

At any time during the normal streaming and playback sequence, the user may select a trick play (TP) feature through the GUI. Trick play features include, but are not limited to, rewind and fast forward, in which client device 104 rewinds and fast forwards through previously played back content.

At 440, assume the user selects the rewind trick play feature while client device 104 is performing the normal playback of content.

At 442, in response to the rewind request, client device 104 sends a GetPlaylist message to RTS 114 to solicit appropriate trick play video (container files) from network services 102. Therefore, in this case, the GetPlaylist message may also be referred to as a "GetTrickPlayPlaylist" message. The GetPlaylist message sent at 442 includes the following trick play file selection criteria:
a. a time (referred to as a "trick play time") when the user selected the trick play feature;
b. the encoding level that was indicated in the Profile message (at 424) as corresponding to the trick play video (e.g., level 3 in the example of FIG. 2); and
c. a trick play direction (depicted as "Dir" in FIG. 4) indicating rewind (RWD).

At 444, in response to the GetPlaylist message sent at 442, RTS 114 generates and sends a trick play Playlist message to client device 104. The trick play Playlist message identifies those container files from the trick play stream (e.g., the stream associated with encoding level L3 in the example of FIG. 2) that meet the selection criteria, namely, that are associated with (i) successive time code less than the trick play time because the trick play direction is RWD, and (ii) an encoding level that matches the specified level (e.g., encoding level L3). The Playlist message lists URLs of the appropriate trick play container files.

At 446, client device 104 downloads the trick play container files identified in the Playlist message from 444. For example, client device 104 downloads the trick play container files from their corresponding URLs.

At 448, client device 104 plays back video from the downloaded trick play container files, i.e., the client device decodes the key frames from each of the trick play container files and then presents the decoded video in a rewind play direction, i.e., in an order of decreasing time codes beginning with the trick play time.

The trick play sequence 442-448 repeats.

During trick play, the video from the key frames may be played back at a reduced video frame rate relative to that used for normal playback. For example, the trick play playback video frame rate may be 5 fps, instead of 30 fps.

Also, to implement a faster rewind, key frames may be skipped, e.g., every other key frame may be played back. In other words, only a subset of key frames in each of the downloaded trick play container files may be used in trick play playback.

The above described trick play sequence results when the user selects RWD at 440. Alternatively, the user may select fast forward (FFWD) at 440. The trick play sequence that results when the user selects FFWD is similar to that for RWD, except that the GetPlaylist message at 442 indicates FFWD instead of RWD. In response to the FFWD indication in the GetPlaylist message, at 444, RTS 114 returns a Playlist message identifying trick play files associated with successive time codes greater than (not less than) the trick play time. Then, at 448, client device 104 plays back the downloaded trick play files in the forward direction.

4 Profile and Playlist Messages 4.1 Profile Message

FIG. 5 is an example Profile message 500. In an embodiment, the Profile message format is in accordance with the World Wide Web Consortium (W3C) recommended Extensible Markup Language (XML) markup language, Synchronized Multimedia Integration Language (SMIL) 3.0 Tiny profile. This profile is well-suited to descriptions of web-based multimedia. However, other protocols may be used to format the Profile message.

Profile message 500 includes a header 501 to specify the base profile as SMIL 3.0 (Tiny), and a body including video encoding (VE) profiles 502, 504, 505 and an audio encoding (AE) profile 506. Profile message 500 corresponds to a requested program ID, such as encoded program 200 of FIG. 2, and includes information from the associated index, e.g., index 204. Each of VE profiles 502, 504, 505 specifies the following encoding settings or parameters:
  a. a content type, e.g., video;
  b. an encoding level "Video ID" (e.g., level 1=L2, level 2=L2, level 3=L3) with its corresponding
     i. encoding bitrate (e.g., Rate1, Rate2, or Rate3, such as a bitrate=400000 bps, 600000 bps, or 150000 bps), and
     ii. video resolution (e.g., Res1, Res2, or Res3) in terms of, e.g., pixel width and height dimensions (e.g., 768×432); and
  c. MIME type.

Similarly, AE profile 506 specifies:
  a. a content type, e.g., audio;
  b. an encoding bitrate/reserved bandwidth value (e.g., 192000); and
  c. a MIME type.

The Profile message may also include a video frame rate at which each level was encoded.

As mentioned above in connection with FIG. 4, Profile message 500 also includes a field 510 to indicate which of encoding profiles 502-505, if any, represents a trick play stream. In the example of FIG. 5, the stream associated with level 3 (similar to FIG. 2) is indicated as the trick play stream.

4.2 Playlist Message

FIG. 6 is an example Playlist message 600 generated in response to a GetPlaylist message selection criteria including a current time of 40 (seconds) and specifying a level 1 encoding level. Like the Profile message, the example Playlist message is formatted in accordance with SMIL 3.0.

Playlist message 600 includes a header 601 to specify the base profile as 3.0, and a body that includes sequential records or elements 602-610, each of which is defined as a seq element <seq>. In an embodiment, each seq element 602-610 corresponds to an uploaded container file. Using seq elements, RTS 114 is able to specify a sequence of real-time media streams for playback. A sequence tag is used with each element to indicate one of <video>, <audio> or <subtitle/text> encoded content for streaming. Elements 602-610 identify respective uploaded elements (e.g., container files) that meet the Playlist message criteria (i.e., encoding level 1 and a time code equal to or greater than 40). In the example of FIG. 6, elements 602-608 identify three container files containing successive or time-ordered two second blocks of encoded video. Element 610 identifies a container file containing a two second segment of encoded audio. Each of the Playlist message records 602-610 includes:
  a. a content type identifier (e.g., video or audio);
  b. a URL of the identified container file (e.g., src=http://10.180.14.232/1140.mkv). For example, the URLs correspond to container file addresses from the list of addresses A1 or A2 from FIG. 2;
  c. a time code in seconds (e.g., a start time and an end time, referred to as "ClipBegin" and "ClipEnd," respectively,) associated with the segment encoded in the identified container file. The example time codes for each of the container files are 40-42, 42-44, and 46-48); and
  d. a file size of the identified container file (e.g., 3200 kilobits).

5 Method Flowcharts 5.1 Network Side

Figure 7:
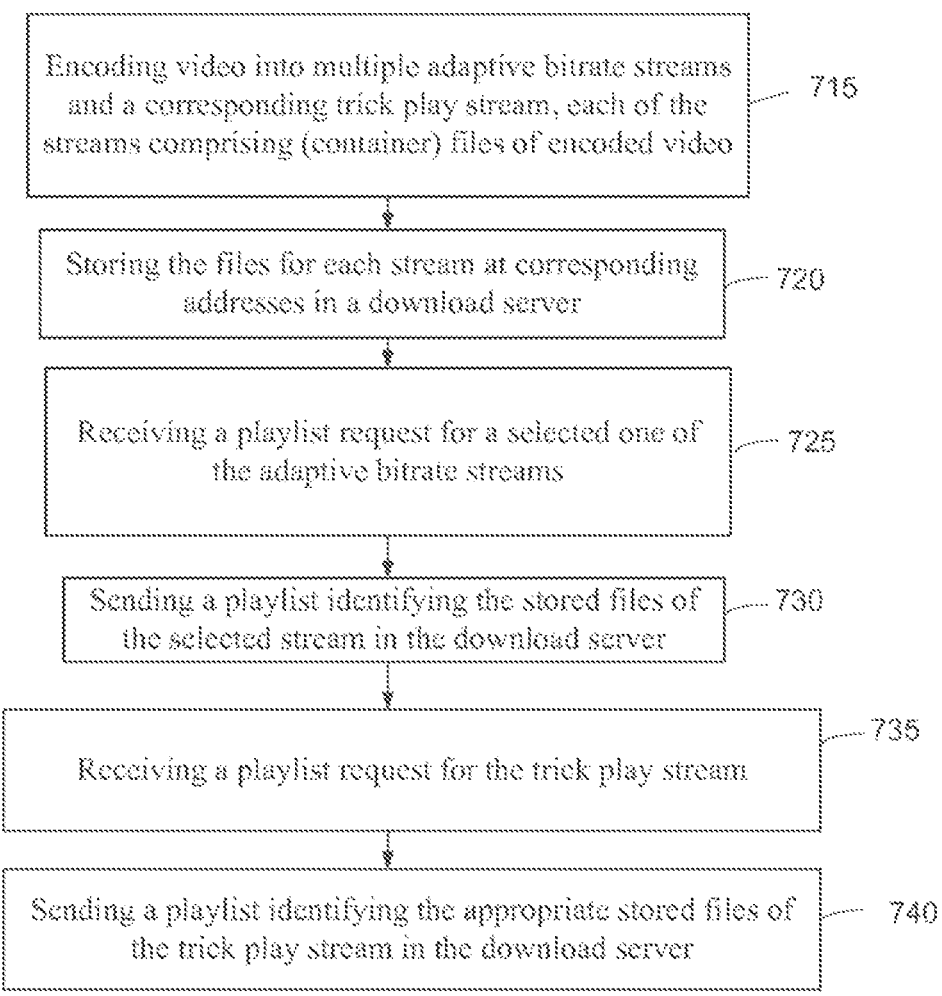
FIG. 7 is a flowchart of an example network-side method of multimedia content streaming with trick play support based on trick play files, which may be implemented in the network services of FIG. 1.

FIG. 7 is a flowchart of an example network-side method 700 of multimedia content streaming with trick play support based on trick play files, which may be implemented in network services 102. Method 700 may be executed in accordance with sequence 400 of FIG. 4. The multimedia content includes video, and may also include audio and/or text (e.g., subtitles). Method 700 may be implemented in any of the contexts of on-demand, live, and real-time streaming.

715 includes encoding video into (i) multiple adaptive bitrate streams, and (ii) a corresponding trick play stream in accordance with corresponding distinct sets of encoder settings or levels, such as an encoding bitrate, a resolution, and a video frame rate. Each of the streams comprises container files of encoded video associated with successive time codes.

720 includes storing (i) the container files for each stream at corresponding addresses, such as network addresses, e.g., URLs, in a download server, e.g., in CDN 114, and (ii) an index identifying the container files of each stream in RTS 114.

725 includes receiving a playlist request (e.g., a GetPlaylist message) from a client device, e.g., over a communication network, for a selected one of the adaptive bitrate streams. The playlist request includes container file selection criteria, including a current time, an encoding level.

730 includes sending, to the client device over the communication network, a playlist (e.g., a Playlist message) identifying the stored files of the selected stream that meet the selection criteria, i.e., that are associated with time codes greater than the current time. The playlist may list URLs where the identified container files are stored and sizes of the files.

735 includes receiving, from the client device, a playlist request (e.g., another GetPlaylist message) for the trick play stream corresponding to the selected stream. The trick play playlist request includes a trick play time code, a trick play encoding level, and a trick play direction, e.g., fast forward or rewind.

740 includes sending, to the client device, a trick play playlist (e.g., another Playlist message) identifying the stored files (e.g., URLs of the stored files) of the trick play stream that are associated with successive time codes that are (i) less than the trick play time if the trick play direction is rewind, and (ii) greater than the trick play time if the trick play direction is fast forward.

5.2 Client Side

Figure 8:
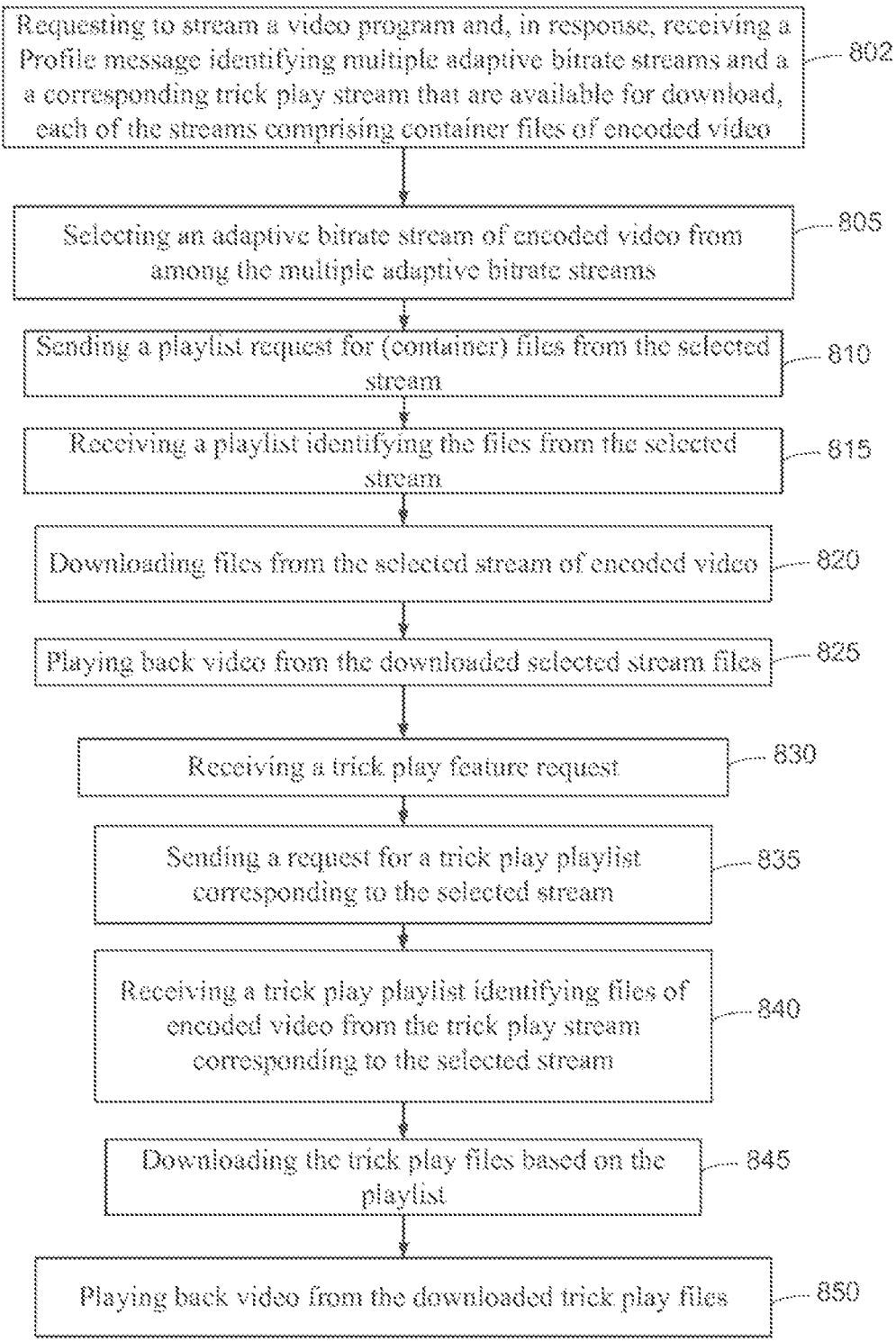
FIG. 8 is a flowchart of an example client-side method of multimedia content streaming with trick play support based on trick play files, which may be implemented in the client device of FIG. 1.

FIG. 8 is a flowchart of an example client-side method 800 of multimedia content streaming with trick play support based on trick play files, which may be implemented in client device 104. Method 800 is a client side method complementary to network side method 700. Method 800 may be executed in accordance with sequence 400 of FIG. 4. The multimedia content includes video, and may also include audio and/or text (e.g., subtitles). Method 700 may be implemented in any of the contexts of on-demand, live, and real-time streaming.

Together, operations 802-815 described below are considered precursor, or initialization, operations that lead to subsequent downloading of an adaptive bitrate stream.

802 includes requesting to stream a video program from network services over a communication network and, in response, receiving a Profile message over the communication network identifying multiple adaptive bitrate streams of encoded video and a trick play stream of encoded video that are stored in, and available for streaming from, network services. The streams may be identified according to their respective encoding levels (e.g., encoding bitrate, resolution, frame rate, etc.). Each of the streams comprises container files of the encoded video. The container files of each stream are associated with successive time codes.

805 includes selecting an adaptive bitrate stream from among the multiple adaptive bitrate streams. A client device may select an adaptive bitrate stream based an available communication bandwidth.

810 includes sending, to the network services over the communication network, a playlist request (e.g., a GetPlaylist message) for (container) files from the selected stream. The playlist request includes file selection criteria that includes a current time and specifies an encoding level corresponding to, e.g., an encoding bitrate and a resolution, of the selected stream.

815 includes receiving, from the network services over the communication network, a playlist (e.g., a Playlist message) identifying the files from the selected stream that meet the file selection criteria, i.e., that are associated with successive time codes greater than the current time.

820 includes downloading, from the network services over the communication network, files of encoded video from the selected stream as identified in the playlist, e.g., from URLs listed in the playlist.

825 includes playing back video from the downloaded files in an order of increasing time codes. This includes playing back video from both key and non-key frames at a normal video frame rate, such as 30 fps.

830 includes receiving a trick play feature request, such as a video rewind request, from a user of the client device. Next operations 835-850 are performed in response to the trick play request received at 830.

835 includes sending, to the network services over the communication network, a trick play playlist request (e.g., a GetTrickPlayPlaylist message) for appropriate trick play files from the trick play stream corresponding to the selected stream. The request includes a trick play time (corresponding to a time when the user selected the trick play feature), a trick play encoding level as indicated in the Profile message received earlier by the client device at 802 (e.g., level L3), and a trick play direction (e.g., rewind or fast forward).

840 includes receiving, from the network services over the communication network, a trick play playlist (e.g., a Playlist message) identifying files from the trick play stream that meet the file selection criteria, i.e., that are associated with successive time codes (i) less than the trick play time if the direction is rewind, and (ii) greater than the trick play time if the direction is fast forward.

845 includes downloading the trick play files identified in the playlist from 840, e.g., from URLs listed in the playlist.

850 includes playing back video from the downloaded files in either the rewind direction, i.e., in an order of decreasing time codes, or in the forward direction, as appropriate. This includes playing back video only from key frames at a trick play video frame rate, such as 5 fps, which is reduced relative to the normal frame rate.

6 Systems

Figure 9A:
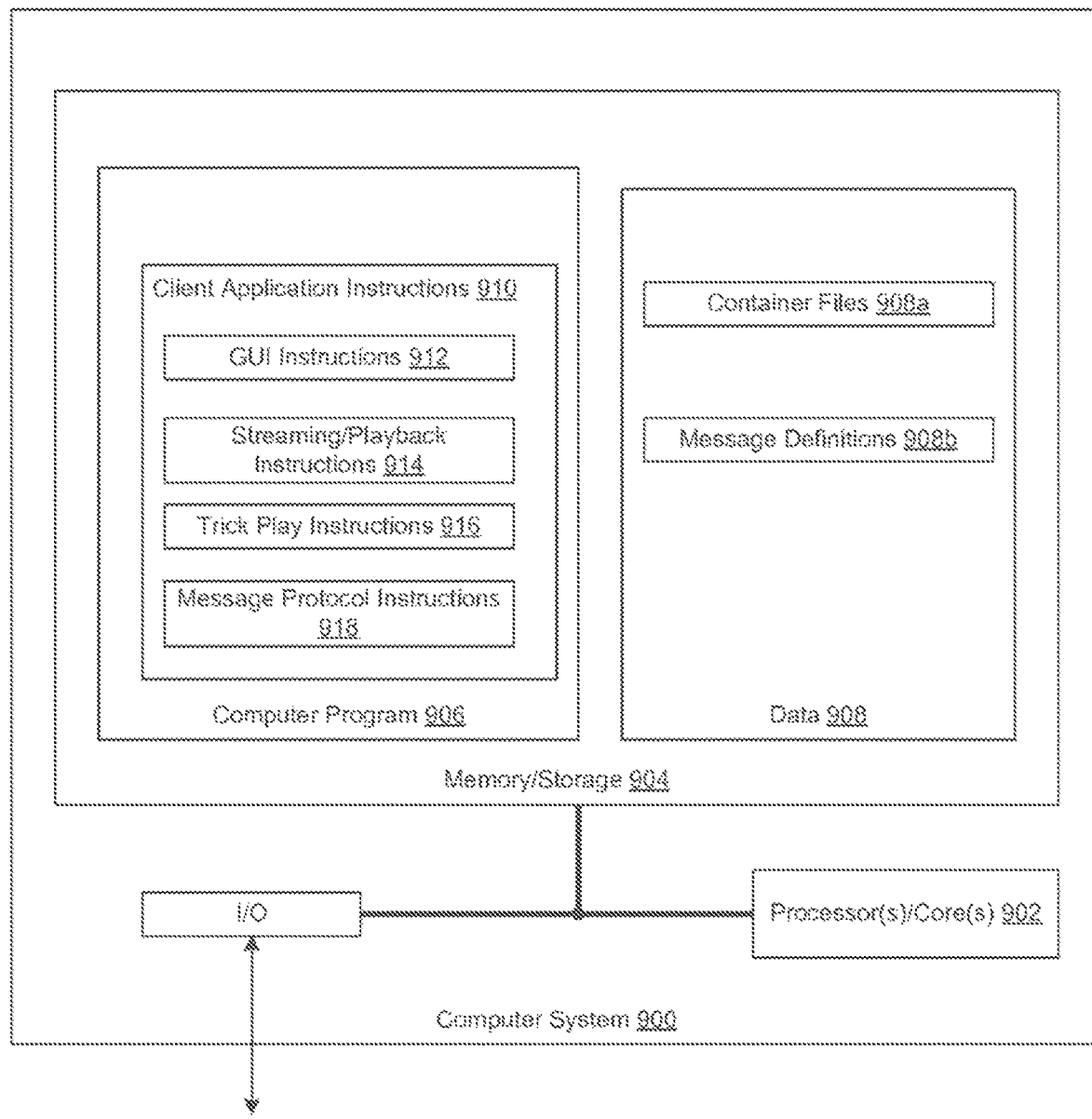
FIG. 9A is a block diagram of an example computer system.

FIG. 9A is a block diagram of a computer system 900 configured to support/perform streaming and trick play features as described herein.

Computer system 900 includes one or more computer instruction processing units and/or processor cores, illustrated here as processor 902, to execute computer readable instructions, also referred to herein as computer program logic.

Computer system 900 may include memory, cache, registers, and/or storage, illustrated here as memory 904, which may include a non-transitory computer readable medium encoded with computer programs, illustrated here as computer program 906.

Memory 904 may include data 908 to be used by processor 902 in executing computer program 906, and/or generated by processor 902 during execution of computer program 906. Data 908 may include container files 908a from adaptive bitrate streams and trick play streams, and message definitions 908b for GetPlaylist, Playlist, and Profile messages, such as used in the methods described herein.

Computer program 906 may include:

Client application instructions 910 to cause processor 902 to perform client device functions as described herein. Instructions 910 include:

GUI instructions 912 to implement a GUI through which a user may select to stream a program and select trick play features;

streaming and playback instructions 914 to download, decode, and playback streamed video content;

trick play instructions 916 to implement trick play features; and message protocol instructions 918 to implement client side message exchange protocols/sequences (sending and receiving of messages) as described in one or more examples above.

Instructions 910-918 cause processor 902 to perform functions such as described in one or more examples above.

Figure 9B:
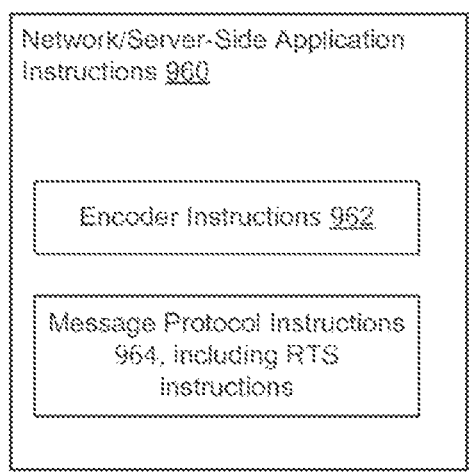
FIG. 9B is a block diagram of network/server-side application instructions which may execute in on a processor system similar to that of FIG. 9A.

FIG. 9B is a block diagram of network/server-side application instructions 960 which may execute in a processing environment similar to that of computer system 900, and which may be hosted in encoder 110, RTS 114, and/or CDN 112, as appropriate.

Network/server-side application instructions 960 cause a processor to perform network-side (network services) functions as described herein. Instructions 960 have access to adaptive bitrate streams, trick play streams, indexes identifying the streams, and message definitions as described in one or more example above. Instructions 960 include:

encoder instructions 962 to encode multimedia content into adaptive bitrate streams and trick play streams, as described in one or more example above; and message protocol instructions 964, including RTS instructions, to implement network side message exchange protocols/sequences (sending and receiving of messages) in support of adaptive bitrate streaming and trick play streaming, e.g., between RTS 114, client device 104, encoder 110, and CDN 112, as described in one or more examples above. For example, instructions 964 include instructions to create and send Profile and Playlist messages, and to respond to GetPlaylist messages.

Methods and systems disclosed herein may be implemented with respect to one or more of a variety of systems including one or more consumer systems, such as described below with reference to FIGS. 10 and 11. Methods and systems disclosed herein are not, however, limited to the examples of FIGS. 10 and 11.

Figure 10:
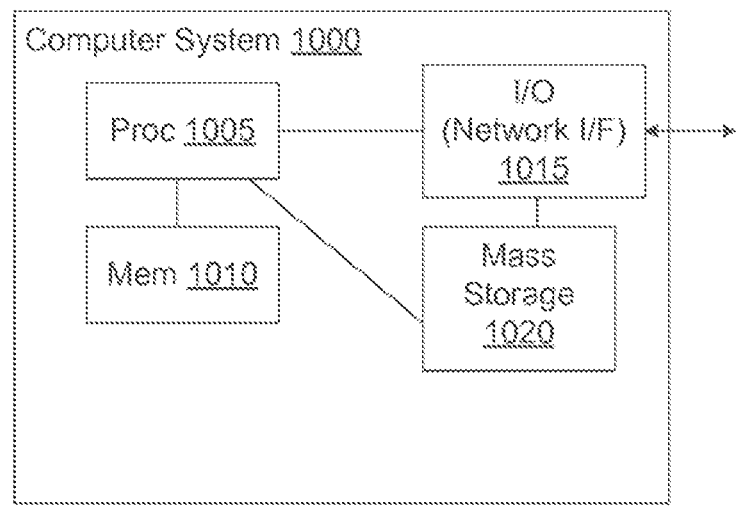
FIG. 10 is a block diagram of an example computer system corresponding to any of the network servers in the environment of FIG. 1.

FIG. 10 is a block diagram of an example computer system 1000 corresponding to any of network services 102, including encoder 110, CDN 112, and RTS 114. Computer system 1000, which may be, e.g., a server, includes one or more processors 1005, a memory 1010 in which instruction sets and databases for computer program applications are stored, a mass storage 1020 for storing, e.g., encoded programs, and an input/output (I/O) module 1015 through which components of computer system 1100 may communicate with communication network 106.

Figure 11:
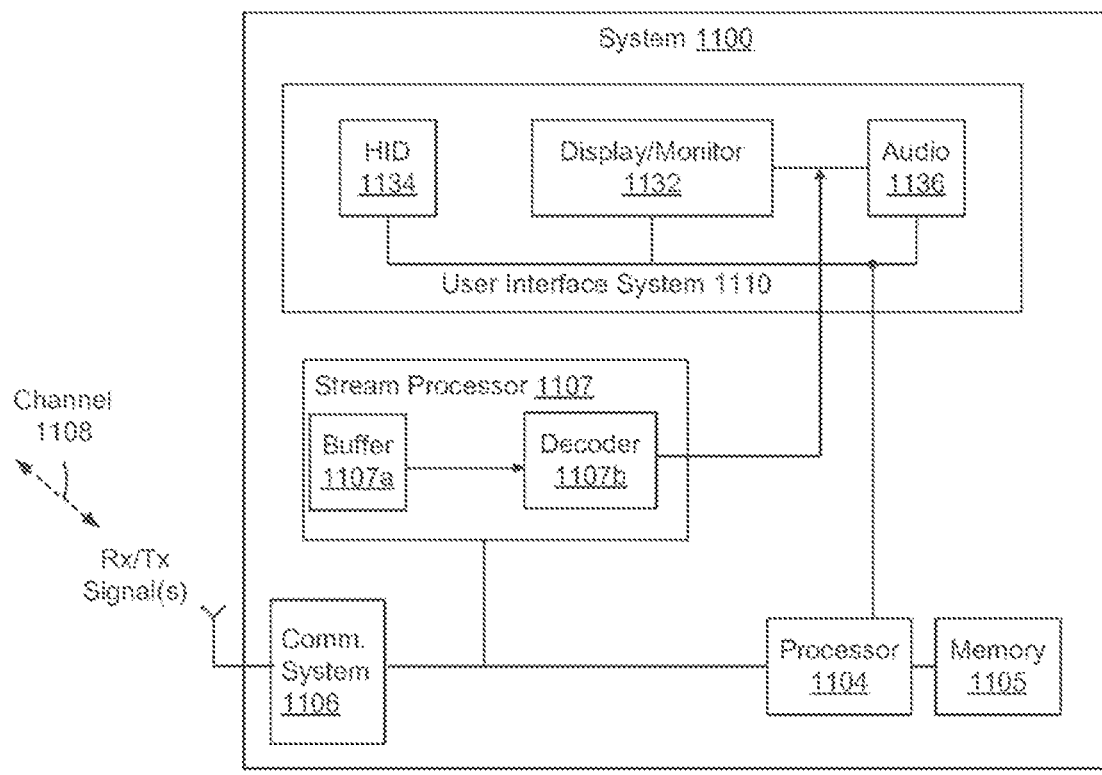
FIG. 11 is a block diagram of an example system representing a client device of FIG. 1.

FIG. 11 is a block diagram of an example system 1100 representing, e.g., client device 104, and may be implemented, and configured to operate, as described in one or more examples herein.

System 1100 or portions thereof may be implemented within one or more integrated circuit dies, and may be implemented as a system-on-a-chip (SoC).

System 1100 may include one or more processors 1104 to execute client-side application programs stored in memory 1105.

System 1100 may include a communication system 1106 to interface between processors 1104 and communication networks, such as networks 106. Communication system 1106 may include a wired and/or wireless communication system.

System 1100 may include a stream processor 1107 to process program (i.e., content) streams, received over communication channel 1108 and through communication system 1106, for presentation at system 1100. Stream processor 1107 includes a buffer 1107a to buffer portions of received, streamed programs, and a decoder 1107b to decode and decrypt the buffered programs in accordance with encoding and encryption standards, and using decryption keys. In an alternative embodiment, decoder 1107b may be integrated with a display and graphics platform of system 1100. Stream processor 1107 together with processors 1104 and memory 1105 represent a controller of system 1100. This controller includes modules to perform the functions of one or more examples described herein, such as a streaming module to stream programs through communication system 1106.

System 1100 may include a user interface system 1110.

User interface system 1110 may include a monitor or display 1132 to display information from processor 1104, such as a client-side GUI.

User interface system 1110 may include a human interface device (HID) 1134 to provide user input to processor 1104. HID 1134 may include, for example and without limitation, one or more of a key board, a cursor device, a touch-sensitive device, and or a motion and/or image sensor. HID 1134 may include a physical device and/or a virtual device, such as a monitor-displayed or virtual keyboard.

User interface system 1110 may include an audio system 1136 to receive and/or output audible sound.

System 1100 may correspond to, for example, a computer system, a personal communication device, and/or a television set-top box.

System 1100 may include a housing, and one or more of communication system 1106, processors 1104, memory 1105, user interface system 1110, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1102 may be implemented to receive a digital television broadcast signal, and system 1100 may include a set-top box housing or a portable housing, such as a mobile telephone housing.

Methods and systems disclosed herein may be implemented in circuitry and/or a machine, such as a computer system, and combinations thereof, including discrete and integrated circuitry, application specific integrated circuitry (ASIC), a processor and memory, and/or a computer-readable medium encoded with instructions executable by a processor, and may be implemented as part of a domain-specific integrated circuit package, a system-on-a-chip (SOC), and/or a combination of integrated circuit packages.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples.

The scope of the claims should not be limited by any of the example embodiments disclosed herein.

What is claimed is:

1. A playback device, comprising:
a set of one or more processors; and
a non-volatile storage containing an application for causing the set of one or more processors to perform normal playback of content by performing the steps of:
receiving a playlist identifying a plurality of streams of content having different encoding bitrates for adaptive bitrate streaming, wherein the playlist comprises Uniform Resource Locators (URLs) of container files for the plurality of streams;
performing adaptive bitrate streaming by switching between the plurality of streams in the received playlist, where performing adaptive bitrate streaming further comprises:
downloading at least a portion of at least one file from one of the plurality of streams using at least one of the URLs from the playlist; and
playing back video from the at least a portion of the at least one downloaded file;
wherein the application is further for causing the set of one or more processors to perform trick play playback of content by performing the steps of:
requesting a separate trick play playlist;
receiving the trick play playlist comprising at least one URL for at least one trick play file from at least one trick play stream;
downloading at least a portion of the at least one trick play file from the at least one trick play stream using the at least one URL from the trick play playlist, wherein the at least a portion of the at least one trick play file includes only key-frames in a time-ordered sequence; and
playing back video from the key-frames from the at least a portion of the at least one downloaded trick play file.

2. The playback device of claim 1, wherein each of the plurality of streams and the trick play stream comprises segments of encoded video, wherein segments of encoded video from the plurality of streams comprise: encoded video frames, including non-key frames each encoded based on video from one or more previous video frames, and key-frames interspersed among the non-key frames, wherein each of the key-frames is encoded independently of previous video frames, and wherein segments of encoded video from the at least one trick play stream comprise encoded video frames, including only key-frames.

3. The playback device of claim 2, wherein:
playing back video from the at least a portion of the at least one downloaded file includes playing back video from the non-key frames and the key-frames at a normal video frame rate; and
playing back video from the at least a portion of the at least one downloaded trick play file includes playing back video from the key-frames at a trick play video frame rate.

4. The playback device of claim 3, wherein playing back video at the trick play video frame rate includes, selectively:
playing back all of the video from each segment of encoded video from the at least a portion of the at least one downloaded trick play file to achieve a normal trick play playback rate; and
playing back a subset of the video frames in each segment of encoded video from the at least a portion of the at least one downloaded trick play file to achieve an accelerated trick play playback rate.

5. The playback device of claim 1, wherein:
the downloaded at least a portion of the at least one file from the one of the plurality of streams is associated with successive time codes;
the playing back video from the at least a portion of the at least one downloaded file includes playing back the video in a forward direction of increasing time codes;
the downloaded at least a portion of the at least one trick play file from the at least one trick play stream is associated with successive time codes; and
the playing back video from the at least a portion of the at least one downloaded trick play file from the at least one trick play stream includes playing back the video in a rewind direction of decreasing time codes.

6. The playback device of claim 1, further comprising, prior to downloading of the at least a portion of the at least one file from one of the plurality of streams:
sending a playlist request for segments of encoded video from the one of the plurality of streams associated with time codes greater than a current time specified in a playlist request; and
receiving a playlist listing network addresses where the segments of encoded video from the one of the plurality of streams associated with successive time codes greater than the current time are stored, wherein the downloading includes downloading the segments of encoded video from the one of the plurality of streams from the network addresses, and the playing back video from the at least a portion of the at least one downloaded file from the one of the plurality of streams includes playing back video from the at least a portion of the at least one downloaded file in an order of increasing time codes.

7. The playback device of claim 1, wherein:
the trick play playlist request is a request for a trick play playlist of segments of encoded video from the at least one trick play stream associated with time codes less than a trick play time when the trick play request was received;
the trick play playlist lists network addresses of the segments of encoded video from the at least one trick play stream associated with time codes less than the trick play time;
the downloading the at least a portion of the at least one trick play file from the at least one trick play stream include downloading segments of encoded video from the trick play stream from their network addresses; and
the playing back video from the at least a portion of the at least one downloaded trick play file from the trick play stream includes playing back video in an order of decreasing time codes.

8. A method for playing back content on a playback device, comprising:
receiving a playlist identifying a plurality of streams of content having different encoding bitrates for adaptive bitrate streaming, wherein the playlist comprises Uniform Resource Locators (URLs) of container files for the plurality of streams;
performing adaptive bitrate streaming by switching between the plurality of streams in the received playlist, where performing adaptive bitrate streaming further comprises:
downloading at least a portion of at least one file from one of the plurality of streams using at least one of the URLs from the playlist; and playing back video from the at least a portion of the at least one downloaded file;
perform trick play playback of content by performing the steps of:
  requesting a separate trick play playlist;
  receiving the trick play playlist comprising at least one URL for at least one trick play file from at least one trick play stream;
  downloading at least a portion of the at least one trick play file from the at least one trick play stream using the at least one URL from the trick play playlist, wherein the at least a portion of the at least one trick play file includes only key-frames in a time-ordered sequence; and
  playing back video from the key-frames from the at least a portion of the at least one downloaded trick play file.

9. The method of claim 8, wherein each of the plurality of streams and the trick play stream comprises segments of encoded video,
  wherein segments of encoded video from the plurality of streams comprise: encoded video frames, including non-key frames each encoded based on video from one or more previous video frames, and key-frames interspersed among the non-key frames, wherein each of the key-frames is encoded independently of previous video frames, and wherein segments of encoded video from the at least one trick play stream comprise encoded video frames, including only key-frames.

10. The method of claim 9, wherein:
playing back video from the at least a portion of the at least one downloaded file includes playing back video from the non-key frames and the key-frames at a normal video frame rate; and
playing back video from the at least a portion of the at least one downloaded trick play file includes playing back video from the key-frames at a trick play video frame rate.

11. The method claim 10, wherein playing back video at the trick play video frame rate includes, selectively:
playing back all of the video from each segment of encoded video from the at least a portion of the at least one downloaded trick play file to achieve a normal trick play playback rate; and
playing back a subset of the video frames in each segment of encoded video from the at least a portion of the at least one downloaded trick play file to achieve an accelerated trick play playback rate.

12. The method of claim 8, wherein:
the downloaded at least a portion of the at least one file from the one of the plurality of streams is associated with successive time codes;
the playing back video from the at least a portion of the at least one downloaded file includes playing back the video in a forward direction of increasing time codes;
the downloaded at least a portion of the at least one trick play file from the at least one trick play stream is associated with successive time codes; and
the playing back video from the at least a portion of the at least one downloaded trick play file from the at least one trick play stream includes playing back the video in a rewind direction of decreasing time codes.

13. The method of claim 8, further comprising, prior to downloading of the at least a portion of the at least one file from the one of the plurality of streams:
sending a playlist request for segments of encoded video from the one of the plurality of streams associated with time codes greater than a current time specified in a playlist request; and
receiving a playlist listing network addresses where the segments of encoded video from the one of the plurality of streams associated with successive time codes greater than the current time are stored, wherein the downloading includes downloading the segments of encoded video from the one of the plurality of streams from the network addresses, and the playing back video from the at least a portion of the at least one downloaded file from the one of the plurality of streams includes playing back video from the at least a portion of the at least one downloaded file in an order of increasing time codes.

14. The method of claim 8, wherein:
the trick play playlist request is a request for a trick play playlist of segments of encoded video from the at least one trick play stream associated with time codes less than a trick play time when the trick play request was received;
the trick play playlist lists network addresses of the segments of encoded video from the at least one trick play stream associated with time codes less than the trick play time;
the downloading the at least a portion of the at least one trick play file from the at least one trick play stream include downloading segments of encoded video from the trick play stream from their network addresses; and
the playing back video from the at least a portion of the at least one downloaded trick play file from the trick play stream includes playing back video in an order of decreasing time codes.

* * * * *